(12) United States Patent
Huang et al.

(10) Patent No.: US 9,100,264 B2
(45) Date of Patent: Aug. 4, 2015

(54) DIGITAL RECEIVER AND METHOD FOR DEMODULATING PULSE-WIDTH MODULATED SIGNALS

(71) Applicant: M31 Technology Corporation, Hsinchu County (TW)

(72) Inventors: Ting-Chun Huang, Taipei (TW); Kuan-Yu Chen, Hsinchu County (TW)

(73) Assignee: M31 Technology Corporation, Hsinchu County (TW)

( * ) Notice: Subject to any disclaimer, the term of this patent is extended or adjusted under 35 U.S.C. 154(b) by 0 days.

(21) Appl. No.: 14/465,847

(22) Filed: Aug. 22, 2014

(65) Prior Publication Data
US 2015/0055695 A1 Feb. 26, 2015

(30) Foreign Application Priority Data

Aug. 22, 2013 (TW) .............. 102129991 A
Sep. 10, 2013 (CN) ............ 2013 1 0409792

(51) Int. Cl.
*H03K 7/08* (2006.01)
*H04L 25/49* (2006.01)
*H04B 1/06* (2006.01)

(52) U.S. Cl.
CPC .............. *H04L 25/4902* (2013.01); *H04B 1/06* (2013.01)

(58) Field of Classification Search
CPC . H04L 25/4902; H03M 1/504; H04B 14/026; H04B 1/06
See application file for complete search history.

(56) References Cited

U.S. PATENT DOCUMENTS

| | | | |
|---|---|---|---|
| 6,094,090 A | 7/2000 | Yamauchi | |
| 6,390,579 B1 * | 5/2002 | Roylance et al. | 347/9 |
| 6,947,493 B2 | 9/2005 | Cohen et al. | |
| 8,411,804 B2 | 4/2013 | Subburaj et al. | |
| 2005/0099164 A1 * | 5/2005 | Yang | 323/266 |
| 2010/0260283 A1 | 10/2010 | Besten et al. | |
| 2012/0213314 A1 * | 8/2012 | Subburaj et al. | 375/340 |

* cited by examiner

*Primary Examiner* — Kenneth Lam

(57) ABSTRACT

The present invention provides a digital receiver configured to demodulate or decode a pulse-width modulated (PWM) signal from a transmitter. The receiver digitally demodulates or decodes the pulse-width modulated signal so as to obtain (binary) values of data modulated on pulse periods of the pulse-width modulated signal. The digital receiver includes multiple delay cells coupled to one another in series and a sampling circuit coupled to one of the delay cells. A sequential coupling of the delay cells composes a signal path, and each of the delay cells is designed to provide a corresponding delay to a corresponding input signal propagating along the signal path so as to generate a delayed signal as its output.

18 Claims, 13 Drawing Sheets

DIGITAL RECEIVER AND METHOD FOR DEMODULATING PULSE-WIDTH MODULATED SIGNALS

RELATED APPLICATION

This application claims priority to TW application No. 102129991, filed on Aug. 22, 2013, and to CN application No. 201310409792.3, filed on Sep. 10, 2013, all of which are incorporated herein by reference in their entirety.

BACKGROUND OF THE DISCLOSURE

1. Field of the Disclosure

The present disclosure relates to a receiver, and more particularly, to a digital receiver configured to demodulate or decode a pulse-width modulated (PWM) signal.

2. Brief Description of the Related Art

A pulse width modulation is a modulation technique in which data (or information) can be modulated on a pulse period of a PWM signal. In this technique, the pulse period features a duty cycle with representation of specific data/information. The duty cycle is a ratio of the pulse width or duration of the pulse period to the pulse period, wherein the pulse width or duration is duration of a high logic level (or a logic level "1") in the pulse period. For example, a duty cycle of 50% means duration of a high logic level in a pulse period of a PWM signal is half of the pulse period of the PWM signal, that is, duration of the high logic level in the pulse period is the same as duration of a low logic level in the pulse period.

SUMMARY OF THE DISCLOSURE

In accordance with an objective of the invention, the present disclosure provides a digital receiver configured to demodulate or decode a PWM signal in a short time span so as to obtain (binary) values of data modulated on the PWM signal.

In accordance with another objective of the invention, the present disclosure provides a digital receiver configured to demodulate or decode a PWM signal in omission of oscillators, for example.

In accordance with an exemplary embodiment, the present disclosure provides a digital receiver, configured to demodulate or decode a PWM signal, including multiple counting cells and a calculator coupled to the counting cells. The counting cells, coupled to one another in series, are operable to propagate the PWM signal along a first signal path for duration of a first interval and propagate the PWM signal along a second signal path for duration of a second interval. Each counting cell is designed to provide a corresponding delay to its input so as to generate a delayed signal as its output. In addition, each counting cell is configured to obtain a first logic signal at an end of the first interval and a second logic signal at an end of the second interval and perform a first (logical) operation on the first and second logic signals after the first and second intervals so as to obtain a third logic signal based on a result of the first (logical) operation. The calculator is configured to perform a second (logical) operation on the third logic signals output from the counting cells so as to obtain a fourth logic signal based on a result of the second (logical) operation and obtain a (binary) value of data modulated on a third interval of the PWM signal based on the fourth logic signal. The third interval is a pulse period (i.e., a signal period) of the PWM signal and includes the first and second intervals. The first interval is an interval between a first logic-level transition of the PWM signal and a second logic-level transition of the PWM signal. The second interval is an interval between the second logic-level transition of the PWM signal and a third logic-level transition of the PWM signal. The first interval is followed by the second interval.

The calculator may include a logical operation unit coupled to the counting cells and a sampling circuit coupled to the logical operation unit. The logical operation unit is configured to perform the second (logical) operation on the third logic signals output from the counting cells. The sampling circuit is configured to sample or determine the result of the second (logical) operation and output the fourth logic signal (i.e., a sampled or determined result). In the case that the first (logical) operation is an AND logical operation, the second (logical) operation is an OR logical operation. In the case that the first (logical) operation is an OR logical operation, the second (logical) operation is an AND logical operation.

In accordance with another exemplary embodiment, the present disclosure provides a method of demodulating or decoding a PWM signal, including the following steps: (1) propagating the PWM signal in a first signal path for duration of a first interval, wherein multiple first delay cells coupled to one another in series forms or composes the first signal path; (2) sampling outputs of the first delay cells at an end of the first interval so as to obtain multiple first logic signals respectively; (3) after the first interval, propagating the PWM signal in a second signal path for duration of a second interval, wherein multiple second delay cells coupled to one another in series forms or composes the second signal path; (4) sampling outputs of the second delay cells at an end of the second interval so as to obtain multiple second logic signals respectively; (5) after the second interval, performing a first (logical) operation on each pair of one of the first logic signals and a corresponding one of the second logic signals so as to obtain a corresponding third logic signal based on a corresponding result of the first (logical) operation; (6) performing a second (logical) operation on the third logic signals so as to obtain a fourth logic signal based on a result of the second (logical) operation; and (7) obtaining a (binary) value of data modulated on a third interval of the PWM signal based on the fourth logic signal. The third interval is a pulse period of the PWM signal and includes the first and second intervals. The first interval is an interval between a first logic-level transition of the PWM signal and a second logic-level transition of the PWM signal. The second interval is an interval between the second logic-level transition of the PWM signal and a third logic-level transition of the PWM signal. The first interval is followed by the second interval. In the case that the first (logical) operation is an AND logical operation, the second (logical) operation is an OR logical operation. In the case that the first (logical) operation is an OR logical operation, the second (logical) operation is an AND logical operation.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1A:
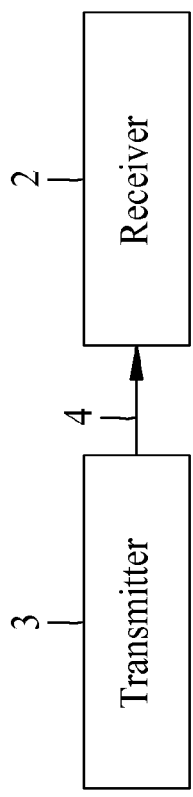
FIG. 1A is a schematic drawing depicting a receiver coupled to a transmitter through a transmission path.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed. When the same reference number or reference indicator appears in different drawings, it may refer to the same or like components or steps.

FIG. 1A shows a schematic drawing illustrating a receiver 2 coupled to a transmitter 3 through a transmission path 4. The receiver 2 may be a digital demodulator or a digital decoder. Referring to FIG. 1A, the receiver 2 receives a pulse-width modulated (PWM) signal output from the transmitter 3 based on a high-speed communication protocol or standard, such as universal serial bus (USB) communication protocol, or any other communication protocol or standard for a pulse width modulation. The receiver 2 may demodulate or decode the PWM signal to obtain (binary) values of data modulated on (or encoded on) the PWM signal.

The PWM signal has multiple pulse periods (or signal periods) with the same time span. Each pulse period of the PWM signal may have a corresponding time interval between two neighboring falling edges of the PWM signal. For an example of FIG. 1B, the PWM signal may include two pulse periods P1 and P2. The pulse period P1 may have a time span ΔT1 in a time interval between two neighboring falling edges 5a and 5b of the PWM signal at respective time points t1 and t3, and the pulse period P2 may have a time span ΔT2 in a time interval between two neighboring falling edges 5b and 5c of the PWM signal at respective time points t3 and t5. The time span ΔT1 of the pulse period P1 is the same as the time span ΔT2 of the pulse period P2. For another example, the PWM signal may have multiple pulse periods that have the same time spans in respective time intervals between two neighboring rising edges of the PWM signal as one another. For the PWM signal, a rising edge represents a logic-level transition from a logic level "0" (or called a low logic level) to a logic level "1" (or celled a high logic level), and a falling edge represents a logic-level transition from a logic level "1" to a logic level "0". The rising edges and falling edges of a signal (e.g., the PWM signal) indicate logic-level transitions of the signal.

The pulse periods of the PWM signal have duty cycles, respectively. Each duty cycle is a ratio of duration of a high logic level (or called a logic level "1") of a corresponding pulse period to duration of the corresponding pulse period. As an example of FIG. 1B, the logic level of the PWM signal during a time interval between two time points t1 and t2 in the pulse period P1 is a low logic level (i.e., a logic level "0"), and the logic level of the PWM signal during a time interval between two time points t2 and t3 in the pulse period P1 is a high logic level (i.e., a logic level "1"). The logic level of the PWM signal during a time interval between two time points t3 and t4 in the pulse period P2 is a low logic level, and the logic level of the PWM signal during a time interval between two time points t4 and t5 in the pulse period P2 is a high logic level. The pulse period P1 has a duty cycle, i.e., a ratio of the time span between the time points t2 and t3 to the time span ΔT1 of the pulse period P1, and the pulse period P2 has a duty cycle, i.e., a ratio of the time span between time points t4 and t5 to the time span ΔT2 of the pulse period P2.

The PWM signal having a duty cycle for each of the pulse periods of the PWM signal may be demodulated or decoded into a value such as a binary value or symbol of 0 or 1. For example, the PWM signal having a duty cycle of less than 50% for a pulse period of the PWM signal (e.g., the pulse period P1 illustrated in FIG. 1B) may be demodulated or decoded into a binary value or symbol of 0. The PWM signal having a duty cycle of more than 50% for a pulse period of the PWM signal (e.g., the pulse period P2 illustrated in FIG. 1B) may be demodulated or decoded into a binary value or symbol of 1.

Accordingly, in accordance with the present invention, the receiver 2 may measure or obtain the time span at the low logic level and the time span at the high logic level for each of the pulse periods of the PWM signal so as to demodulate or decode the PWM signal output from the transmitter 3. In the present invention, the PWM signal may be demodulated or decoded into (binary) values of data modulated on (or encoded on) the PWM signals.

First Embodiment of Receiver

Figure 2A:
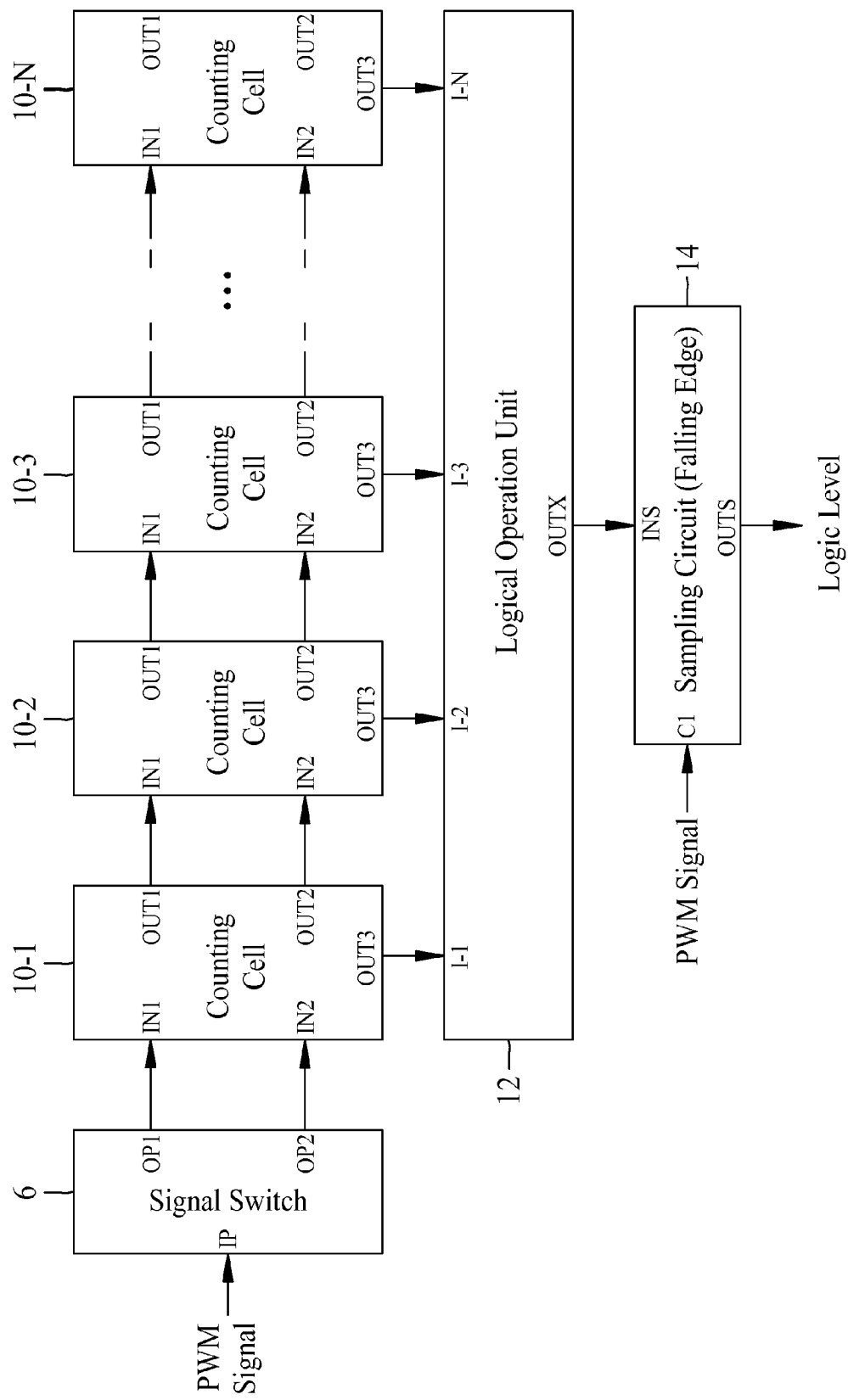
FIG. 2A is a block diagram of a receiver in accordance with an embodiment of the present disclosure.

FIG. 2A shows the receiver 2 in accordance with a first embodiment of the present invention. Referring to FIG. 2A, the receiver 2 includes a signal switch 6, multiple digital counting cells 10-1 through 10-N, a logical operation unit 12, and a sampling circuit 14. The signal switch 6 has an input port IP, electrically coupled to the transmitter 3 through the transmission path 4, for receiving the PWM signal output from the transmitter 3 via the transmission path 4. The signal switch 6 is configured to or operable to pass the PWM signal from its input port IP to its output port OP1 or OP2 to be transmitted to the digital counting cell 10-1. The signal switch 6 may be a demultiplexer (or called demuxer) or may include two or more switches.

The digital counting cells 10-1 through 10-N are coupled to one another in series. The number of the digital counting cells 10-1 through 10-N may be greater than or equal to 5, 10, 15 or 20. Each of the digital counting cells 10-1 through 10-N includes two input ports IN1 and IN2 and three output ports OUT1, OUT2 and OUT3. The input ports IN1 and IN2 of the digital counting cell 10-1 are coupled to the output ports OP1 and OP2 of the signal switch 6, respectively. Each of the digital counting cells 10-2 through 10-N includes the input ports IN1 and IN2 coupled to the respective output ports OUT1 and OUT2 of a corresponding one of the digital counting cells 10-1 through 10-(N−1) at the previous stage of said each of the digital counting cells 10-2 through 10-N. For each of the digital counting cells 10-1 through 10-N, upon a period of time (such as a period of time Td mentioned in FIGS. 4A and 4B) after being received at its input port IN1, a signal is passed to its output port OUT1; upon a period of time (such as the period of time Td mentioned in FIGS. 4A and 4B) after being received at its input port IN2, a signal is passed to its output port OUT2. The output ports OUT3 of the digital counting cells 10-1 through 10-N are coupled to input ports I-1 through I-N of the logical operation unit 12, respectively. The logical operation unit 12 is configured to or operable to perform an OR or AND logical operation on logic signals or data from the output ports OUT3 of the digital counting cells 10-1 through 10-N so as to generate an operation result (e.g., a logic signal) at its output port OUTX.

The sampling circuit 14 includes (1) an input port INS coupled to the output port OUTX of the logical operation unit 12 and (2) an input port C1 configured to receive a PWM signal which is substantially the same as that received at the input port IP of the signal switch 6. Upon detecting a falling edge of the PWM signal, the sampling circuit 14 samples or determines the operation result from the output port OUTX of the logical operation unit 12 so as to generate a sampled or determined result (e.g., a logic signal) at its output port OUTS. The receiver 2 may obtain a value (e.g., a binary value or symbol of 0 or 1) of data modulated on (or encoded on) a pulse period of the PWM signal based on the sampled or determined result generated at the output port OUTS of the sampling circuit 14. In this embodiment, the logical operation unit 12 and the sampling circuit 14 may compose a calculator.

Alternatively, the sampling circuit 14 of the receiver 2 may be omitted; the receiver 2 may obtain a value (e.e., a binary value or symbol of 0 or 1) of data modulated on (or encoded on) the pulse period of the PWM signal based on the operation result from the output port OUTX of the logical operation unit 12. In this case, the logical operation unit 12 may be defined as a calculator.

Figure 2B:
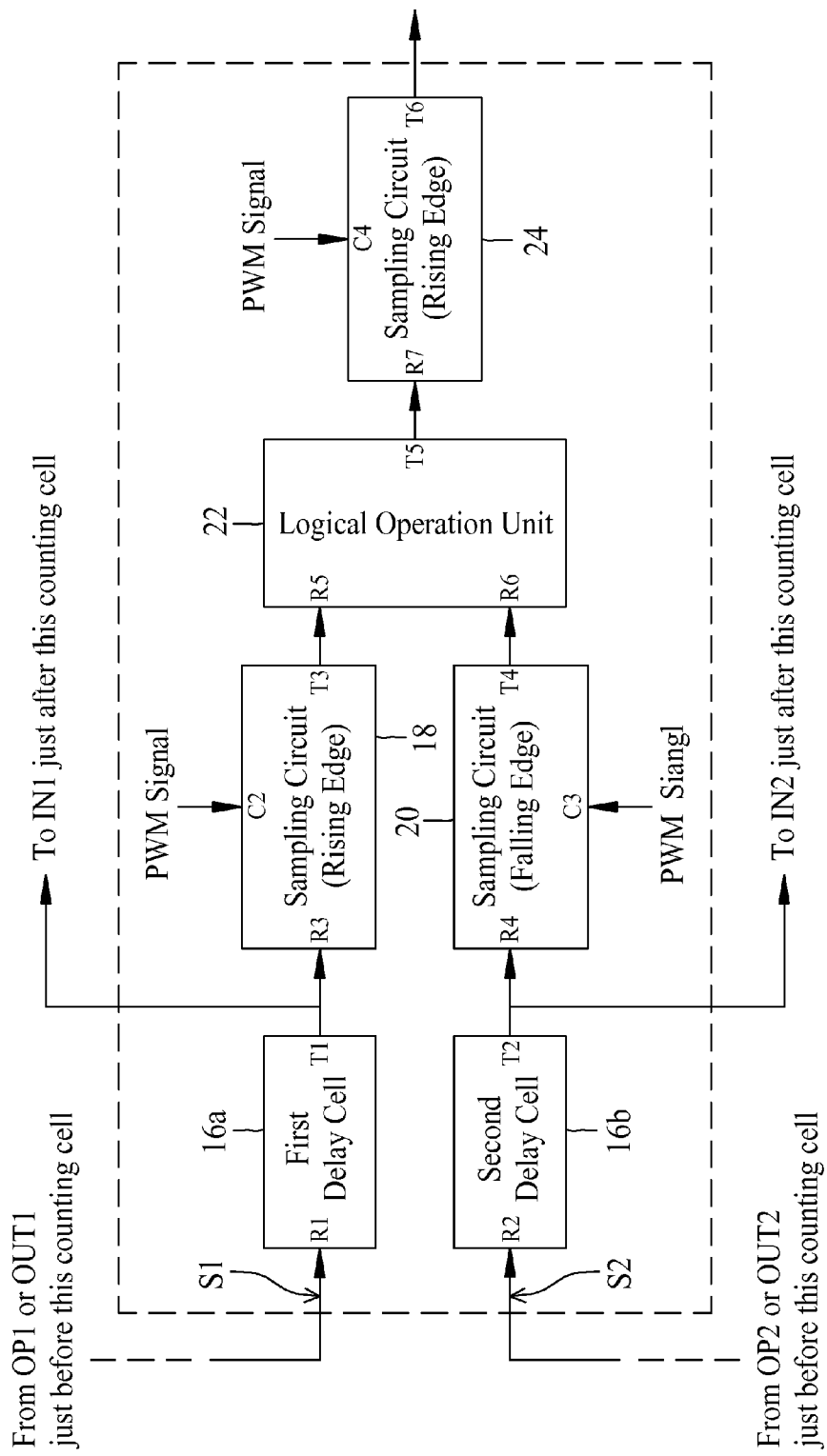
FIG. 2B is a block diagram of a digital counting cell.

FIG. 2B is a block diagram illustrating each of the digital counting cells 10-1 through 10-N. Referring to FIGS. 2A and 2B, each of the digital counting cells 10-1 through 10-N includes a first delay cell 16a, a second delay cell 16b, a first sampling circuit 18 coupled to the first delay cell 16a, a second sampling circuit 20 coupled to the second delay cell 16b, a logical operation unit 22 coupled to the first and second sampling circuits 18 and 20, and a third sampling circuit 24 coupled to the logical operation unit 22. In this embodiment, each of the digital counting cells 10-1 through 10-N includes the input port IN1 as an input port R1 of the first delay cell 16a, the input port IN2 as an input port R2 of the second delay cell 16b, the output port OUT1 as an output port T1 of the first delay cell 16a, the output port OUT2 as an output port T2 of the second delay cell 16b, and the output port OUT3 as an output port T6 of the third sampling circuit 24.

With regard to the digital counting cell 10-1, the input port R1 of the first delay cell 16a is coupled to the output port OP1 of the signal switch 6, and the input port R2 of the second delay cell 16b is coupled to the output port OP2 of the signal switch 6. The signal switch 6 is configured to: (1) pass the PWM signal at a logic level "0", i.e., a signal portion of a logic level "0" hereinafter, from its input port IP to its output port OP1 coupled to the input port R1 of the first delay cell 16a of the digital counting cell 10-1 and (2) pass the PWM signal at a logic level "1", i.e., a signal portion of a logic level "1" hereinafter, from its input port IP to its output port OP2 coupled to the input port R2 of the second delay cell 16b of the digital counting cell 10-1.

Figure 1B:
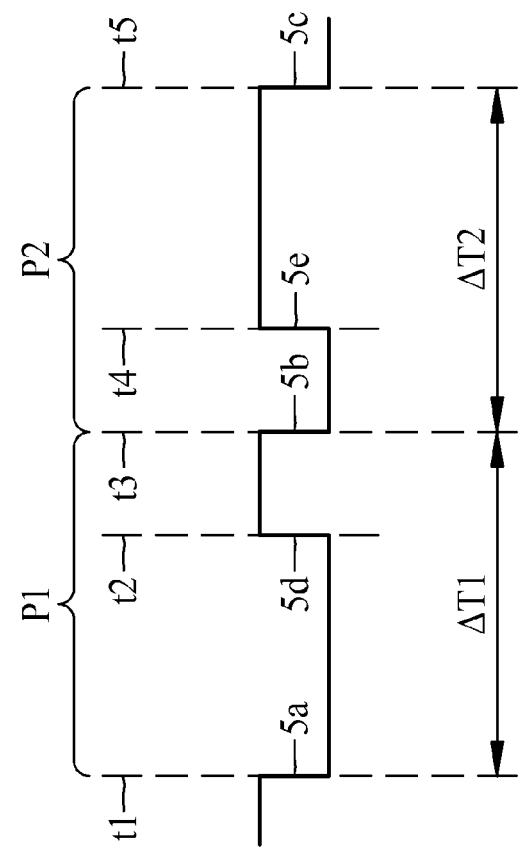
FIG. 1B is a timing diagram (or waveform graph) of a pulse-width modulated (PWM) signal, the timing diagram illustrating a logic level of the PWM signal with respect to a timing.

As an example of the PWM signal illustrated in FIG. 1B, the PWM signal at a logic level "0" (i.e., the signal portion of a logic level "0") is a signal portion of a low logic level in the time interval between the time points t1 and t2 or between the time points t3 and t4. The PWM signal at a logic level "1" (i.e., the signal portion of a logic level "1") is a signal portion of a high logic level in the time interval between the time points t2 and t3 or between the time points t4 and t5. The signal switch 6 passes the signal portions of a logic level "0" in the time interval between the time points t1 and t2 and between the time points t3 and t4 from its input port IP to its output port OP1 coupled to the input port R1 of the first delay cell 16a of the counting cell 10-1 and passes the signal portions of a logic level "1" in the time interval between the time points t2 and t3 and between the time points t4 and t5 from its input port IP to its output port OP2 coupled to the input port R2 of the second delay cell 16b of the counting cell 10-1.

Each of the digital counting cells 10-2 through 10-N is provided with the first delay cell 16a having the input port R1 coupled to a corresponding one of the digital counting cells 10-1 through 10-(N−1), i.e., the output port T1 of the first delay cell 16a thereof, at the previous stage of said each of the digital counting cells 10-2 through 10-N. Each of the digital counting cells 10-2 through 10-N is provided with the second delay cell 16b having the input port R2 coupled to a corresponding one of the digital counting cells 10-1 through 10-(N−1), i.e., the output port T2 of the second delay cell 16b thereof, at the previous stage of said each of the digital counting cells 10-2 through 10-N. The output ports T6 of the third sampling circuits 24 of the digital counting cells 10-1 through 10-N are coupled to the input ports I-1 through I-N of the logical operation unit 12, respectively. Regarding the receiver 2 illustrated in this embodiment, the number of the first delay cells 16a may be greater than or equal to 5, 10, 15 or 20 and may be equal to the number of the second delay cells 16b.

Referring to FIG. 2B, upon a period of time (e.g., the period of time Td mentioned in FIGS. 4A and 4B) after receiving a signal S1 at its input port R1, the first delay cell 16a outputs the signal S1 from its output port T1. In other words, the first delay cell 16a is configured to or operable to delay the signal S1 at its input for the period of time as its output. For the digital counting cell 10-1, the signal S1 is the signal portion of a logic level "0" (i.e., the PWM signal at a logic level "0") transmitted from the output port OP1 of the signal switch 6. For the digital counting cells 10-2 through 10-N, the signal S1 received at each of the digital counting cells 10-2 through 10-N, i.e., the first delay cell 16a thereof, is a signal from a corresponding one of the digital counting cells 10-1 through 10-(N−1), i.e., the output port T1 of the first delay cell 16a thereof, at the previous stage of said each of the digital counting cells 10-2 through 10-N. Upon a period of time (such as the period of time Td mentioned in FIGS. 4A and 4B) after receiving a signal S2 at its input port R2, the second delay cell 16b outputs the signal S2 from its output port T2. In other words, the second delay cell 16b is configured to or operable to delay the signal S2 at its input for the period of time as its output. For the digital counting cell 10-1, the signal S2 is the signal portion of a logic level "1" (i.e., the PWM signal at a logic level "1") transmitted from the output port OP2 of the signal switch 6. For the digital counting cells 10-2 through 10-N, the signal S2 received at each of the digital counting cells 10-2 through 10-N, i.e., the second delay cell 16b thereof, is a signal from a corresponding one of the digital counting cells 10-1 through 10-(N−1), i.e., the output port T2 of the second delay cell 16b thereof, at the previous stage of said each of the digital counting cells 10-2 through 10-N.

Referring to FIG. 2B, the first sampling circuit 18 includes an input port R3, coupled to the output port T1 of the first delay cell 16a, for receiving a signal from the output port T1 of the first delay cell 16a. In addition, the first sampling circuit 18 includes an input port C2 configured to receive the PWM signal which is substantially the same as that received at the input port IP of the signal switch 6. When receiving the PWM signal with a rising edge to be detected by the first sampling circuit 18 from the input port C2 of the first sampling circuit 18, the first sampling circuit 18 samples or determines the signal from the output port T1 of the first delay cell 16a so as to generate a sampled or determined result (e.g., a logic signal) from an output port T3 of the first sampling circuit 18 to an input port R5 of the logical operation unit 22. Here the logic level of the sampled or determined result may be substantially the same as that of the signal sampled or determined by the first sampling circuit 18.

Referring to FIG. 2B, the second sampling circuit 20 includes an input port R4, coupled to the output port T2 of the second delay cell 16b, for receiving a signal from the output port T2 of the second delay cell 16b. In addition, the second sampling circuit 20 includes an input port C3 configured to receive the PWM signal which is substantially the same as that received at the input port IP of the signal switch 6. When receiving the PWM signal with a falling edge to be detected by the second sampling circuit 20 from the input port C3 of the second sampling circuit 20, the second sampling circuit 20 samples or determines the signal from the output port T2 of the second delay cell 16b so as to generate a sampled or determined result (e.g., a logic signal) from an output port T4 of the second sampling circuit 20 to an input port R6 of the logical operation unit 22. Here the logic level of the sampled or determined result may be substantially the same as that of the signal sampled or determined by the second sampling circuit 20.

The input port R5 of the logical operation unit 22 is coupled to the output port T3 of the first sampling circuit 18, and the input port R6 of the logical operation unit 22 is coupled to the output port T4 of the second sampling circuit 20. The logical operation unit 22 is configured to or operable to perform an AND or OR logical operation on the sampled or determined results (or logic signals) received at its input ports R5 and R6 so as to generate an operation result (e.g., a logic signal) from its output port T5 to the third sampling circuit 24.

Regarding the receiver 2 illustrated in this embodiment, in the case that the logical operation unit 12 is an OR logic unit, each of the logical operation units 22 of the digital counting cells 10-1 through 10-N is an AND logic unit. In this case, the logical operation unit 12 performs an OR logical operation of logic signals (or data) from the output ports OUT3 of the digital counting cells 10-1 through 10-N; each of the logical operation units 22 of the digital counting cells 10-1 through 10-N performs an AND logical operation of the sampled or determined results (or logic signals) received at its input ports R5 and R6. In the case that the logical operation unit 12 is an AND logic unit, each of the logical operation units 22 of the digital counting cells 10-1 through 10-N is an OR logic unit. In this case, the logical operation unit 12 performs an AND logical operation of logic signals (or data) from the output ports OUT3 of the digital counting cells 10-1 through 10-N, and each of the logical operation units 22 of the digital counting cells 10-1 through 10-N performs an OR logical operation of the sampled or determined results (or logic signals) received at its input ports R5 and R6.

Referring to FIG. 2B, the third sampling circuit 24 includes (1) an input port R7 coupled to the output port T5 of the logical operation unit 22 and (2) an input port C4 configured to receive the PWM signal which is substantially the same as that received at the input port IP of the signal switch 6. When receiving the PWM signal with a rising edge to be detected by the third sampling circuit 24 from the input port C4 of the third sampling circuit 24, the third sampling circuit 24 samples or determines the operation result from the output port T5 of the logical operation unit 22 so as to generate a sampled or determined result (e.g., a logic signal) from an output port T6 of the third sampling circuit 24 to one of the input ports I-1 through I-N of the logical operation unit 12.

Regarding the receiver 2 illustrated in this embodiment, all the first delay cells 16a of the digital counting cells 10-1 through 10-N are coupled to one another in series. Each of the first delay cells 16a of the digital counting cells 10-1 through 10-(N−1) may have the output port T1 connected to or coupled to the input port R1 of a corresponding one of the first delay cells 16a, at the next stage of said each of the first delay cells 16a, of the digital counting cells 10-2 through 10-N. As a result, the coupling of the first delay cells 16a in series forms or composes a first signal path passing through the digital counting cells 10-1 through 10-N. The first delay cells 16a coupled to one another in series in the first signal path may be operable to propagate a first portion of the PWM signal (e.g., the PWM signal at a logic level "0") along the first signal path. All the second delay cells 16b of the digital counting cells 10-1 through 10-N are coupled to one another in series. Each of the second delay cells 16b of the digital counting cells 10-1 through 10-(N−1) may have the output port T2 connected to or coupled to the input port R2 of a corresponding one of the second delay cells 16b, at the next stage of said each of the second delay cells 16b, of the digital counting cells 10-2 through 10-N. As a result, the coupling of the second delay cells 16b in series forms or composes a second signal path passing through the digital counting cells 10-1 through 10-N. The second delay cells 16b coupled to one another in series in the second signal path may be operable to propagate a second portion of the PWM signal (e.g., the PWM signal at a logic level "1") along the second signal path.

As an example of the PWM signal in the time period P1 illustrated in FIG. 1B, after receiving the PWM signal at its input port IP, the signal switch 6 passes the signal portion of a logic level "0" in the time interval between the time points t1 and t2 from its input port IP to its output port OP1 coupled to the input port IN1 of the digital counting cell 10-1; as a result, the signal portion of a logic level "0" in the time interval between the time points t1 and t2 propagates along the first signal path passing through the digital counting cells 10-1 through 10-N. The signal portion of a logic level "0" propagating along the first signal path is configured to change a logic level at one or more output ports T1 of the first delay cells 16a in the first signal path to the logic level "0". Next, the signal switch 6 passes the signal portion of a logic level "1" in the time interval between the time points t2 and t3 from its input port IP to its output port OP2 coupled to the input port IN2 of the digital counting cell 10-1; as a result, the signal portion of a logic level "1" in the time interval between the time points t2 and t3 propagates along the second signal path passing through the digital counting cells 10-1 through 10-N. The signal portion of a logic level "1" propagating along the second signal path is configured to change a logic level at one or more output ports T2 of the second delay cells 16b in the second signal path to the logic level "1".

Figure 3:
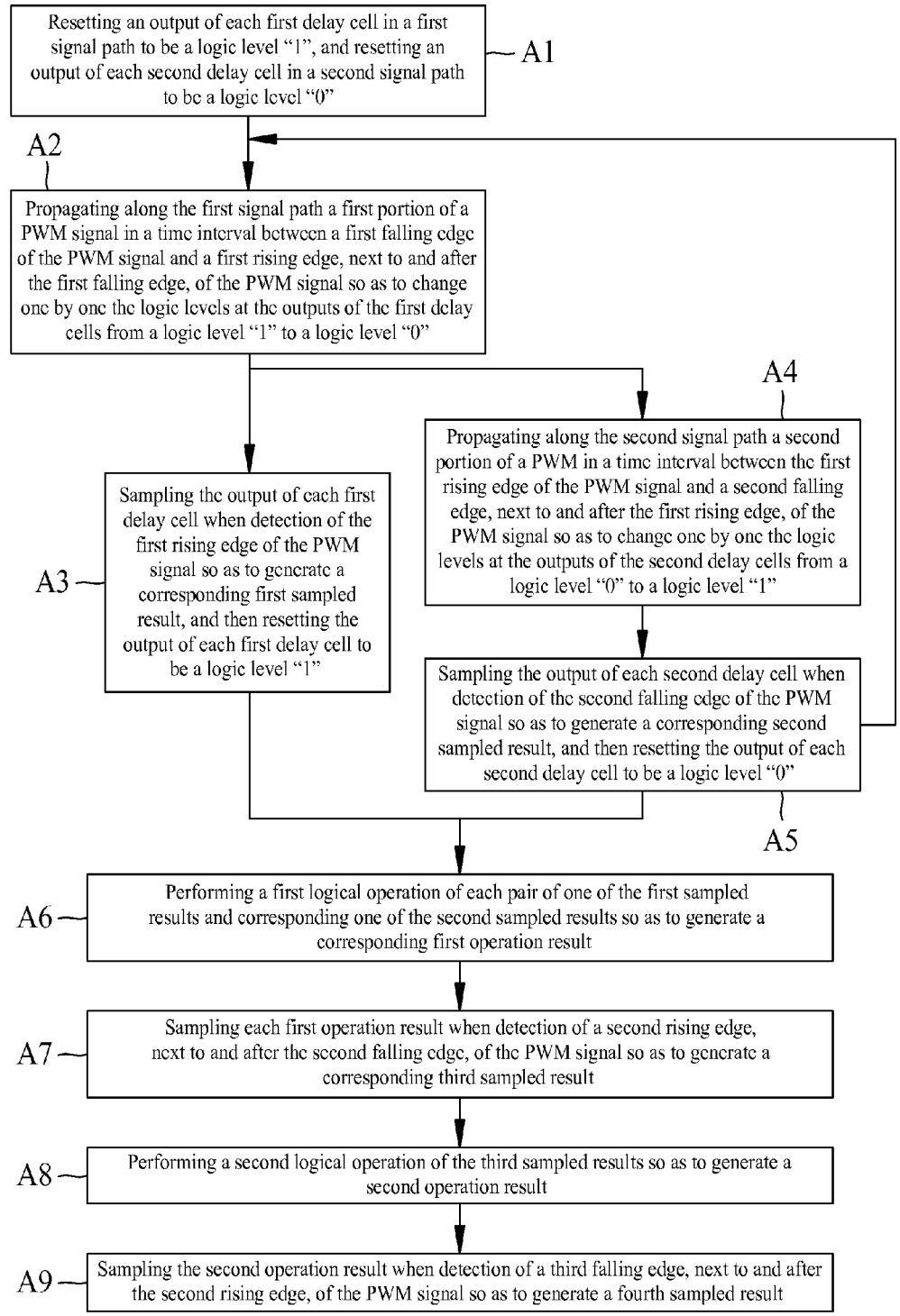
FIG. 3 is a flow chart depicting a receiver demodulating or decoding a PWM signal in accordance with an embodiment of the present disclosure.

The receiver 2 in the first embodiment as depicted above may perform a method of demodulating or decoding the PWM signal from the transmitter 3, as illustrated in FIG. 3. Referring to FIG. 3, in step A1, before the receiver 2 receives the PWM signal transmitted from the transmitter 3, each first delay cell 16a of the receiver 2 has its output port T1 to be reset to a logic level "1", and each second delay cell 16b of the receiver 2 has its output ports T2 to be reset to a logic level "0".

After the step A1 is completed, the signal switch 6 receives the PWM signal at its input port IP. In step A2, after received at the signal switch 6, the PWM signal has a first portion of a logic level "0" (i.e., the PWM signal at a logic level "0") to be passed from the input port IP of the signal switch 6 to the output port OP1 of the signal switch 6 at and after a first time point when the PWM signal transits from a logic level "1" to a logic level "0", such as at and after the time point t1 of the falling edge 5a shown in FIG. 1B, at the signal switch 6. The first portion of a logic level "0" from the output port OP1 is transmitted to the input port R1 of the first delay cell 16a of the digital counting cell 10-1 and propagates along the first signal path to replace one by one with a delay of the same first period of time (e.g., the period of time Td mentioned in FIGS. 4A and 4B) the logic level "1" at the output ports T1 of the first delay cells 16a in the first signal path until a second time point when the PWM signal transits from a logic level "0" to a logic level "1" (e.g., until the time point t2 of a rising edge 5d shown in FIG. 1B) at the signal switch 6. During the propagation of the first portion of a logic level "0" along the first signal path, each of the first delay cells 16a when receiving the first portion of a logic level "0" at its input port R1 may delay its input, i.e., the first portion of a logic level "0", at its input port R1 for the same first period of time, such as the period of time Td, as its output at its output port T1 to change a logic level at its output port T1 from a logic level "1" to a logic level "0".

Next, in step A3, at the second time point when the PWM signal transits from a logic level "0" to a logic level "1" (e.g., at the time point t2 of the rising edge 5d shown in FIG. 1B) at the input ports C2 of the first sampling circuits 18 of the digital counting cells 10-1 through 10-N, each of the digital counting cells 10-1 through 10-N has its first sampling circuit 18 to sample or determine a logic level, at its input port R3, transmitted from the output port T1 of the first delay cell 16a of said each of the digital counting cells 10-1 through 10-N so as to generate a first sampled or determined result (e.g., a logic signal) at its output port T3. In addition, after the first sampling circuits 18 of the digital counting cells 10-1 through 10-N complete the sampling process, each first delay cell 16a has its output port T1 to be reset to a logic level "1".

Also, in step A4, the PWM signal has a second portion of a logic level "1" (i.e., the PWM signal at a logic level "1") to be passed from the input port IP of the signal switch 6 to the output port OP2 of the signal switch 6 at and after the second time point when the PWM signal transits from a logic level "0" to a logic level "1", such as at and after the time point t2 of the rising edge 5d shown in FIG. 1B, at the signal switch 6. The second portion of a logic level "1" from the output port OP2 is transmitted to the input port R2 of the second delay cell 16b of the digital counting cell 10-1 and propagates along the second signal path to replace one by one with a delay of the same second period of time (e.g., the period of time Td mentioned in FIGS. 4A and 4B) the logic level "0" at the output ports T2 of the second delay cells 16b in the second signal path until a third time point when the PWM signal transits from a logic level "1" to a logic level "0" next to the first time point when the PWM signal transits from a logic level "1" to a logic level "0" (e.g., until the time point t3 of the falling edge 5b shown in FIG. 1B next to the time point t1 of the falling edge 5a shown in FIG. 1B) at the signal switch 6. During the propagation of the second portion of a logic level "1" along the second signal path, each of the second delay cells 16b when receiving the second portion of a logic level "1" at its input port R2 may delay its input, i.e., the second portion of a logic level "1", at its input port R2 for the same second period of time (e.g., the period of time Td), which may be substantially the same as the first period of time, as its output at its output port T2 to change a logic level at its output port T2 from a logic level "0" to a logic level "1".

Next, in step A5, at the third time point when the PWM signal transits from a logic level "1" to a logic level "0" (e.g., at the time point t3 of the falling edge 5b shown in FIG. 1B) at the input ports C3 of the second sampling circuits 20 of the digital counting cells 10-1 through 10-N, each of the digital counting cells 10-1 through 10-N has its second sampling circuit 20 to sample or determine a logic level, at its input port R4, transmitted from the output port T2 of the second delay cell 16b of said each of the digital counting cells 10-1 through 10-N so as to generate a second sampled or determined result (e.g., a logic signal) at its output port T4. In addition, after the second sampling circuits 20 of the digital counting cells 10-1 through 10-N complete the sampling process, each second delay cell 16b has its output port T2 to be reset to a logic level "0".

In step A6, after the first sampling circuits 18 of the digital counting cells 10-1 through 10-N generate the first sampled or determined results at their output ports T3, respectively, and the second sampling circuits 20 of the digital counting cells 10-1 through 10-N generate the second sampled or determined results at their output ports T4, respectively, each of the digital counting cells 10-1 through 10-N has its logical operation unit 22 to perform a first logical operation of the first and second sampled or determined results, at its respective input ports R5 and R6, from the output ports T3 and T4 of the first and second sampling circuits 18 and 20 of said each of the digital counting cells 10-1 through 10-N so as to generate (or output) a first operation result (e.g., a logic signal) at its output port T5. Next, in step A7, at a fourth time point when the PWM signal transits from a logic level "0" to a logic level "1" next to the second time point when the PWM signal transits from a logic level "0" to a logic level "1" (e.g., at the time point t4 of the rising edge 5e shown in FIG. 1B next to the time point t2 of the rising edge 5d shown in FIG. 1B) at the input ports C4 of the third sampling circuits 24 of the digital counting cells 10-1 through 10-N, each of the digital counting cells 10-1 through 10-N has its third sampling circuit 24 to sample or determine the first operation result, at its input port R7, from the output port T5 of the logical operation unit 22 of said each of the digital counting cells 10-1 through 10-N so as to generate a third sampled or determined result (e.g., a logic signal) at its output port T6.

In step A8, after the third sampling circuits 24 of the digital counting cells 10-1 through 10-N generate (or output) the third sampled or determined results at their output ports T6, the logical operation unit 12 performs a second logical operation of all the third sampled or determined results, at its respective input ports I-1 through I-N, transmitted from the output ports T6 of the third sampling circuits 24 of the digital counting cells 10-1 through 10-N respectively so as to generate (or output) a second operation result (e.g., a logic signal) at its output port OUTX. In this embodiment, in the case that the first logical operation is an AND logical operation, the second logical operation is an OR logical operation; in the case that the first logical operation is an OR logical operation, the second logical operation is an AND logical operation. In step A9, at a fifth time point when the PWM signal transits from a logic level "1" to a logic level "0" next to the third time point when the PWM signal transits from a logic level "1" to a logic level "0" (e.g., at the time point t5 of the falling edge 5c shown in FIG. 1B next to the time point t3 of the falling edge 5b shown in FIG. 1B) at the input port C1 of the sampling circuit 14, the sampling circuit 14 samples or determines the second operation result, at its input port INS, transmitted from the output port OUTX of the logical operation unit 12 so as to generate a fourth sampled or determined result, at its output port OUTS, as a value or logic signal, e.g., a binary value or symbol of 0 or 1, modulated on (or encoded on) a pulse period of the PWM signal, such as the pulse period P1.

As mentioned above, the receiver 2 may perform the steps A1-A9 to obtain a binary value or symbol of data, i.e., 0 or 1, modulated on (or encoded on) a pulse period of the PWM signal. As an example of FIG. 1B, the receiver 2 may perform the steps A1-A9 to obtain a binary value or symbol of data, i.e., 0, modulated on (or encoded on) the pulse period P1 of the PWM signal. In addition, the receiver 2 may perform the steps A2-A5 in sequence to the next pulse period of the PWM signal (e.g., the pulse period P2 shown in FIG. 1B) for obtaining the next binary value or symbol of data when the receiver 2 may perform the steps A6-A9 in sequence to the current pulse period of the PWM signal (e.g., the pulse period P1 shown in FIG. 1B) for obtaining the current binary value or symbol of data. After performing the step A5 to the next pulse period of the PWM signal, the receiver 2 may perform the steps A6-A9 in sequence to the next pulse period of the PWM signal so as to obtain the next binary value or symbol of data, i.e., 0 or 1. In accordance with the above first embodiment, the receiver 2 may obtain a corresponding binary value or symbol of data modulated on (or encoded on) each of the pulse periods of the PWM signal.

Alternatively, the sampling circuit 14 in the receiver 2 depicted in the first embodiment may be omitted. In this case, in the step A9, the receiver 2 may obtain a binary value or symbol of data, i.e., 0 or 1, modulated on (or encoded on) a pulse period (e.g., the pulse period P1 or P2) of the PWM signal based on the second operation result at the output port OUTX of the logical operation unit 12.

As mentioned above, according to the first embodiment, the receiver 2 includes (1) the first signal path, formed by all first delay cells 16a coupled to one another in series, for propagating the PWM signal at a logic level "0" during duration of a first time interval, such as the time interval between the time points t1 and t2 or between the time points t3 and t4, and (2) the second signal path, formed by all second delay cells 16b coupled to one another in series, for propagating the PWM signal at a logic level "1" during duration of a second time interval, such as the time interval between the time points t2 and t3 or between the time points t4 and t5. The first delay cells 16a coupled to one another in series in the first signal path are operable to propagate the PWM signal at a logic level "0" along the first signal path for duration of the first interval; the second delay cells 16b coupled to one another in series in the second signal path are operable to propagate the PWM signal at a logic level "1" along the second signal path for duration of the second interval. While propagating along the first signal path, the PWM signal at a logic level "0" is delayed by a first number of the first delay cells 16a for the first period of time (e.g., the period of time Td) times the first number. While propagating along the second signal path, the PWM signal at a logic level "1" is delayed by a second number of the second delay cells 16b for the second period of time (e.g., the period of time Td) times the second number. The above first time interval may be a time interval between a first logic-level transition of the PWM signal (e.g., the falling edge 5a shown in FIG. 1B) and a second logic-level transition of the PWM signal (e.g., the rising edge 5d shown in FIG. 1B), and the above second time interval may be a time interval between the second logic-level transition of the PWM signal and a third logic-level transition of the PWM signal (e.g., the falling edge 5b shown in FIG. 1B). The second logic-level transition of the PWM signal is followed by the third logic-level transition of the PWM signal. The time interval between the first logic-level transition of the PWM signal and the third logic-level transition of the PWM signal is a pulse period of the PWM signal, such as the pulse period P1 shown in FIG. 1B. The PWM signal propagating along the first signal path may change the logic level at the output ports T1 of some, i.e., the first number, of the first delay cells 16a coupled to one another in series. The PWM signal propagating along the second signal path may change the logic level at the output ports T2 of some, i.e., the second number, of the second delay cells 16b. The sampling circuit 14 of the receiver 2 samples or determines an output signal, i.e., the second operation result, from the output port OUTX of the logical operation unit 12 after the third logic-level transition of the PWM signal, for example, at the time point t5 of the falling edge 5c shown in FIG. 1B, so as to generate a sampled or determined result, e.g., the fourth sampled or determined result, at its output port OUTS. Based on the sampled or determined result, e.g., the fourth sampled or determined result, from the output port OUTS, the receiver 2 obtains a binary value or symbol of data, e.g., 0 or 1, modulated on (or encoded on) the pulse period of the PWM signal, such as the pulse period P1.

Figure 4A:
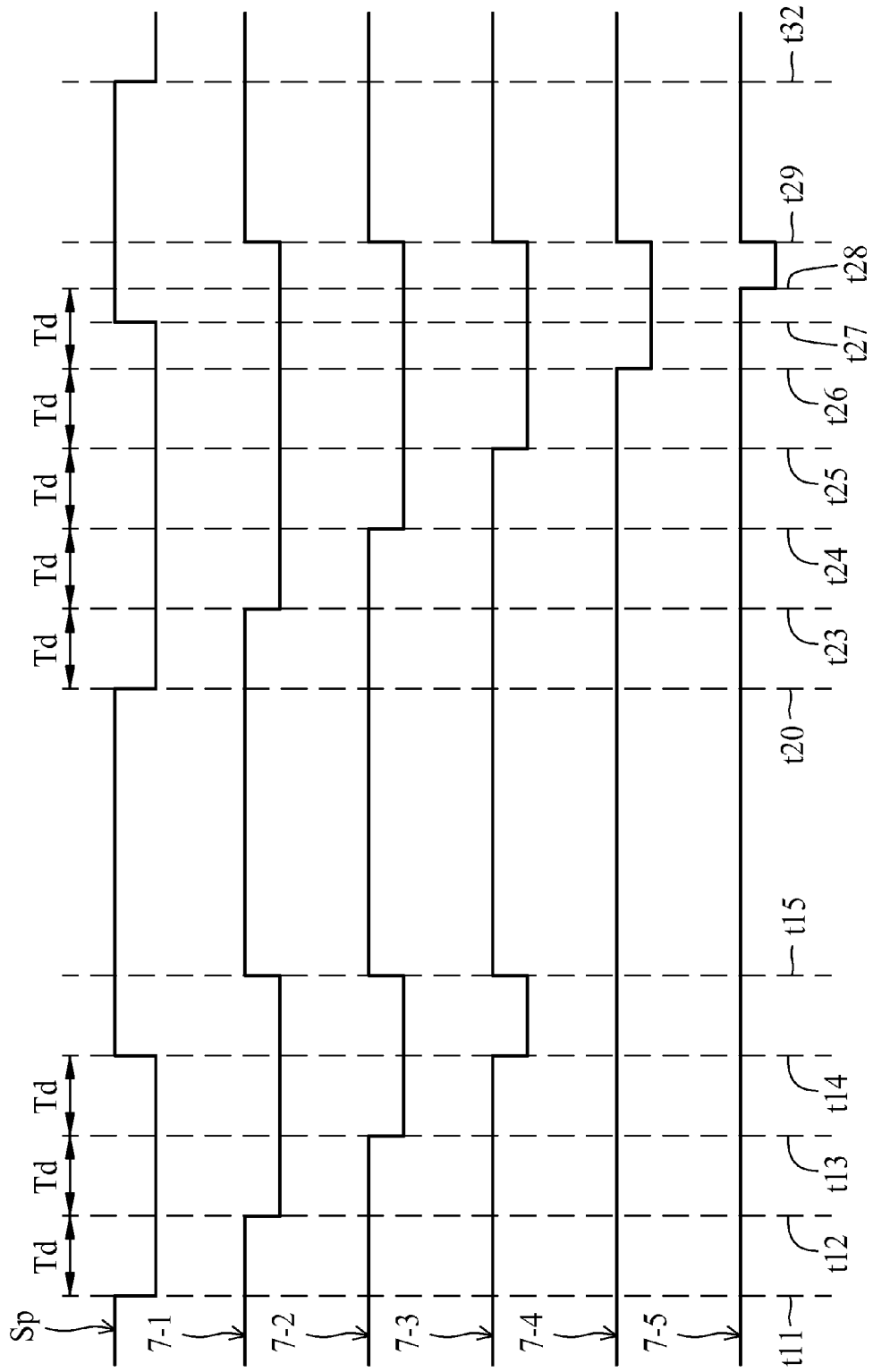
FIG. 4A shows six timing diagrams (or waveform graphs) of a PWM signal and five signals output from five first delay cells coupled in series one by one, arranged from top to bottom, the timing diagrams showing logic levels of the six signals with respect to a timing.
Figure 4B:
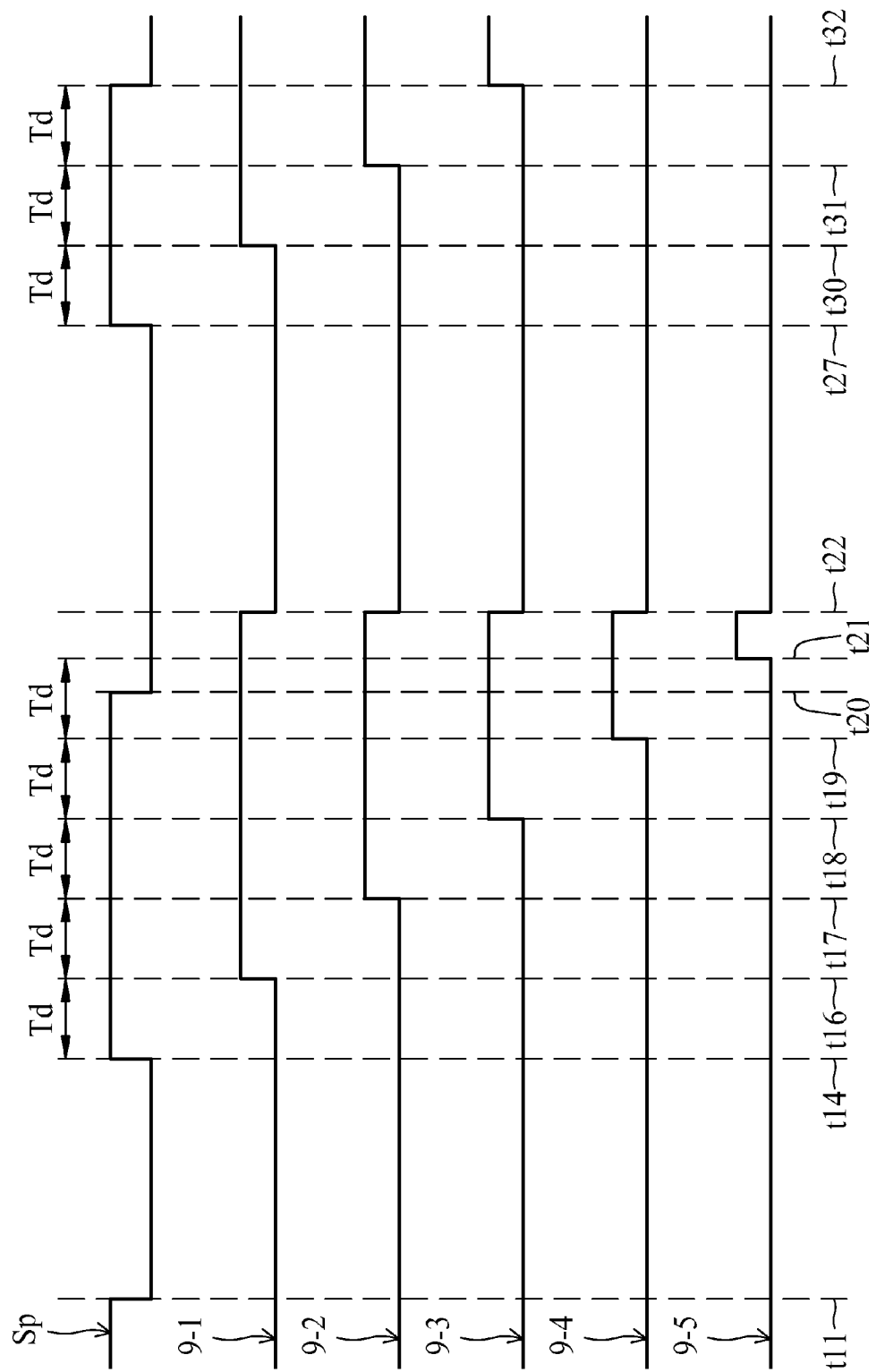
FIG. 4B shows six timing diagrams (or waveform graphs) of a PWM signal and five signals output from five second delay cells coupled in series one by one, arranged from top to bottom, the timing diagrams showing logic levels of the six signals with respect to a timing.

The following paragraphs illustrate a method of obtaining two binary values or symbols of data modulated on (or encoded on) the neighboring two pulse periods of a PWM signal in accordance with two timing diagrams shown in FIGS. 4A and 4B. A PWM signal Sp, five output signals 7-1 through 7-5, and five output signals 9-1 through 9-5 are illustrated in FIGS. 4A and 4B. The output signals 7-1 through 7-5 are generated at the respective output ports T1 of the first delay cells 16a of the digital counting cells 10-1 through 10-5. The output signals 9-1 through 9-5 are generated at the respective output ports T2 of the second delay cells 16b of the digital counting cells 10-1 through 10-5. Here the digital counting cells 10-1 through 10-5 are the first through fifth ones of the digital counting cells 10-1 through 10-N, respectively. In this case, upon the period of time Td (i.e., a fixed delay time) after receiving a signal at its input port R1, each of the first delay cells 16a of the digital counting cells 10-1 through 10-5 outputs the signal from its output port T1 to the input port R1 of one at the next stage of said each of the first delay cells 16a. Upon the period of time Td after receiving a signal at its input port R2, each of the second delay cells 16b of the digital counting cells 10-1 through 10-5 outputs the signal from its output port T2 to the input port R2 of one at the next stage of said each of the second delay cells 16b. A first pulse period of the PWM signal Sp spans from a time point t11 to a time point t20; a second pulse period of the PWM signal Sp spans from the time point t20 to a time point t32. The PWM signal Sp includes three falling edges at the three respective time points t11, t20 and t32 and two rising edges at two respective time points t14 and t27.

Referring to FIG. 4A, as illustrated in the step A1, before the receiver 2 receives the PWM signal Sp, i.e., before the time point t11, each of the output signals 7-1 through 7-5 has a logic level reset to a logic level "1", and each of the output signals 9-1 through 9-5 has a logic level reset to a logic level "0". After the signal switch 6 receives the PWM signal Sp, the PWM signal Sp has a first portion of a logic level "0" (i.e., the PWM signal Sp at a logic level "0") to be passed from the input port IP of the signal switch 6 to the output port OP1 of the signal switch 6 coupled to the first signal path of the receiver 2, as illustrated in the step A2, at a time interval between the time point t11 and the time point t14. The PWM signal Sp has the first portion of a logic level "0" starting to propagate from the first delay cell 16a of the digital counting cell 10-1 along the first signal path at the falling edge of the PWM signal Sp at the time point t11. At and immediately after a time point t12 after the period of time Td from the time point t11, the first delay cell 16a of the digital counting cell 10-1 generates the first portion of a logic level "0" of the PWM signal Sp from its output port T1 to the first delay cell 16a of the digital counting cell 10-2. As a result, the output signal 7-1 is changed from a logic level "1" to a logic level "0" at and immediately after the time point t12. Similarly, the output signal 7-2 is changed from a logic level "1" to a logic level "0" at and immediately after a time point t13 after the period of time Td from the time point t12; the output signal 7-3 is changed from a logic level "1" to a logic level "0" at and immediately after the time point t14 after the period of time Td from the time point t13. Since the first portion of a logic level "0" of the PWM signal Sp has not propagated through the first delay cell 16a of the digital counting cell 10-4 yet at the rising edge of the PWM signal Sp at the time point t14, the output signal 7-4 remains at a logic level "1" at the rising edge of the PWM signal Sp at the time point t14. Similarly, the output signal 7-5 remains at logic level "1" at the rising edge of the PWM signal Sp at the time point t14.

Next, as illustrated in the step A3, the first sampling circuits 18 of the digital counting cells 10-1 through 10-5 sample or determine the output signals 7-1 through 7-5 at their respective input ports R3 at the time point t14 when the PWM signal Sp transits from a logic level "0" to a logic level "1" at the input ports C2 of the first sampling circuits 18 of the digital counting cells 10-1 through 10-5, respectively. Since the logic level of the output signal 7-1 at the time point t14 is a logic level "0", the first sampling circuit 18 of the digital counting cell 10-1 generates the first sampled or determined result of a logic level "0", e.g., a signal at a logic level "0", at its output port T3. Similarly, the first sampling circuit 18 of the digital counting cell 10-2 generates the first sampled or determined result of a logic level "0", e.g., a signal at a logic level "0", at its output port T3; the first sampling circuit 18 of the digital counting cell 10-3 generates the first sampled or determined result of a logic level "1", e.g., a signal at a logic level "1", at its output port T3; the first sampling circuit 18 of the digital counting cell 10-4 generates the first sampled or determined result of a logic level "1", e.g., a signal at a logic level "1", at its output port T3; the first sampling circuit 18 of the digital counting cell 10-5 generates the first sampled or determined result of a logic level "1", e.g., a signal at a logic level "1", at its output port T3. After the first sampling circuits 18 of the digital counting cells 10-1 through 10-5 sample or determine the output signals 7-1 through 7-5 at their respective input ports R3 at the time point t14, each of the first delay cells 16a of the digital counting cells 10-1 through 10-5 has the output port T1 to be reset to a logic level "1" based on the PWM signal Sp at a time point t15 after a period of time, equal to or less than the period of time Td, from the rising edge of the PWM signal Sp at the time point t14. Accordingly, the output signals 7-4 and 7-5 at the output ports T1 of the first delay cells 16a of the digital counting cells 10-4 and 10-5 remain at a logic level "1" at and immediately after the time point t15, and the output signals 7-1 and 7-3 at the output ports T1 of the first delay cells 16a of the digital counting cells 10-1 through 10-3 are changed from a logic level "0" to a logic level "1" at and immediately after the time point t15.

Referring to FIG. 4B, when the first sampling circuits 18 of the digital counting cells 10-1 through 10-5 sample or determine the respective output signals 7-1 through 7-5 at the rising edge of the PWM signal Sp at the time point t14, the PWM signal Sp has a second portion of a logic level "1" (i.e., the PWM signal Sp at a logic level "1"), just followed by the first portion of a logic level "0" of the PWM signal Sp, to be passed from the input port IP of the signal switch 6 to the output port OP2 of the signal switch 6 coupled to the second signal path of the receiver 2, as illustrated in the step A4, at a time interval between the time point t14 and the time point t20. The PWM Sp signal has the second portion of a logic level "1" starting to propagate from the second delay cell 16b of the digital counting cell 10-1 along the second signal path at the rising edge of the PWM signal Sp at the time point t14. At and immediately after a time point t16 after the period of time Td from the time point t14, the second delay cell 16b of the digital counting cell 10-1 generates the second portion of a logic level "1" of the PWM signal Sp from its output port T2 to the second delay cell 16b of the digital counting cell 10-2. As a result, the output signal 9-1 is changed from a logic level "0" to a logic level "1" at and immediately after the time point t16. Similarly, the output signal 9-2 is changed from a logic level "0" to a logic level "1" at and immediately after a time point t17 after the period of time Td from the time point t16; the output signal 9-3 is changed from a logic level "0" to a logic level "1" at and immediately after a time point t18 after the period of time Td from the time point t17; the output signal 9-4 is changed from a logic level "0" to a logic level "1" at and immediately after a time point t19 after the period of time Td from the time point t18 but has not propagated through the second delay cell 16b of the digital counting cell 10-5 yet at the falling edge of the PWM signal Sp at the time point t20; the output signal 9-5 is changed from a logic level "0" to a logic level "1" at and immediately after a time point t21 after the period of time Td from the time point t19. A time interval between the time points t14 and t16 may have a time span, equal to the period of time Td, equal to or greater than that of a time interval between the time points t14 and t15.

Next, as illustrated in the step A5, the second sampling circuits 20 of the digital counting cells 10-1 through 10-5 sample or determine the output signals 9-1 through 9-5 at their respective input ports R4 at the time point t20 when the PWM signal Sp transits from a logic level "1" to a logic level "0" at the input ports C3 of the second sampling circuits 20 of the digital counting cells 10-1 through 10-5, respectively. Since the logic level of the output signal 9-1 at the time point t20 is a logic level "1", the second sampling circuit 20 of the digital counting cell 10-1 generates the second sampled or determined result of a logic level "1", e.g., a signal at a logic level "1", at its output port T4. Similarly, the second sampling circuit 20 of the digital counting cell 10-2 generates the second sampled or determined result of a logic level "1", e.g., a signal at a logic level "1", at its output port T4; the second sampling circuit 20 of the digital counting cell 10-3 generates the second sampled or determined result of a logic level "1", e.g., a signal at a logic level "1", at its output port T4; the second sampling circuit 20 of the digital counting cell 10-4 generates the second sampled or determined result of a logic level "1", e.g., a signal at a logic level "1", at its output port T4; the second sampling circuit 20 of the digital counting cell 10-5 generates the second sampled or determined result of a logic level "0", e.g., a signal at a logic level "0", at its output port T4. After the second sampling circuits 20 of the digital counting cells 10-1 through 10-5 sample or determine the output signals 9-1 through 9-5 at their respective input ports R4 at the falling edge of the PWM signal Sp at the time point t20, each of the second delay cells 16b of the digital counting cells 10-1 through 10-5 has the output port T2 to be reset to a logic level "0" based on the PWM signal Sp at a time point t22 after a period of time, equal to or less than the period of time Td, from the falling edge of the PWM signal Sp at the time point t20. Accordingly, the output signals 9-1 through 9-5 at the output ports T2 of the second delay cells 16b of the digital counting cells 10-1 through 10-5 are changed from a logic level "1" to a logic level "0" at and immediately after the time point t22.

Next, as illustrated in the step A6, after the step A5 of the second sampling circuits 20 of the digital counting cells 10-1 through 10-5 generating the second sampled or determined results, the receiver 2 performs the following actions: (1) the logical operation unit 22 of the digital counting cell 10-1 performs the first logical operation of the first sampled or determined result of a logic level "0", at its input port R5, from the output port T3 of the first sampling circuit 18 of the digital counting cell 10-1 and the second sampled or determined result of a logic level "1", at its input port R6, from the output port T4 of the second sampling circuit 20 of the digital counting cell 10-1; (2) the logical operation unit 22 of the digital counting cell 10-2 performs the first logical operation of the first sampled or determined result of a logic level "0", at its input port R5, from the output port T3 of the first sampling circuit 18 of the digital counting cell 10-2 and the second sampled or determined result of a logic level "1", at its input port R6, from the output port T4 of the second sampling circuit 20 of the digital counting cell 10-2; (3) the logical operation unit 22 of the digital counting cell 10-3 performs the first logical operation of the first sampled or determined result of a logic level "1", at its input port R5, from the output port T3 of the first sampling circuit 18 of the digital counting cell 10-3 and the second sampled or determined result of a logic level "1", at its input port R6, from the output port T4 of the second sampling circuit 20 of the digital counting cell 10-3; (4) the logical operation unit 22 of the digital counting cell 10-4 performs the first logical operation of the first sampled or determined result of a logic level "1", at its input port R5, from the output port T3 of the first sampling circuit 18 of the digital counting cell 10-4 and the second sampled or determined result of a logic level "1", at its input port R6, from the output port T4 of the second sampling circuit 20 of the digital counting cell 10-4; (5) the logical operation unit 22 of the digital counting cell 10-5 performs the first logical operation of the first sampled or determined result of a logic level "1", at its input port R5, from the output port T3 of the first sampling circuit 18 of the digital counting cell 10-5 and the second sampled or determined result of a logic level "0", at its input port R6, from the output port T4 of the second sampling circuit 20 of the digital counting cell 10-5.

In the case that the first logical operation is an AND logical operation, the logical operation unit 22 of the digital counting cell 10-1 generates the first operation result of a logic level "0", e.g., a signal at a logic level "0", at its output port T5; the logical operation unit 22 of the digital counting cell 10-2 generates the first operation result of a logic level "0", e.g., a signal at a logic level "0", at its output port T5; the logical operation unit 22 of the digital counting cell 10-3 generates the first operation result of a logic level "1", e.g., a signal at a logic level "1", at its output port T5; the logical operation unit 22 of the digital counting cell 10-4 generates the first operation result of a logic level "1", e.g., a signal at a logic level "1", at its output port T5; the logical operation unit 22 of the digital counting cell 10-5 generates the first operation result of a logic level "0", e.g., a signal at a logic level "0", at its output port T5. In the case that the first logical operation is an OR logical operation, each of the logical operation units 22 of the digital counting cells 10-1 through 10-5 generates the first operation result of a logic level "1", e.g., a signal at a logic level "1", at its output port T5.

Next, as illustrated in the step A7, the third sampling circuits 24 of the digital counting cells 10-1 through 10-5 sample or determine the first operation results from the output ports T5 of the logical operation units 22 of the digital counting cells 10-1 through 10-5 based on the PWM signal Sp coupled to their input ports C4 at the rising edge of the PWM signal Sp at the time point t27, respectively. In the case that the first logical operation is an AND logical operation, the third sampling circuit 24 of the digital counting cell 10-1 generates (or outputs) the third sampled or determined result of a logic level "0", e.g., a signal at a logic level "0", at its output port T6; the third sampling circuit 24 of the digital counting cell 10-2 generates (or outputs) the third sampled or determined result of a logic level "0", e.g., a signal at a logic level "0", at its output port T6; the third sampling circuit 24 of the digital counting cell 10-3 generates (or outputs) the third sampled or determined result of a logic level "1", e.g., a signal at a logic level "1", at its output port T6; the third sampling circuit 24 of the digital counting cell 10-4 generates (or outputs) the third sampled or determined result of a logic level "1", e.g., a signal at a logic level "1", at its output port T6; the third sampling circuit 24 of the digital counting cell 10-5 generates (or outputs) the third sampled or determined result of a logic level "0", e.g., a signal at a logic level "0", at its output port T6. In the case that the first logical operation is an OR logical operation, each of the third sampling circuits 24 of the digital counting cells 10-1 through 10-5 generates (or outputs) the third sampled or determined result of a logic level "1", e.g., a signal at a logic level "1", at its output port T6.

Next, as illustrated in the step A8, after the third sampling circuits 24 of the digital counting cells 10-1 through 10-5 generate (or output) the third sampled or determined results at their output ports T6, the logical operation unit 12 performs the second logical operation of the third sampled or determined results at the output ports T6 of the third sampling circuits 24 of the digital counting cells 10-1 through 10-5. In the case that the first logical operation is an AND logical operation and the second logical operation is an OR logical operation, the logical operation unit 12 generates (or outputs) the second operation result of a logic level "1", such as a signal at a logic level "1", at its output port OUTX. In the case that the first logical operation is an OR logical operation and the second logical operation is an AND logical operation, the logical operation unit 12 generates (or outputs) the second operation result of a logic level "1", such as a signal at a logic level "1", at its output port OUTX.

Next, as illustrated in the step A9, the sampling circuit 14 samples or determines the second operation result, at its input port INS, from the output port OUTX of the logical operation unit 12 based on the PWM signal Sp coupled to its input port C1 at the falling edge of the PWM signal Sp at the time point t32 and generates the fourth sampled or determined result of a logic level "1", such as a signal at a logic level "1", at its output port OUTS. Here the fourth sampled or determined result at the output port OUTS of the sampling circuit 14 represents a (binary) value of data, i.e., a binary symbol "1", modulated on (or encoded on) the pulse period of the PWM signal Sp at a time interval between the time points t11 and t20. Accordingly, the receiver 2 obtains the (binary) value of data, i.e., 1, modulated on (or encoded on) the pulse period of the PWM signal Sp at the time interval between the time points t11 and t20 based on the fourth sampled or determined result from the output port OUTS of the sampling circuit 14.

Referring to FIG. 4A again, when the second sampling circuits 20 of the digital counting cells 10-1 through 10-5 sample or determine the respective output signals 9-1 through 9-5 at the time point t20, the PWM signal Sp has a third portion of a logic level "0" (i.e., the PWM signal Sp at a logic level "0"), just followed by the second portion of a logic level "1", to be passed from the input port IP of the signal switch 6 to the output port OP1 of the signal switch 6 coupled to the first signal path of the receiver 2, as illustrated in the step A2, at a time interval between the time point t20 and the time point t27. The PWM signal Sp has the third portion of a logic level "0" starting to propagate from the first delay cell 16a of the digital counting cell 10-1 along the first signal path at the falling edge of the PWM signal Sp at the time point t20. At and immediately after a time point t23 after the period of time Td from the time point t20, the first delay cell 16a of the digital counting cell 10-1 generates the third portion of a logic level "0" of the PWM signal Sp from its output port T1 to the first delay cell 16a of the digital counting cell 10-2. As a result, the output signal 7-1 is changed from a logic level "1" to a logic level "0" at and immediately after the time point t23. Similarly, the output signal 7-2 is changed from a logic level "1" to a logic level "0" at and immediately after a time point t24 after the period of time Td from the time point t23; the output signal 7-3 is changed from a logic level "1" to a logic level "0" at and immediately after a time point t25 after the period of time Td from the time point t24; the output signal 7-4 is changed from a logic level "1" to a logic level "0" at and immediately after a time point t26 after the period of time Td from the time point t25; the output signal 7-5 is changed from a logic level "1" to a logic level "0" at and immediately after a time point t28 after the period of time Td from the time point t26. Since the third portion of a logic level "0" of the PWM signal Sp has not propagated through the first delay cell 16a of the digital counting cell 10-5 yet at the rising edge of the PWM signal Sp at the time point t27, the output signal 7-5 remains at a logic level "1" at the rising edge of the PWM signal Sp at the time point t27. A time interval between the time points t20 and t23 may have a time span, equal to the period of time Td, equal to or greater than that of a time interval between the time points t20 and t22.

Next, as illustrated in the step A3, the first sampling circuits 18 of the digital counting cells 10-1 through 10-5 sample or determine the output signals 7-1 through 7-5 at their respective input ports R3 at the time point t27 when the PWM signal Sp transits from a logic level "0" to a logic level "1" at the input ports C2 of the first sampling circuits 18 of the digital counting cells 10-1 through 10-5, respectively. Since the logic level of the output signal 7-1 at the time point t27 is a logic level "0", the first sampling circuit 18 of the digital counting cell 10-1 generates the first sampled or determined result of a logic level "0", e.g., a signal at a logic level "0", at its output port T3. Similarly, the first sampling circuit 18 of the digital counting cell 10-2 generates the first sampled or determined result of a logic level "0", e.g., a signal at a logic level "0", at its output port T3; the first sampling circuit 18 of the digital counting cell 10-3 generates the first sampled or determined result of a logic level "0", e.g., a signal at a logic level "0", at its output port T3; the first sampling circuit 18 of the digital counting cell 10-4 generates the first sampled or determined result of a logic level "0", e.g., a signal at a logic level "0", at its output port T3; the first sampling circuit 18 of the digital counting cell 10-5 generates the first sampled or determined result of a logic level "1", e.g., a signal at a logic level "1", at its output port T3. After the first sampling circuits 18 of the digital counting cells 10-1 through 10-5 sample or determine the output signals 7-1 through 7-5 at their respective input ports R3 at the rising edge of the PWM signal Sp at the time point t27, each of the first delay cells 16a of the digital counting cells 10-1 through 10-5 has its output port T1 to be reset to a logic level "1" based on the PWM signal Sp at a time point t29 after a period of time, equal to or less than the period of time Td, from the rising edge of the PWM signal Sp at the time point t27. Accordingly, the output signals 7-1 and 7-5 at the output ports T1 of the first delay cells 16a of the digital counting cells 10-1 through 10-5 are changed from a logic level "0" to a logic level "1" at and immediately after the time point t29.

Referring to FIG. 4B again, when the first sampling circuits 18 of the digital counting cells 10-1 through 10-5 sample or determine the respective output signals 7-1 through 7-5 at the rising edge of the PWM signal Sp at the time point t27, the PWM signal Sp has a fourth portion of a logic level "1" (i.e., the PWM signal Sp at a logic level "1"), just followed by the third portion of a logic level "0" of the PWM signal Sp, to be passed from the input port IP of the signal switch 6 to the output port OP2 of the signal switch 6 coupled to the second signal path of the receiver 2, as illustrated in the step A4, at a time interval between the time point t27 and the time point t32. The PWM signal Sp has the fourth portion of a logic level "1" starting to propagate from the second delay cell 16b of the digital counting cell 10-1 along the second signal path at the rising edge of the PWM signal Sp at the time point t27. At and immediately after a time point t30 after the period of time Td from the time point t27, the second delay cell 16b of the digital counting cell 10-1 generates the fourth portion of a logic level "1" of the PWM signal Sp from its output port T2 to the second delay cell 16b of the digital counting cell 10-2.

As a result, the output signal 9-1 is changed from a logic level "0" to a logic level "1" at and immediately after the time point t30. Similarly, the output signal 9-2 is changed from a logic level "0" to a logic level "1" at and immediately after a time point t31 after the period of time Td from the time point t30; the output signal 9-3 is changed from a logic level "0" to a logic level "1" at and immediately after the time point t32 after the period of time Td from the time point t31. Since the fourth portion of a logic level "1" has not propagated through the second delay cell 16b of the digital counting cell 10-4 yet at the falling edge of the PWM signal Sp at the time point t32, the output signal 9-4 remains at a logic level "0" at the falling edge of the PWM signal Sp at the time point t32. Similarly, the output signal 9-5 remains at logic level "0" at the falling edge of the PWM signal Sp at the time point t32. A time interval between the time points t27 and t30 may have a time span, equal to the period of time Td, equal to or greater than that of a time interval between the time points t27 and t29.

Next, as illustrated in the step A5, the second sampling circuits 20 of the digital counting cells 10-1 through 10-5 sample or determine the output signals 9-1 through 9-5 at their respective input ports R4 at the time point t32 when the PWM signal Sp transits from a logic level "1" to a logic level "0" at the input ports C3 of the second sampling circuits 20 of the digital counting cells 10-1 through 10-5, respectively. Since the logic level of the output signal 9-1 at the time point t32 is a logic level "1", the second sampling circuit 20 of the digital counting cell 10-1 generates the second sampled or determined result of a logic level "1", e.g., a signal at a logic level "1", at its output port T4. Similarly, the second sampling circuit 20 of the digital counting cell 10-2 generates the second sampled or determined result of a logic level "1", e.g., a signal at a logic level "1", at its output port T4; the second sampling circuit 20 of the digital counting cell 10-3 generates the second sampled or determined result of a logic level "0", e.g., a signal at a logic level "0", at its output port T4; the second sampling circuit 20 of the digital counting cell 10-4 generates the second sampled or determined result of a logic level "0", e.g., a signal at a logic level "0", at its output port T4; the second sampling circuit 20 of the digital counting cell 10-5 generates the second sampled or determined result of a logic level "0", e.g., a signal at a logic level "0", at its output port T4. After the second sampling circuits 20 of the digital counting cells 10-1 through 10-5 sample or determine the output signals 9-1 through 9-5 at their respective input ports R4 at the falling edge of the PWM signal Sp at the time point t32, each of the second delay cells 16b of the digital counting cells 10-1 through 10-5 has its output port T2 to be reset to a logic level "0" based on the PWM signal Sp at a time point t33 (not shown) after a period of time, equal to or less than the period of time Td, from the falling edge of the PWM signal Sp at the time point t32. Accordingly, the output signals 9-1 through 9-3 at the output ports T2 of the second delay cells 16b of the digital counting cells 10-1 through 10-3 are changed from a logic level "1" to a logic level "0" at and immediately after the time point t33, and the output signals 9-4 and 9-5 remain at a logic level "0" at and immediately after the time point t33.

As the above method of obtaining the (binary) value of data modulated on (or encoded on) the pulse period of the PWM signal Sp at the time interval between the time points t11 and t20, the steps A6-A9 are then performed in sequence to obtain a (binary) value of data modulated on (or encoded on) the pulse period of the PWM signal Sp at a time interval between the time points t20 and t32. Accordingly, the receiver 2 obtains the (binary) value of data, i.e., 0, modulated on (or encoded on) the pulse period of the PWM signal Sp at the time interval between the time points t20 and t32 based on the fourth sampled or determined result from the output port OUTS of the sampling circuit 14.

Second Embodiment of Receiver

Figure 5:
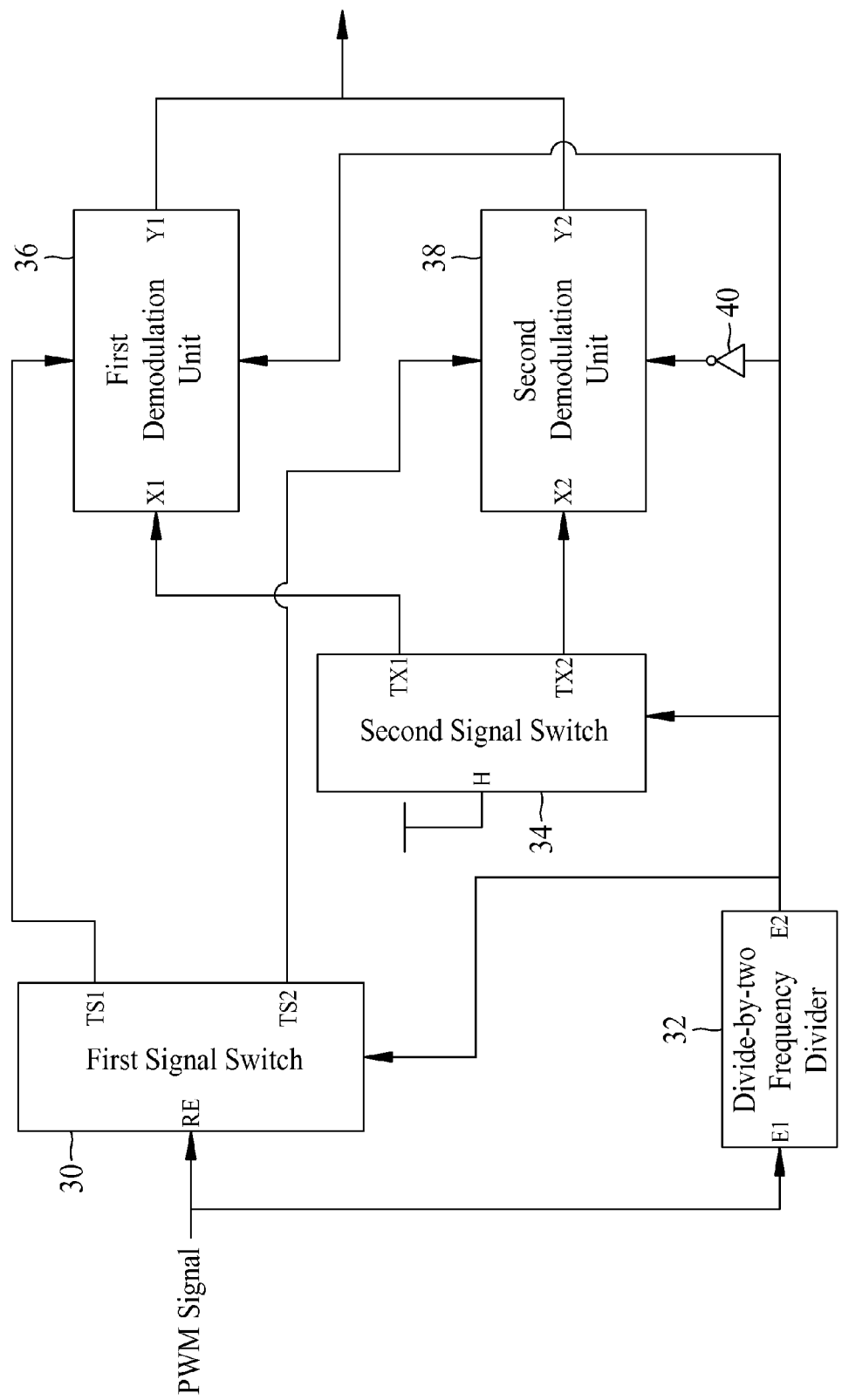
FIG. 5 is a block diagram of a receiver in accordance with an embodiment of the present disclosure.

FIG. 5 shows the receiver 2 in accordance with a second embodiment of the present invention. Referring to FIG. 5, the receiver 2 may include a first signal switch 30, a divide-by-two circuit 32, a second signal switch 34, a first demodulation unit 36, a second demodulation unit 38, and an inverter 40. The first signal switch 30 may be a demultiplexer (or called demuxer) or may include two or more switches. The first signal switch 30 and the divide-by-two circuit 32 have respective input ports RE and E1, (electrically) coupled to the transmitter 3 through the transmission path 4, for receiving the PWM signal output from the transmitter 3 via the transmission path 4. The divide-by-two circuit 32 has an output port E2 (electrically) coupled to the first signal switch 30, the second signal switch 34, the first demodulation unit 36, and the inverter 40. The divide-by-two circuit 32 is configured to or operable to generate an output signal, at its output port E2, having a frequency substantially half of that of an input signal (i.e., the PWM signal from the transmitter 3) received at its input port E1. The output signal generated at the output port E2 of the divide-by-two circuit 32 is transmitted to the first signal switch 30, the second signal switch 34, the first demodulation unit 36, and the inverter 40.

Figure 6A:
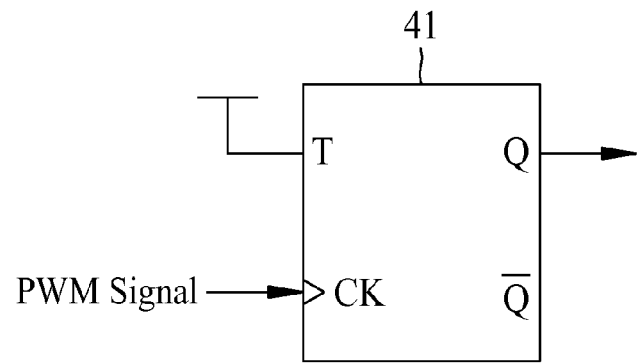
FIG. 6A is a schematic view of a T flip-flop.
Figure 6B:
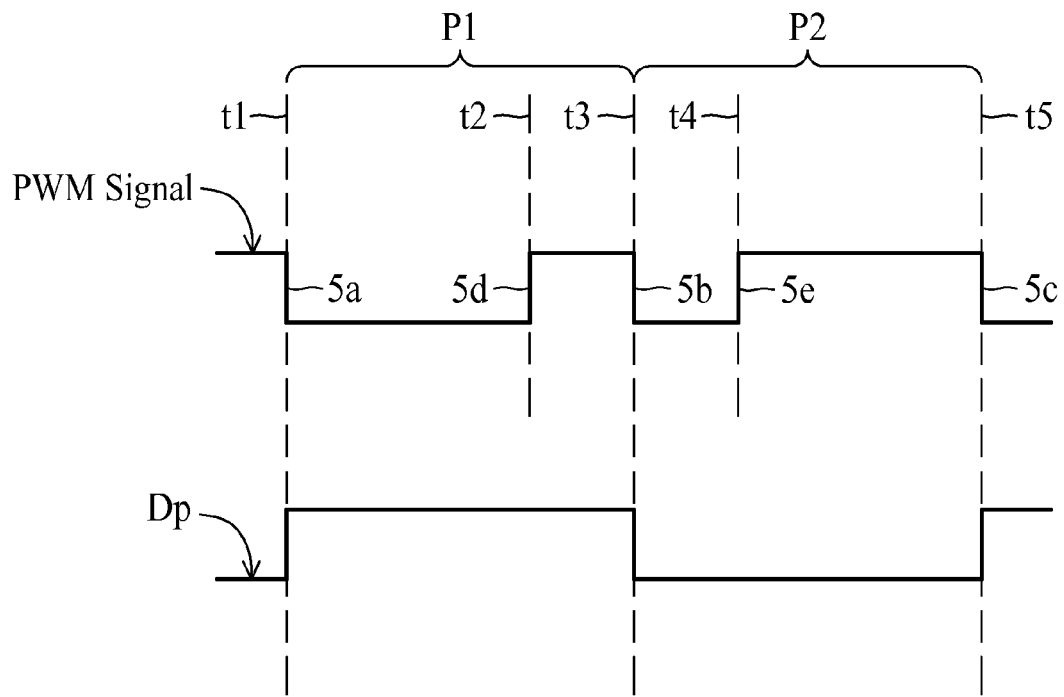
FIG. 6B shows two timing diagrams (or waveform graphs) of a PWM signal and a signal output from a divide-by-two circuit respectively, arranged from top to bottom, the timing diagrams showing logic levels of the two signals with respect to a timing.

As shown in FIG. 6A, the divide-by-two circuit 32 may be a falling-edge triggered T flip-flop 41. In the case, the falling edge-triggered T flip-flop 41 has (1) a clock input port CK, acting as the input port E1 of the divide-by-two circuit 32, for receiving the PWM signal (e.g., the PWM signal shown in FIGS. 1B and 6B) at its clock input port CK, (2) an output port Q, acting as the output port E2 of the divide-by-two circuit 32, for generating the output signal (e.g., an output signal Dp shown in FIG. 6B) at its output port Q, and (3) an input port T coupled to or connected to a power source. Since the falling edge-triggered T flip-flop 41 has the input port T (electrically) coupled to or connected to the power source, the input port T of the falling edge-triggered T flip-flop 41 is set to a logic level "1". Referring to FIGS. 6A and 6B, upon detecting the falling edges 5a, 5b and 5c of the PWM signal, the T flip-flop 41 triggers respective logic-level transitions of the output signal Dp at its output port Q. Accordingly, the output signal Dp has a frequency substantially half of that of the PWM signal, as shown in FIG. 6B. Alternatively, the divide-by-two circuit 32 may include a D flip-flop and an inverter.

Referring to FIG. 5, the first signal switch 30 has a first output port TS1 (electrically) coupled to the first demodulation unit 36 and a second output port TS2 (electrically) coupled to the second demodulation unit 38. Based on the output signal generated at the output port E2 of the divide-by-two circuit 32, the first signal switch 30 may be configured to or operable to pass the PWM signal from its input port RE to its first output port TS1 coupled to the first demodulation unit 36 or to its second output port TS2 coupled to the second demodulation unit 38. In other words, the output signal generated at the output port E2 of the divide-by-two circuit 32 may be configured to trigger the first signal switch 30 to pass the PWM signal from its input port RE to its first output port TS1 coupled to the first demodulation unit 36 or to its second output port TS2 coupled to the second demodulation unit 38.

In this embodiment, at a time point upon detecting that a change of a logic level from a logic level "0" to a logic level "1" occurs on the output signal generated at the output port E2 of the divide-by-two circuit 32 (i.e., upon detecting a rising edge of the output signal generated at the output port E2 of the divide-by-two circuit 32), the first signal switch 30 passes the PWM signal in a pulse period between two neighboring falling edges from its input port RE to its first output port TS1 coupled to the first demodulation unit 36 for duration of an interval of the pulse period. At a time point upon detecting that a change of a logic level from a logic level "1" to a logic level "0" occurs on the output signal generated at the output port E2 of the divide-by-two circuit 32 (i.e., upon detecting a falling edge of the output signal generated at the output port E2 of the divide-by-two circuit 32), the first signal switch 30 passes the PWM signal in a pulse period between two neighboring falling edges from its input port RE to its second output port TS2 coupled to the second demodulation unit 38 for duration of an interval of the pulse period.

As an example of the output signal Dp shown in FIG. 6B, at the time point t1 upon detecting that a first change of a logic level from a logic level "0" to a logic level "1" occurs on the output signal Dp, the first signal switch 30 passes the PWM signal shown in FIG. 6B from its input port RE to its first output port TS1 coupled to the first demodulation unit 36 until the first signal switch 30 detects that a second change of a logic level, after and next to the first change of a logic level, from a logic level "1" to a logic level "0" occurs on the output signal Dp at the time point t3, i.e., for duration of the time interval between the time points t1 and t3. At the time point t3 upon detecting that the second change of a logic level from a logic level "1" to a logic level "0" occurs on the output signal Dp, the first signal switch 30 passes the PWM signal shown in FIG. 6B from its input port RE to its second output port TS2 coupled to the second demodulation unit 38 until the first signal switch 30 detects that a third change of a logic level, after and next to the second change of a logic level, from a logic level "0" to a logic level "1" occurs on the output signal Dp at the time point t5, i.e., for duration of the time interval between the time points t3 and t5. At the time point t5 upon detecting that the third change of a logic level from a logic level "0" to a logic level "1" occurs on the output signal Dp, the first signal switch 30 passes the PWM signal shown in FIG. 6B from its input port RE to its first output port TS1 coupled to the first demodulation unit 36 until the first signal switch 30 detects that a fourth change of a logic level, after and next to the third change of a logic level, from a logic level "1" to a logic level "0" occurs on the output signal Dp at a time point when the divide-by-two circuit 32 detects a falling edge of the PWM signal shown in FIG. 6B at an end of a pulse period after and next to the pulse period P2.

Referring to FIG. 5, the second signal switch 34 has an input port H (electrically) coupled to or connected to a power source so as to receive a signal of a fixed logic level, i.e., a signal of a logic level "1" (or a signal of a high logic level), at its input port H. The second signal switch 34 has a first output port TX1 (electrically) coupled to the first demodulation unit 36 and a second output port TX2 (electrically) coupled to the second demodulation unit 38. Based on the output signal generated at the output port E2 of the divide-by-two circuit 32, the second signal switch 34 may be configured to or operable to pass the signal of a logic level "1" from its input port H to its first output port TX1 coupled to an input port X1 of the first demodulation unit 36 or to its second output port TX2 coupled to an input port X2 of the second demodulation unit 38. In other words, the output signal generated at the output port E2 of the divide-by-two circuit 32 may be configured to trigger the second signal switch 34 to pass the signal of a logic level "1" from its input port H to its first output port TX1 coupled to the input port X1 of the first demodulation unit 36 or to its second output port TX2 coupled to the input port X2 of the second demodulation unit 38.

In this embodiment, at a time upon detecting that a change of a logic level from a logic level "0" to a logic level "1" occurs on the output signal generated at the output port E2 of the divide-by-two circuit 32, the second signal switch 34 passes the signal of a logic level "1" from its input port H to its first output port TX1 coupled to the input port X1 of the demodulation unit 36 for duration of an interval of a pulse period of the PWM signal. At a time point upon detecting that a change of a logic level from a logic level "1" to a logic level "0" occurs on the output signal generated at the output port E2 of the divide-by-two circuit 32, the second signal switch 34 passes the signal of a logic level "1" from its input port H to its second output port TX2 coupled to the input port X2 of the demodulation unit 38 for duration of an interval of a pulse period of the PWM signal.

As an example of the output signal Dp shown in FIG. 6B, at the time point t1 upon detecting that the first change of a logic level occurs on the output signal Dp, the second signal switch 34 passes a logic level "1" from its input port H to its first output port TX1 coupled to the input port X1 of the demodulation unit 36 until the second signal switch 34 detects that the second change of a logic level occurs on the output signal Dp at the time point t3, i.e., for duration of the time interval between the time points t1 and t3. At the time point t3 upon detecting that the second change of a logic level occurs on the output signal Dp, the second signal switch 34 passes a logic level "1" from its input port H to its second output port TX2 coupled to the input port X2 of the demodulation unit 38 until the second signal switch 34 detects that the third change of a logic level occurs on the output signal Dp, i.e., for duration of the time interval between the time points t3 and t5. At the time point t5 upon detecting that the third change of a logic level occurs on the output signal Dp, the second signal switch 34 passes a logic level "1" from its input port H to its first output port TX1 coupled to the input port X1 of the demodulation unit 36 until the second signal switch 34 detects that the fourth change of a logic level occurs on the output signal Dp at the time point when the divide-by-two circuit 32 detects a falling edge of the PWM signal shown in FIG. 6B at an end of a pulse period after and next to the pulse period P2.

According to the above description of the first and second signal switches 30 and 34, the two demodulation units 36 and 38 alternately demodulate or decode multiple pulse periods (e.g., including multiple first pulse periods and multiple second pulse periods) of the PWM signal transmitted from the transmitter 3 so as to alternately generate demodulated or decoded results (e.g., binary logic signals). The demodulated or decoded results are alternately generated at an output port Y1 of the demodulation unit 36 and at an output port Y2 of the demodulation unit 38. The first pulse periods are alternately with the second pulse periods. The receiver 2 may obtain multiple binary values or symbols of data modulated on (or encoded on) the pulse periods of the PWM signal transmitted from the transmitter 3 based on the demodulated or decoded results generated at the output ports Y1 and Y2 of the respective demodulation units 36 and 38.

Figure 7A:
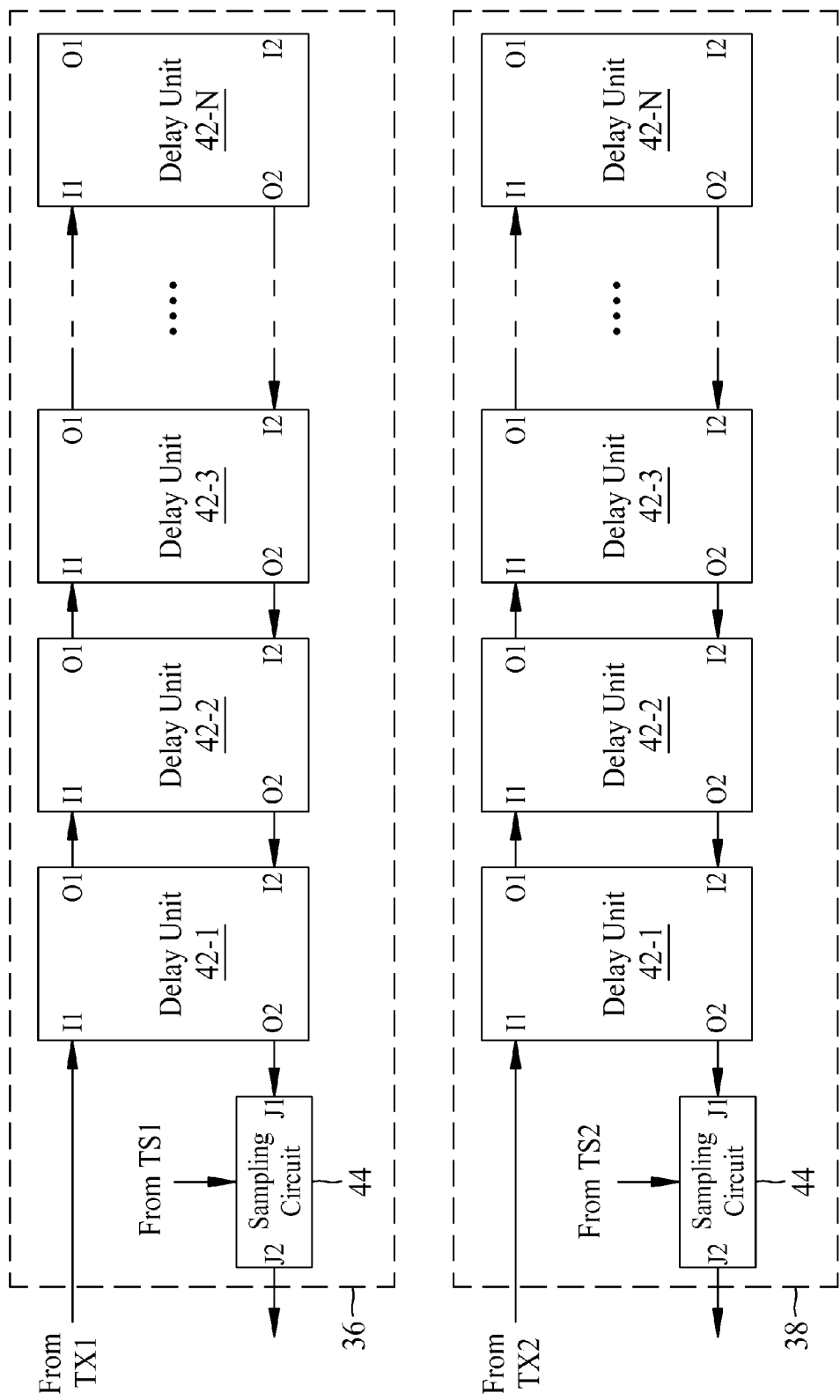
FIG. 7A shows two block diagrams of first and second demodulation units respectively.

Referring to FIG. 7A, each of the first and second demodulation units 36 and 38 may include multiple delay units 42-1 through 42-N and a sampling circuit 44. The delay units 42-1 through 42-N are coupled to one another in series. Each of the delay units 42-1 through 42-N has two input ports I1 and I2 and two output ports O1 and O2. The number of the delay units 42-1 through 42-N in each of the demodulation units 36 and 38 may be greater than or equal to 5, 10, 15, 20, or 60, such as between 60 and 600. The sampling circuit 44 has an input port J1, (electrically) coupled to the output port O2 of the first delay unit 42-1, and an output port J2.

The delay unit 42-1 of the first demodulation unit 36 has the input port I1, acting as the input port X1 of the first demodulation unit 36, (electrically) coupled to the first output port TX1 of the second signal switch 34, and the sampling circuit 44 of the first demodulation unit 36 has the output port J2 acting as the output port Y1 of the first demodulation unit 36 and has an input port for receiving the PWM signal in the first pulse periods, such as the PWM signal in the pulse period P1, from the output port TS1 of the first signal switch 30. The delay unit 42-1 of the second demodulation unit 38 has the input port I1, acting as the input port X2 of the second demodulation unit 38, (electrically) coupled to the second output port TX2 of the second signal switch 34, and the sampling circuit 44 of the second demodulation unit 38 has the output port J2 acting as the output port Y2 of the second demodulation unit 38 and has an input port for receiving the PWM signal in the second pulse periods, such as the PWM signal in the pulse period P2, from the output port TS2 of the first signal switch 30.

For the first demodulation unit 36, upon detecting a falling edge of the PWM signal, at an end of one of the first pulse periods, from the output port TS1 of the first signal switch 30, its sampling circuit 44 samples or determines a logic level at its input port J1 coupled to the output port O2 of its first delay unit 42-1 so as to generate a sampled or determined result (i.e., a demodulated or decoded result), such as a logic signal, at its output port J2 having information associated with the PWM signal in said one of the first pulse periods. For the second demodulation unit 38, upon detecting a falling edge of the PWM signal, at an end of one of the second pulse periods, from the output port TS2 of the first signal switch 30, its sampling circuit 44 samples or determines a logic level at its input port J1 coupled to the output port O2 of its first delay unit 42-1 so as to generate a sampled or determined result (i.e., a demodulated or decoded result), such as a logic signal, at its output port J2 having information associated with the PWM signal in said one of the second pulse periods. For instance, the sampling circuit 44 may generate a signal of a logic level "0" (i.e., the sampled or determined result) at its output port J2 if sampling or determining a logic level "0" at its input port J1 coupled to the output port O2 of the first delay unit 42-1, or may generate a signal of a logic level "1" (i.e., the sampled or determined result) at its output port J2 if sampling or determining a logic level "1" at its input port J1 coupled to the output port O2 of the first delay unit 42-1. The sampled or determined result generated at the output port J2 of the sampling circuit 44 represents a value (e.g., a binary value or symbol "0" or "1") of data modulated on (or encoded on) a pulse period of the PWM signal. For each of the first and second demodulation units 36 and 38, at the time point of detecting a falling edge of the PWM signal at an end of a corresponding one of the first and second pulse periods, a logic level "1" generated at the output port J2 of its sampling circuit 44 represents a binary value or symbol of 1 modulated on the PWM signal in said corresponding one of the first and second pulse periods, or a logic level "0" generated at the output port J2 of its sampling circuit 44 represents a binary value or symbol of 0 modulated on the PWM signal in said corresponding one of the first and second pulse periods.

Referring to FIG. 7A, each of the delay units 42-2 through 42-N includes the input port I1 coupled to the output port O1 of a corresponding one of the delay units 42-1 through 42-(N−1) at the previous stage of said each of the delay units 42-2 through 42-N and includes the output port O2 coupled to the input port I2 of the corresponding one of the delay units 42-1 through 42-(N−1) at the previous stage of said each of the delay units 42-2 through 42-N. For each of the delay units 42-1 through 42-N, upon a period of time (e.g., the period of time Td depicted in FIGS. 4A and 4B or a period of time Dt depicted in FIGS. 9A and 9B) after being received at its input port I1, a signal is passed to its output port O1; upon a period of time (e.g., the period of time Td or Dt) after being received at its input port I2, a signal is passed to its output port O2.

Figure 7B:
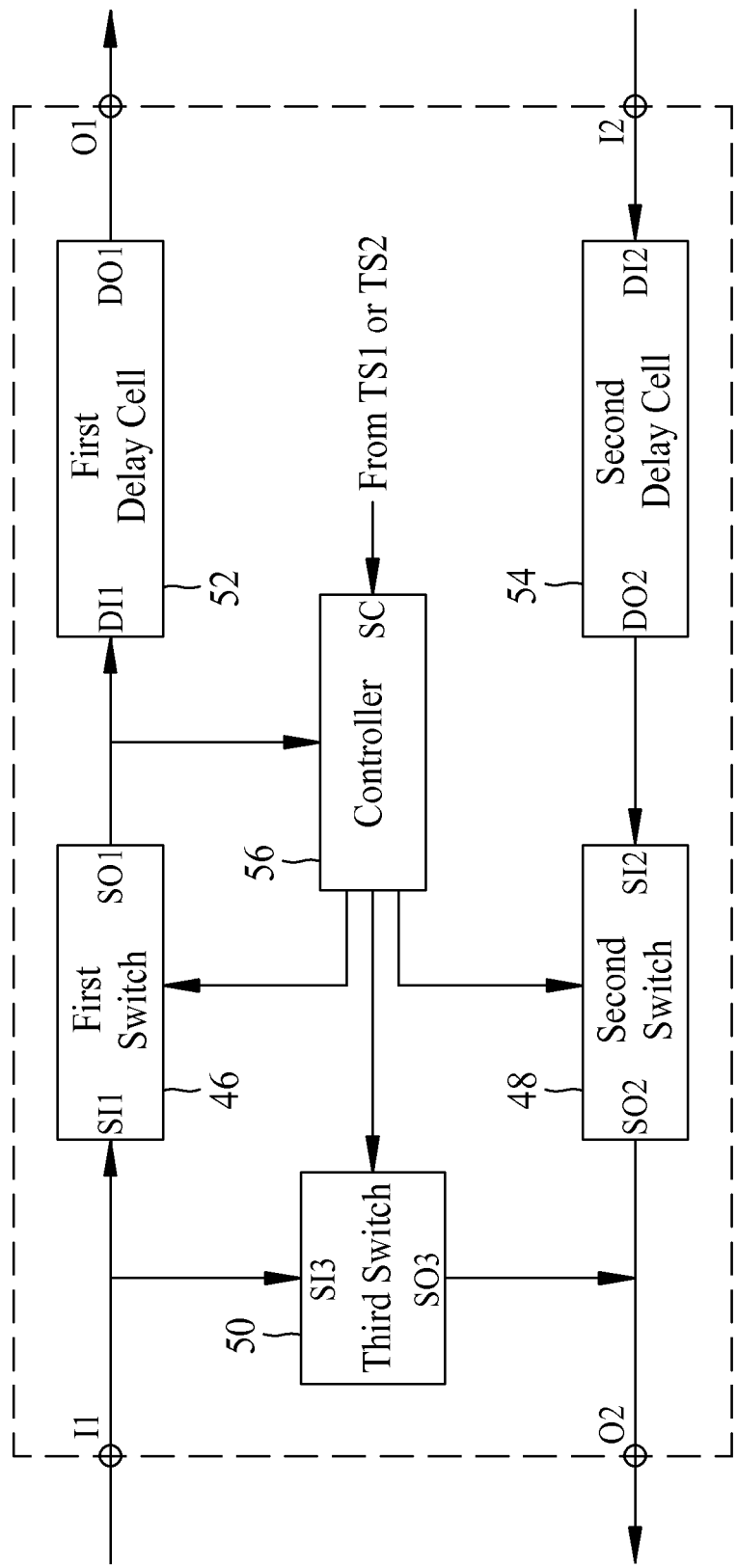
FIG. 7B is a block diagram of a delay cell.

FIG. 7B is a block diagram illustrating each of the delay units 42-1 through 42-N. Referring to FIGS. 7A and 7B, each of the delay units 42-1 through 42-N includes a first switch 46, a second switch 48, a third switch 50, a first delay cell 52, a second delay cell 54, and a controller 56. The first switch 46 includes an input port SI1 coupled to an input port SI3 of the third switch 50 and includes an output port SO1 coupled to an input port DI1 of the first delay cell 52 and an input port of the controller 56. The second switch 48 includes an input port SI2 coupled to an output port DO2 of the second delay cell 54 and includes an output port SO2 coupled to an output port SO3 of the third switch 50. Each of the first delay cells 52 of the delay units 42-1 through 42-N may be configured to or operable to delay the signal of a logic level "1", transmitted from the second signal switch 34 to its input port DI1, for the same period of time (e.g., the period of time Dt) as its output at its output port DO1. Each of the second delay cells 54 of the delay units 42-1 through 42-N may be configured to or operable to delay the signal of a logic level "1", transmitted from the second signal switch 34 through at least some of the first delay cells 52 to its input port DI2, for the same period of time (e.g., the period of time Dt) as its output at its output port DO2.

Each controller 56 of the delay units 42-1 through 42-N of the first demodulation unit 36 may receive the PWM signal in the first pulse periods from the output port TS1 of the first signal switch 30 at its input port SC such that first demodulation unit 36 may demodulate the PWM signal in the first pulse periods. Each controller 56 of the delay units 42-1 through 42-N of the second demodulation unit 38 may receive the PWM signal in the second pulse periods from the output port TS2 of the first signal switch 30 at its input port SC such that the second demodulation unit 38 may demodulate the PWM signal in the second pulse periods. The first and second demodulation units 36 and 38 may alternately demodulate or decode the PWM signal in the first and second pulse periods. When the second demodulation unit 38 demodulates or decodes the PWM signal in each of the second pulse periods, such as the pulse period P2, the first demodulation unit 36 may reset a logic level at the output port DO1 of each first delay cell 52 thereof to a logic level "0" and reset a logic level at the output port DO2 of each second delay cell 54 thereof to a logic level "0". When the first demodulation unit 36 demodulates or decodes the PWM signal in each of the first pulse periods, such as the pulse period P1, the second demodulation unit 38 may reset a logic level at the output port DO1 of each first delay cell 52 thereof to a logic level "0" and reset a logic level at the output port DO2 of each second delay cell 54 thereof to a logic level "0". Accordingly, at the beginning of each of the first and second demodulation units 36 and 38 demodulating or decoding the PWM signal output from the transmitter 3, each of its first delay cells 52 has the output port DO1 having been reset to a logic level "0" opposite to that of the signal, i.e., logic level "1", received at the input port H of the second signal switch 34, and each of its second delay cells 54 has the output port DO2 having been reset to a logic level "0" opposite to that of the signal, i.e., logic level "1", received at the input port H of the second signal switch 34.

With regards to each of the delay units 42-1 through 42-N of the first demodulation unit 36 before demodulating or decoding the PWM signal in one of the first pulse periods, upon detecting a logic-level transition of the PWM signal in one of the second pulse periods just before said one of the first pulse periods, such as a rising edge of the PWM signal in a pulse period just before the pulse period P1, or at the end of said one of the second pulse periods, such as the falling edge 5a of the PWM signal at the time point t1, at its input port SC, the controller 56 sets the first switch 46 to be switched on (i.e., the first switch 46 has a connection between its input port SI1 and its output port SO1) to pass its input at its input port SI1 to its output at its output port SO1 through a channel of the first switch 46, sets the second switch 48 to be switched off (i.e., the second switch 48 has no connection between its input port SI2 and its output port SO2) not to pass its input at its input port SI2 to its output at its output port SO2 through a channel of the second switch 48, and sets the third switch 50 to be switched off (i.e., the third switch 50 has no connection between its input port SI3 and its output port SO3) not to pass its input at its input port SI3 to its output at its output port SO3 through a channel of the third switch 50. Accordingly, with regards to the first demodulation unit 36, before the first demodulation unit 36 demodulates or decodes the PWM signal in the first pulse periods, all of the first switches 46 of the delay units 42-1 through 42-N may be controlled to be switched on, and thus a sequential coupling of the first delay cells 52 of the delay units 42-1 through 42-N arranged in series may form or compose a first signal path in the first demodulation unit 36 such that the signal of a logic level "1" propagates from the output port TX1 of the second signal switch 34 along the first signal path in the first demodulation unit 36 when the controllers 56 of first demodulation unit 36 receive the PWM signal in the first pulse periods at their input ports SC. Each of the first delay cells 52 of the first demodulation unit 36 may delay its input at its input port DI1 for the same period of time (e.g., the period of time Dt) as its output at its output port DO1 to change a logic level at its output port DO1 from a logic level "0", reset when the first signal switch 30 has the PWM signal in the second pulse periods to be passed from its input port RE to its output port TS2 coupled to the input port SC of each controller 56 of the delay units 42-1 through 42-N of the second demodulation unit 38, to a logic level "1".

With regards to each of the delay units 42-1 through 42-N of the second demodulation unit 38 before demodulating or decoding the PWM signal in one of the second pulse periods, upon detecting a logic-level transition of the PWM signal in one of the first pulse periods just before said one of the second pulse periods, such as the rising edge 5d of the PWM signal in the pulse period P1 at the time point t2, or at the end of said one of the first pulse periods, such as the falling edge 5b of the PWM signal at the time point t3, at its input port SC, the controller 56 sets the first switch 46 to be switched on (i.e., the first switch 46 has a connection between its input port SI1 and its output port SO1) to pass its input at its input port SI1 to its output at its output port SO1 through a channel of the first switch 46, sets the second switch 48 to be switched off (i.e., the second switch 48 has no connection between its input port SI2 and its output port SO2) not to pass its input at its input port SI2 to its output at its output port SO2 through a channel of the second switch 48, and sets the third switch 50 to be switched off (i.e., the third switch 50 has no connection between its input port SI3 and its output port SO3) not to pass its input at its input port SI3 to its output at its output port SO3 through a channel of the third switch 50. Accordingly, with regards to the second demodulation unit 38, before the second demodulation unit 38 demodulates or decodes the PWM signal in the second pulse periods, all of the first switches 46 of the delay units 42-1 through 42-N may be controlled to be switched on, and thus a sequential coupling of the first delay cells 52 of the delay units 42-1 through 42-N arranged in series may form or compose another first signal path in the second demodulation unit 38 such that the signal of a logic level "1" propagates from the output port TX2 of the second signal switch 34 along the first signal path in the second demodulation unit 38 when the controllers 56 of second demodulation unit 38 receive the PWM signal in the second pulse periods at their input ports SC. Each of the first delay cells 52 of the second demodulation unit 38 may delay its input at its input port DI1 for the same period of time (e.g., the period of time Dt) as its output at its output port DO1 to change a logic level at its output port DO1 from a logic level "0", reset when the first signal switch 30 has the PWM signal in the first pulse periods to be passed from its input port RE to its output port TS1 coupled to the input port SC of each controller 56 of the delay units 42-1 through 42-N of the first demodulation unit 36, to a logic level "1".

Referring to FIG. 7B, with regards to each of the delay units 42-1 through 42-N of the first demodulation unit 36 when demodulating or decoding the PWM signal in one of the first pulse periods, upon detecting a logic-level transition of the PWM signal in said one of the first pulse periods, such as the rising edge 5d of the PWM signal in the pulse period P1 at the time point t2 (i.e., a logic-level transition of the PWM signal from a logic level "0" to a logic level "1"), at its input port SC, the controller 56 may control the first, second and third switches 46, 48 and 50 to be switched on or off for operating in first and second cases as mentioned below.

Referring to FIG. 7B, in the first case of detecting that the output port SO1 of the first switch 46 has a logic level "1" (which is the same as the logic level of the signal received at the input port H of the second signal switch 34), the controller 56 sets (1) the first switch 46 to be switched on (i.e., the first switch 46 has a connection between its input port SI1 and its output port SO1) to pass its input at its input port SI1 to its output at its output port SO1 through the channel of the first switch 46, (2) the second switch 48 to be switched on (i.e., the second switch 48 has a connection between its input port SI2 and its output port SO2) to pass its input at its input port SI2 to its output at its output port SO2 through the channel of the second switch 48, and (3) the third switch 50 to be switched off (i.e., the third switch 50 has no connection between its input port SI3 and its output port SO3) not to pass its input at its input port SI3 to its output at its output port SO3 through the channel of the third switch 50. In the second case of detecting that the output port SO1 of the first switch 46 has a logic level "0" (which is different from the logic level of the signal received at the input port H of the second signal switch 34), the controller 56 sets (1) the first switch 46 to be switched off (i.e., the first switch 46 has no connection between its input port SI1 and its output port SO1) not to pass its input at its input port SI1 to its output at its output port SO1 through the channel of the first switch 46, (2) the second switch 48 to be switched off (i.e., the second switch 48 has no connection between its input port SI2 and its output port SO2) not to pass its input at its input port SI2 to its output at its output port SO2 through the channel of the second switch 48, and (3) the third switch 50 to be switched on (i.e., the third switch 50 has a connection between its input port SI3 and its output port SO3) to pass its input at its input port SI3 to its output at its output port SO3 through the channel of the third switch 50.

Accordingly, referring to FIGS. 7A and 7B, each of the delay units 42-2 through 42-N includes its first delay cell 52 provided with the input port DI1 coupled to its first switch 46 configured to be switched on or off to lead the input port DI1 of its first delay cell 52 to be connected to or disconnected from the output port DO1 of the first delay cell 52 of a corresponding one of the delay units 42-1 through 42-(N−1) at the previous stage of said each of the delay units 42-2 through 42-N. Each of the delay units 42-2 through 42-N includes its second delay cell 54 provided with the output port DO2 coupled to its second switch 48 configured to be switched on or off to lead the output port DO2 of its second delay cell 54 to be connected to or disconnected from the input port DI2 of the second delay cell 54 of a corresponding one of the delay units 42-1 through 42-(N−1) at the previous stage of said each of the delay units 42-2 through 42-N. Each of the delay units 42-1 through 42-(N−1) includes its first delay cell 52 provided with the output port DO1 coupled to the third switch 50 of a corresponding one of the delay units 42-2 through 42-N at the next stage of said each of the delay units 42-1 through 42-(N−1) configured to be switched on or off to lead the output port DO1 of its first delay cell 52 to be connected to or disconnected from the input port DI2 of its second delay cell 54. As an example of the delay units 42-2 and 42-3, the delay unit 42-2 is at the previous stage of the delay unit 42-3, and the delay unit 42-3 is at the next stage of the delay unit 42-2.

Referring to FIG. 7B, with regards to the first demodulation unit 36 when demodulating or decoding the PWM signal in one of the first pulse periods, upon each controller 56 detecting a logic-level transition of the PWM signal in said one of the first pulse periods, such as the rising edge 5d of the PWM signal in the pulse period P1 at the time point t2, at its input port SC, the controllers 56 of the delay units 42-1 through 42-N operating in the first case may set their first switches 46 to be switched on to form a sequential coupling of the first delay cells 52 of the delay units 42-1 through 42-N operating in the first case, arranged in series, as a forward signal path in the first demodulation unit 36 and set their second switches 48 to be switched on to form a sequential coupling of the second delay cells 54 of the delay units 42-1 through 42-N operating in the first case, arranged in series, as a backward signal path in the first demodulation unit 36, and one of the delay units 42-1 through 42-N operating in the second case, at the next stage of one of the delay units 42-1 through 42-N operating in the first case at the last stage, may be provided with the controller 56 configured to set its third switch 48 to be switched on to couple the forward signal path to the backward signal path so as to form or compose a second signal path in the first demodulation unit 36. Accordingly, the signal of a logic level "1" may propagate from the output port TX1 of the second signal switch 34 along the second signal path in the first demodulation unit 36 when the controllers 56 of first demodulation unit 36 receive the PWM signal in the first pulse periods at their input ports SC, and each of the second delay cells 54 of the delay units 42-1 through 42-N operating in the first case may delay its input at its input port DI2 for the same period of time (e.g., the period of time Dt) as its output at its output port DO2 to change a logic level at its output port DI2 from a logic level "0", reset when the first signal switch 30 has the PWM signal in the second pulse periods to be passed from its input port RE to its output port TS2 coupled to the input port SC of each controller 56 of the delay units 42-1 through 42-N of the second demodulation unit 38, to a logic level "1".

Referring to FIG. 7B, with regards to each of the delay units 42-1 through 42-N of the second demodulation unit 38 when demodulating or decoding the PWM signal in one of the second pulse periods, upon detecting a logic-level transition of the PWM signal in said one of the second pulse periods, such as the rising edge 5e of the PWM signal in the pulse period P2 at the time point t4, at its input port SC, the controller 56 may control the first, second and third switches 46, 48 and 50 to be switched on or off for operating in the first and second cases as mentioned above. With regards to the second demodulation unit 38 when demodulating or decoding the PWM signal in one of the second pulse periods, upon each controller 56 detecting a logic-level transition of the PWM signal in said one of the second pulse periods at its input port SC, the controllers 56 of the delay units 42-1 through 42-N operating in the first case may set their first switches 46 to be switched on to form a sequential coupling of the first delay cells 52 of the delay units 42-1 through 42-N operating in the first case, arranged in series, as another forward signal path in the second demodulation unit 38 and set their second switches 48 to be switched on to form a sequential coupling of the second delay cells 54 of the delay units 42-1 through 42-N operating in the first case, arranged in series, as another backward signal path in the second demodulation unit 38, and one of the delay units 42-1 through 42-N operating in the second case, at the next stage of one of the delay units 42-1 through 42-N operating in the first case at the last stage, may be provided with the controller 56 configured to set its third switch 48 to be switched on to couple the another forward signal path to the another backward signal path so as to form a second signal path in the second demodulation unit 38. Accordingly, the signal of a logic level "1" may propagate from the output port TX2 of the second signal switch 34 along the second signal path in the second demodulation unit 38 when the controllers 56 of second demodulation unit 38 receive the PWM signal in the second pulse periods at their input ports SC, and each of the second delay cells 54 of the delay units 42-1 through 42-N operating in the first case may delay its input at its input port DI2 for the same period of time (e.g., the period of time Dt) as its output at its output port DO2 to change a logic level at its output port DI2 from a logic level "0", reset when the first signal switch 30 has the PWM signal in the first pulse periods to be passed from its input port RE to its output port TS1 coupled to the input port SC of each controller 56 of the delay units 42-1 through 42-N of the first demodulation unit 36, to a logic level "1".

Referring to FIG. 7B, the following describes the first demodulation unit 36 demodulating or decoding the PWM signal in one of the first pulse periods, such as the pulse period P1 as shown in FIG. 6B. For duration of the time interval between the two logic-level transitions 5a and 5d of the PWM signal at the respective time points t1 and t2, each of the first switches 46 of the delay units 42-1 through 42-N is controlled by the corresponding controller 56 of the delay units 42-1 through 42-N to be switched on (i.e., each first switch 46 of the delay units 42-1 through 42-N has a connection between its input port SI1 and its output port SO1) to pass its input at its input ports SI1 to its output at its output port SO1 through its channel, each of the second switches 48 of the delay units 42-1 through 42-N is controlled by the corresponding controller 56 of the delay units 42-1 through 42-N to be switched off (i.e., each second switch 48 of the delay units 42-1 through 42-N has no connection between its input port SI2 and its output port SO2) not to pass its input at its input port SI2 to its output at its output port SO2 through its channel, and each of the third switches 50 of the delay units 42-1 through 42-N is controlled by the corresponding controller 56 of the delay units 42-1 through 42-N to be switched off (each third switch 50 of the delay units 42-1 through 42-N has no connection between its input port SI3 and its output port SO3) not to pass its input at its input port SI3 to its output at its output port SO3 through its channel. As a result, for duration of the time interval between the two logic-level transitions 5a and 5d of the PWM signal at the respective time points t1 and t2, all of the first delay cells 52 of the delay units 42-1 through 42-N are connected to one another in series since all of the first switches 46 of the delay units 42-1 through 42-N are controlled to be switched on so as to form or compose the first signal path in the first demodulation unit 36. Thereby, for duration of the time interval between the two logic-level transitions 5a and 5d of the PWM signal at the respective time points t1 and t2, the signal of a logic level "1" propagates from the output port TX1 of the second signal switch 34 along the first signal path to replace one by one with a delay of the same first period of time (e.g., the period of time Dt depicted in FIGS. 9A and 9B) the logic level "0" at the output ports DO1 of the first delay cells 52. During the propagation of the signal of a logic level "1" along the first signal path, each of the first delay cells 52 of the delay units 42-1 through 42-N may be configured to or operable to delay the signal of a logic level "1" for the same first period of time, such as the period of time Dt, from its input port DI1 to its output port DO1.

Upon detecting the rising edge 5d of the PWM signal (i.e., a logic-level transition of the PWM signal from a logic level "0" to a logic level "1") at the time point t2 at its input port SC, each controller 50 of the delay units 42-1 through 42-N controls its first, second and third switches 46, 48 and 50 to be switched on or off based on the logic level at the output port SO1 of its first switch 46, as mentioned above.

In this example, in the case that a delay unit 42-E, which is one of the delay units 42-1 through 42-N of the first demodulation unit 36, has a logic level at the output port DO1 of its first delay cell 52 having been changed from the logic level "0" to the logic level "1" but a delay unit 42-F, which is another of the delay units 42-1 through 42-N of the first demodulation unit 36 and at the next stage of the delay unit 42-E, has a logic level at the output port DO1 of its first delay cell 52 having not been changed from the logic level "0" to the logic level "1" but remaining at the logic level "0", each of the first and second switches 46 and 48 of the delay units 42-1 through 42-E is controlled to be switched on (i.e., each first switch 46 of the delay units 42-1 through 42-E has a connection between its input port SI1 and its output port SO1, and each second switch 48 of the delay units 42-1 through 42-E has a connection between its input port SI2 and its output port SO2) for duration of the time interval between the two logic-level transitions 5d and 5b of the PWM signal at the respective time points t2 and t3, and each of the third switches 50 of the delay units 42-1 through 42-E is controlled to be switched off (i.e., each third switch 50 of the delay units 42-1 through 42-E has no connection between its input port SI3 and its output port SO3) for duration of the time interval between the two logic-level transitions 5d and 5b of the PWM signal at the respective time points t2 and t3. Each of the first and second switches 46 and 48 of the delay units 42-F through 42-N is controlled to be switched off (i.e., each first switch 46 of the delay units 42-F through 42-N has no connection between its input port SI1 and its output port SO1, and each second switch 48 of the delay units 42-F through 42-N has no connection between its input port SI2 and its output port SO2) for duration of the time interval between the two logic-level transitions 5d and 5b of the PWM signal at the respective time points t2 and t3, and each of the third switches 50 of the delay units 42-F through 42-N is controlled to be switched on (i.e., each third switch 50 of the delay units 42-F through 42-N has a connection between its input port SI3 and its output port SO3) for duration of the time interval between the two logic-level transitions 5d and 5b of the PWM signal at the respective time points t2 and t3.

Accordingly, for duration of the time interval between the two logic-level transitions 5d and 5b of the PWM signal at the respective time points t2 and t3, the output port DO1 of the first delay cell 52 of the delay unit 42-E is disconnected from the input port DI1 of the first delay cell 52 of the delay unit 42-F since the delay unit 42-F has the first switch 46 to be switched off to break a connection between the output port DO1 of the first delay cell 52 of the delay unit 42-E and the input port DI1 of the first delay cell 52 of the delay unit 42-F, the input port DI2 of the second delay cell 54 of the delay unit 42-E is disconnected from the output port DO2 of the second delay cell 54 of the delay unit 42-F since the delay unit 42-F has the second switch 48 to be switched off to break a connection between the input port DI2 of the second delay cell 54 of the delay unit 42-E and the output port DO2 of the second delay cell 54 of the delay unit 42-F, and the delay unit 42-F has the third switch 50 to be switched on to couple the output port DO1 of the first delay cell 52 of the delay unit 42-E to the input port DI2 of the second delay cell 54 of the delay unit 42-E. In addition, for duration of the time interval between the two logic-level transitions 5d and 5b of the PWM signal at the respective time points t2 and t3, the delay units 42-1 through 42-E have the first switches 46 to be switched on to lead all of the first delay cells 52 of the delay units 42-1 through 42-E to be coupled to one another in series so as to form the forward signal path, and the delay units 42-1 through 42-E have the second switches 48 to be switched on to lead all of the second delay cells 54 of the delay units 42-1 through 42-E to be coupled to one another in series so as to form the backward signal path. The delay unit 42-F, at the next stage of the delay unit 42-E, sets the third switch 48 to be switched on to couple the forward signal path to the backward signal path so as to form the second signal path in the first demodulation unit 36. The signal of a logic level "1" propagates from the output port TX1 of the second signal switch 34 along the second signal path.

At and immediately after the rising edge 5d of the PWM signal at the time point t2, the signal of a logic level "1" propagating from the output port TX1 of the second signal switch 34 along the first signal path, i.e. the forward signal path of the second signal path, to the output port DO1 of the first delay cell 52 of the delay unit 42-E passes through the third switch 50 of the delay unit 42-F to the input port DI2 of the second delay cell 54 of the delay unit 42-E. Next, the signal of a logic level "1" may propagate from the second delay cell 54 of the delay unit 42-E in the direction to the second delay cell 54 of the delay unit 42-1 along the backward signal path. Thereby, for duration of the time interval between the two logic-level transitions 5d and 5b of the PWM signal at the respective time points t2 and t3, the signal of a logic level "1" propagates from the output port DO1 of the first delay cell 52 of the delay unit 42-E along the backward signal path through the third switch 50 of the delay unit 42-F to replace one by one with a delay of the same second period of time (e.g., the period of time Dt depicted in FIGS. 9A and 9B) the logic level "0" at the output ports DO2 of the second delay cells 54 in the backward signal path, wherein the second period of time is the same as the first period of time. During the propagation of the signal of a logic level "1" along the second signal path, each of the second delay cells 54 of the delay units 42-1 through 42-E may be configured to or operable to delay the signal of a logic level "1" for the same second period of time, such as the period of time Dt, from its input port DI2 to its output port DO2.

Subsequently, referring to FIGS. 7A and 7B, upon detecting the falling edge 5b of the PWM signal from the output port TS1 of the first signal switch 30 at the time point t3, the sampling circuit 44 of the first demodulation unit 36 has an input at its input port J1 coupled to the output port DO2 of the second delay cell 54 of the delay unit 42-1 to sample or determine a logic level at the output port O2 of the delay unit 42-1 of the first demodulation unit 36 as an output, i.e., a sampled or determined result, at its output J2. In this example, the PWM signal in the pulse period P1 has a first portion in a first time interval between the falling edge 5a at the time point t1 and the rising edge 5d at the time point t2 and a second portion in a second time interval between the rising edge 5d at the time point t2 and the falling edge 5b at the time point t3, wherein a first time span for the first time interval is greater than a second time span for the second time interval. Thus, the number of the first delay cells 52 in the forward signal path, along which the logic level "1" propagates for the first time span, is greater than that of the second delay cells 54 in the backward signal path, along which the logic level "1" propagates for the second span time span. Upon the sampling circuit 44 detecting the falling edge 5b of the PWM signal from the output port TS1 of the first signal switch 30 at the time point t3, the sampling circuit 44 generates the sampled or determined result of a logic level "0" at its output port J2 since the logic level "1" has not propagated to the output port SO2 of the delay unit 42-1 and the output port SO2 of the delay unit 42-1 remains at the logic level "0" reset when the first signal switch 30 has the PWM signal in one of the second pulse periods before and next to the pulse period P1 to be passed from its input port RE to its output port TS2 coupled to the input port SC of each controller 56 of the delay units 42-1 through 42-N of the second demodulation unit 38. Accordingly, the receiver 2 obtains a value (i.e., a binary value or symbol of 0 in this example) of data modulated on (or encoded on) the PWM signal in the pulse period P1 at the time interval between the time points t1 and t3 based on the sampled or determined result generated at the output port J2 of the sampling circuit 44. Here the signal of a logic level "1" is a signal of a fixed logic level propagating from the output port TX1 of the second signal switch 34 along the second signal path when the first signal switch 30 has the PWM signal in each of the first pulse periods, such as the pulse period P1, to be passed from its input port RE to its output port TS1 coupled to the input port SC of each controller 56 of the delay units 42-1 through 42-N of the first demodulation unit 36.

Furthermore, the receiver 2 includes the second demodulation unit 38 configured to apply the same method mentioned above to demodulate or decode the PWM signal in the pulse period P2, after and next to the pulse period P1, in the time interval between the time points t3 and t5 so as to obtain a value (i.e., a binary value or symbol of 1 in this case) of data modulated on the PWM signal in the pulse period P2. Upon detecting the falling edge 5c of the PWM signal from the output port TS2 of the first signal switch 30 at the time point t5, the sampling circuit 44 of the second demodulation unit 38 has an input at its input port J1 coupled to at the output port DO2 of the second delay cell 54 of the delay unit 42-1 of the second demodulation unit 38 to sample or determine a logic level at the output port O2 of the delay unit 42-1 of the second demodulation unit 38 as an output, i.e., a sampled or determined result, at its output J2. In this example, the PWM signal in the pulse period P2 has a first portion in a first time interval between the falling edge 5b at the time point t3 and the rising edge 5e at the time point t4 and a second portion in a second time interval between the rising edge 5e at the time point t4 and the falling edge 5c at the time point t5, wherein a first time span for the first time interval is less than a second time span for the second time interval. Thus, the number of the first delay cells 52 in the forward signal path, along which the logic level "1" propagates for the first time span, is equal to that of the second delay cells 54 in the backward signal path, along which the logic level "1" propagates for the second span time span. Upon the sampling circuit 44 of the second demodulation unit 38 detecting the falling edge 5c of the PWM signal from the output port TS2 of the first signal switch 30 at the time point t5, the logic level "1" has propagated to the output port SO2 of the delay unit 42-1 and the output port SO2 of the delay unit 42-1 has a logic level changed from the logic level "0", reset when the first signal switch 30 has the PWM signal in one of the first pulse periods, i.e., the pulse period P1, before and next to the pulse period P2 to be passed from its input port RE to its output port TS1 coupled to the input port SC of each controller 56 of the delay units 42-1 through 42-N of the first demodulation unit 36, to a logic level "1". Thereby, the sampling circuit 44 of the second demodulation unit 38 has the sampled or determined result of a logic level "1" at its output port J2. Accordingly, the receiver 2 obtains a value (i.e., a binary value or symbol of 1 in this example) of data modulated on (or encoded on) the PWM signal in the pulse period P2 at the time interval between the time points t3 and t5 based on the sampled or determined result generated at the output port J2 of the sampling circuit 44 of the second demodulation unit 38. Here the signal of a logic level "1" is a signal of a fixed logic level propagating from the output port TX2 of the second signal switch 34 along the second signal path when the first signal switch 30 has the PWM signal in each of the second pulse periods, such as the pulse period P2, to be passed from its input port RE to its output port TS2 coupled to the input port SC of each controller 56 of the delay units 42-1 through 42-N of the second demodulation unit 38. When the second demodulation unit 38 demodulates or decodes the PWM signal in the second pulse periods, such as ones just before and after the pulse period P1, each of the first delay cells 52 of the first demodulation unit 36 has the output port DO1 to be coupled to the signal Dp, at a logic level "0", generated by the divide-by-two circuit 32 so as to be reset to a logic level "0" in the time interval between the time points t3 and t5, and each of the second delay cells 54 of the first demodulation unit 36 has the output ports DO2 to be coupled to the signal Dp, at a logic level "0", generated by the divide-by-two circuit 32 so as to be reset to a logic level "0" in the time interval between the time points t3 and t5.

Referring back to FIG. 5, the inverter 40 may be arranged between the output port E2 of the divide-by-two circuit 32 and the second demodulation unit 38. The inverter 40 is configured to perform negation of its input at its input port coupled to the output port E2 of the divide-by-two circuit 32 as its output at its output port coupled to, e.g., each output port DO1 of the first delay cells 52 of the delay units 42-1 through 42-N of the second demodulation unit 38 and each output port DO2 of the second delay cells 54 of the delay units 42-1 through 42-N of the second demodulation unit 38, that is, the inverter 40 has a logic level at its output port opposite to that at its input port. When the first demodulation unit 36 demodulates or decodes the PWM signal in the first pulse periods, such as ones just before and after the pulse period P2, the divide-by-two circuit 32 generates a signal of a logic level "1" as the input of the inverter 40 and the inverter 40 performs negation of its input, i.e., logic level "1", at its input port as its output, i.e., logic level "0", at its output port to be passed to each of the output ports DO1 and DO2 of the first and second delay cells 52 and 54 of the second demodulation unit 38 to be reset to a logic level "0". Alternatively, the inverter 40 may be contained in the second demodulation unit 38.

Figure 8:
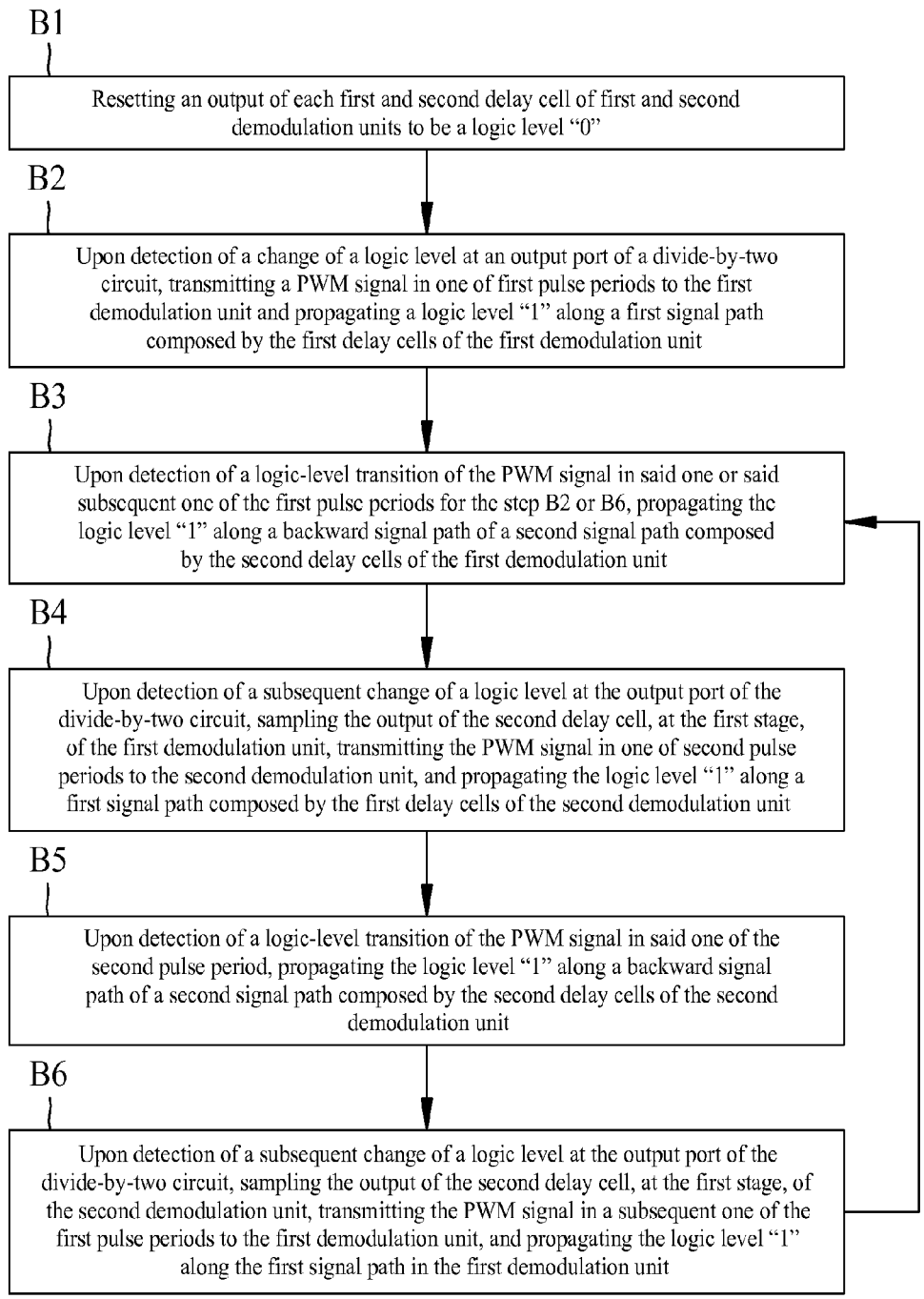
FIG. 8 is a flow chart depicting a receiver demodulating or decoding a PWM signal in accordance with an embodiment of the present disclosure.

The receiver 2 in the second embodiment as depicted above may perform a method of demodulating or decoding the PWM signal output from the transmitter 3, as illustrated in FIG. 8. Referring to FIG. 8, in step B1, before the receiver 2 receives the PWM signal transmitted from the transmitter 3, each first delay cell 52 of the first and second demodulation units 36 and 38 has the output ports DO1 to be reset to a logic level "0", and each second delay cell 54 of the first and second demodulation units 36 and 38 has the output ports DO2 to be reset to a logic level "0". Furthermore, each of the first switches 46 of the delay units 42-1 through 42-N of the first and second demodulation units 36 and 38 is controlled to be switched on (i.e., each first switch 46 of the delay units 42-1 through 42-N of the first and second demodulation units 36 and 38 has a connection between its input port SU and its output port SO1), and each of the second and third switches 48 and 50 of the delay units 42-1 through 42-N of the first and second demodulation units 36 and 38 is controlled to be switched off (i.e., each second switch 48 of the delay units 42-1 through 42-N of the first and second demodulation units 36 and 38 has no connection between its input port SI2 and its output port SO2, and each third switch 50 of the delay units 42-1 through 42-N of the first and second demodulation units 36 and 38 has no connection between its input port SI3 and its output port SO3). Accordingly, in the step B1, each of the first and second demodulation units 36 and 38 has the first delay cells 52 in its delay units 42-1 through 42-N coupled in series to one another to form the first signal path.

After the step B1 is completed, a step B2 is performed. In the step B2, the first signal switch 30 and the divide-by-two circuit 32 receive the PWM signal (e.g., shown in FIG. 6B) from the transmitter 3 at their input ports RE and E1. Upon detecting a first logic-level transition of the PWM signal (e.g., the falling edge 5a of the PWM signal shown in FIG. 6B at the time point t1), the divide-by-two circuit 32 performs a first change of a logic level at its output port E2 (e.g., a logic-level transition of the signal Dp shown in FIG. 6B from a logic level "0" to a logic level "1" at the time point t1), based on which the first signal switch 30 is controlled to pass its input at its input port RE to one of its outputs at its output ports TS1 and TS2, and the second signal switch 34 is controlled to pass its input at its input port H to one of its outputs at its output ports TX1 and TX2. Accordingly, in this example, upon the first and second signal switches 30 and 34 of the receiver 2 detecting the first change of a logic level at the output port E2 of the divide-by-two circuit 32, the PWM signal in one of the first pulse periods, such as the pulse period P1, may be passed from the input port RE of the first signal switch 30 to the first output port TS1 of the first signal switch 30, and the signal of a logic level "1" is passed from the power source at the input port H of the second signal switch 34 to the first output port TX1 of the second signal switch 34. The PWM signal in said one of the first pulse periods output from the first output port TS1 of the first signal switch 30 is transmitted to each controller 56 of the first demodulation unit 36 and the sampling circuit 44 of the first demodulation unit 36. The logic level "1" output from the first output port TX1 of the second signal switch 34 is transmitted to the input port X1 of the first demodulation unit 36 and propagates along the first signal path formed in the first demodulation unit 36 to replace one by one with a delay of the same first period of time (such as the period of time Dt mentioned in FIGS. 9A and 9B) the logic level "0" having been reset in the step B1 at the output ports DO1 of the first delay cells 52 of the delay units 42-1 through 42-N of the first demodulation unit 36. During the propagation of the logic level "1" along the first signal path, each of the first delay cells 52 of the delay units 42-1 through 42-N of the first demodulation unit 36 may delay its input at its input port DI1 for the same first period of time, such as the period of time Dt, as its output at its output port DO1 to change a logic level at its output port DO1 from a logic level "0", reset in the step B1, to a logic level "1".

After the step B2 is completed, a step B3 is performed. In the step B3, upon detecting a second logic-level transition, after and next to the first logic-level transition at the beginning of said one of the first pulse periods, of the PWM signal from a logic level "0" to a logic level "1" (e.g., the rising edge 5d of the PWM signal shown in FIG. 6B at the time point t2) at its input port SC, the controller 56 of each of the delay units 42-1 through 42-N of the first demodulation unit 36 controls the first, second and third switches 46, 48 and 50 of said each of the delay units 42-1 through 42-N of the first demodulation unit 36 to be switched on or off based on a signal generated at the output port SO1 of the first switch 46 of said each of the delay units 42-1 through 42-N of the first demodulation unit 36, as mentioned in FIG. 7B, so as to form the second signal path. The logic level "1" from the output port TX1 of the second signal switch 34 continues to propagate along the backward signal path of the second signal path from the first signal path, i.e., the forward signal path of the second signal path, to replace one by one with a delay of the same second period of time (which may be the same as the first period of time) the logic level "0" having been reset in the step B1 or in a step B4, introduced in the following paragraphs, in the last loop at the output ports DO2 of the second delay cells 54 of the delay units 42-1 through 42-N of the first demodulation unit 36. During the propagation of the logic level "1" along the backward signal path of the second signal path, each of the second delay cells 54 of the delay units 42-1 through 42-N of the first demodulation unit 36 may delay its input at its input port DI2 for the same second period of time, such as the period of time Dt, as its output at its output port DO2 to change a logic level at its output port DO2 from a logic level "0", reset in the step B1 or in the step B4 in the last loop, to a logic level "1".

After the step B3 is completed, the step B4 is performed. In the step B4, upon detecting a third logic-level transition, after and next to the second logic-level transition and at the border of said one of the first pulse periods and one of the second pulse periods after and next to said one of the first pulse periods, of the PWM signal from a logic level "1" to a logic level "0" (e.g., the falling edge 5b of the PWM signal shown in FIG. 6B at the time point t3), the sampling circuit 44 of the first demodulation unit 36 samples or determines a logic level, at its input port J1, transmitted from the output port O2 of the first delay unit 42-1 of the first demodulation unit 36 so as to generate a first sampled or determined result (i.e., a first demodulated or decoded result), at its output port J2, which is or represents a value (e.g., a binary value or symbol of 0 or 1) of data modulated on (or encoded on) the PWM signal in said one of the first pulse periods, such as the PWM signal in the pulse period P1 as shown in FIG. 6B.

In addition, in the step B4, upon detecting the third logic-level transition of the PWM signal, having the same logic-level transition as the first logic-level transition, the divide-by-two circuit 32 performs a second change of a logic level at its output port E2 (e.g., a logic-level transition of the signal Dp shown in FIG. 6B from a logic level "1" to a logic level "0" at the time point t3). A logic-level transition at the output port E2 of the divide-by-two circuit 32 means that the PWM signal in the next pulse period (e.g., the PWM signal in the pulse period P2 shown in FIG. 6B) is received by the divide-by-two circuit 32. Accordingly, upon the first and second signal switches 30 and 34 of the receiver 2 detecting the second change of a logic level, after and next to the first change of a logic level, at the output port E2 of the divide-by-two circuit 32, the PWM signal in one of the second pulse periods, such as the pulse period P2, is passed from the input port RE of the first signal switch 30 to the second output port TS2 of the first signal switch 30, and the signal of a logic level "1" is passed from the power source at the input port H of the second signal switch 34 to the second output port TX2 of the second signal switch 34. The PWM signal in said one of the second pulse periods output from the second output port TS2 of the first signal switch 30 is transmitted to each controller 56 of the second demodulation unit 38 and the sampling circuit 44 of the second demodulation unit 38. The logic level "1" output from the second output port TX2 of the second signal switch 34 is transmitted to the input port X2 of the second demodulation unit 38 and propagates along the first signal path formed in the second demodulation unit 38 to replace one by one with a delay of the same first period of time the logic level "0", having been reset in the step B1 or in a step B6, introduced in the following paragraphs, in the last loop, at the output ports DO1 of the first delay cells 52 of the delay units 42-1 through 42-N of the second demodulation unit 38. During the propagation of the logic level "1" along the first signal path, each of the first delay cells 52 of the delay units 42-1 through 42-N of the second demodulation unit 38 may delay its input at its input port DI1 for the same first period of time as its output at its output port DO1 to change a logic level at its output port DO1 from a logic level "0", reset in the step B1 or in the step B6 in the last loop, to a logic level "1".

Furthermore, when the first signal switch 30 has the PWM signal in said one of the second pulse periods to be passed from its input port RE to its output port TS2 coupled to the sampling circuit 44 of the second demodulation unit 38 and the input port SC of each controller 56 of the delay units 42-1 through 42-N of the second demodulation unit 38 and after the sampling circuit 44 of the first demodulation unit 36 completes the sampling process, each of the first delay cells 52 of the first demodulation unit 36 has its output port DO1 to be reset to a logic level "0" by, e.g., coupling its output port DO1 to the output port E2 of the divide-by-two circuit 32, and each of the second delay cells 54 of the first demodulation unit 36 has its output port DO2 to be reset to a logic level "0" by, e.g., coupling its output port DO2 to the output port E2 of the divide-by-two circuit 32. In an example, the output ports DO1 and DO2 of the first and second delay cells 52 and 54 of the first demodulation unit 36 may be reset to a logic level "0" before a subsequent step B5 or B6 is performed.

Thereby, when the first signal switch 30 has the PWM signal in said one of the second pulse periods to be passed from its input port RE to its output port TS2 coupled to the sampling circuit 44 of the second demodulation unit 38 and the input port SC of each controller 56 of the delay units 42-1 through 42-N of the second demodulation unit 38 and after the sampling circuit 44 of the first demodulation unit 36 completes the sampling process, the divide-by-two circuit 32 has the output port E2 at a logic level "0" (e.g., the signal Dp at a logic level "0" in the time interval between the time points t3 and t5) that may be switched to couple to each of the output ports DO1 and DO2 of the first and second delay cells 52 and 54 of the delay units 42-1 through 42-N of the first demodulation unit 36 to be reset to the logic level "0".

Alternatively, when the first signal switch 30 has the PWM signal in said one of the second pulse periods just after said one of the first pulse periods to be passed from its input port RE to its output port TS2 coupled to the sampling circuit 44 of the second demodulation unit 38 and the input port SC of each controller 56 of the delay units 42-1 through 42-N of the second demodulation unit 38 and after the sampling circuit 44 of the first demodulation unit 36 completes the sampling process, the divide-by-two circuit 32 has its output port E2 at a logic level "1" that may be switched to couple to an input port of an inverter to perform negation of its input, i.e., a logic level "1", at its input port as its output, i.e., a logic level "0", at its output port that may be switched to couple to each of the output ports DO1 and DO2 of the first and second delay cells 52 and 54 of the delay units 42-1 through 42-N of the first demodulation unit 36 to be reset to the logic level "0".

Furthermore, when the first signal switch 30 has the PWM signal in said one of the second pulse periods to be passed from its input port RE to its output port TS2 coupled to the sampling circuit 44 of the second demodulation unit 38 and the input port SC of each controller 56 of the delay units 42-1 through 42-N of the second demodulation unit 38 and after the sampling circuit 44 of the first demodulation unit 36 completes the sampling process, each of the first switches 46 of the first demodulation unit 36 are controlled to be switched on (i.e., each first switch 46 of the first demodulation unit 36 is reset to have a connection between its input port SI1 and its output port SO1), and each of the second and third switches 48 and 50 of the first demodulation unit 36 are controlled to be switched off (i.e., each second switch 48 of the first demodulation unit 36 is reset to have no connection between its input port SI2 and its output port SO2, and each third switch 50 of the first demodulation unit 36 is reset to have no connection between its input port SI3 and its output port SO3). In an example, the above operation of switching on or off the first, second and third switches 46, 48 and 50 of the first demodulation unit 36 may be completed before the subsequent step B5 or B6 is performed. Accordingly, the first demodulation unit 36 is reset to form the first signal path, along which the signal of a logic level "1" may propagate from the output port TX1 of the second signal switch 34 when the first signal switch 30 has the PWM signal in one of the first pulse periods just after said one of the second pulse periods to be passed from its input port RE to its output port TS1 coupled to the sampling circuit 44 of the first demodulation unit 36 and the input port SC of each controller 56 of the delay units 42-1 through 42-N of the first demodulation unit 36.

As mentioned above, the first demodulation unit 36 may have (1) the first delay cells 52 coupled to or connected to one another in series so as to form the first signal path, along which the signal of a logic level "1" may propagate, for duration of a first time interval, and (2) the second delay cells 54 coupled to or connected to one another in series so as to form the backward signal path of the second signal path, along which the signal of a logic level "1" may continue to propagate from the first signal path, or the forward signal path of the second signal path, for duration of a second time interval. Here the signal of a logic level "1" may be a signal of a fixed logic level for duration of the first and second intervals. While propagating along the first signal path formed in the first demodulation unit 36, the signal of a logic level "1" from the first input port TX1 of the second signal switch 34 is delayed by a first number of the first delay cells 52 connected in series in the first signal path, i.e., the forward signal path of the second path, for the first period of time times the first number. While propagating along the second signal path formed in the first demodulation unit 36, the signal of a logic level "1" from the first input port TX1 of the second signal switch 34 is delayed by a second number of the second delay cells 54 connected in series in the backward signal path of the second signal path for the second period of time times the second number. The first and second periods of time may be the same period of time (e.g., the period of time Td or Dt). The signal of a logic level "1" is configured to propagate along some, i.e., the first number, of the first delay cells 52 connected to one another in series in the first signal path, i.e., the forward signal path of the second signal path, to change a logic level at the output ports DO1 of said some of the first delay cells 52. The signal of a logic level "1" is configured to propagate along some, i.e., the second number, of the second delay cells 54 connected to one another in series in the backward signal path of the second signal path, to change a logic level at the output ports DO2 of said some of the second delay cells 54. The first number may be greater than the second number. Alternatively, the first number may be equal to the second number. Here the first time interval may be a time interval between a first logic-level transition of the PWM signal (e.g., the falling edge 5a shown in FIG. 6B) and a second logic-level transition of the PWM signal (e.g., the rising edge 5d shown in FIG. 6B), and the second time interval may be a time interval between the second logic-level transition of the PWM signal and a third logic-level transition of the PWM signal (e.g., the falling edge 5b shown in FIG. 6B). The time interval between the first logic-level transition of the PWM signal and the third logic-level transition of the PWM signal is the PWM signal in a pulse period (e.g., the pulse period P1 shown in FIG. 6B). Upon detecting the third logic-level transition of the PWM signal, the sampling circuit 44 of the first demodulation unit 36 samples or determines a signal at its input port J1 coupled to the output port O2 of the first delay unit 42-1 of the first demodulation unit 36 so as to generate a sampled or determined result (i.e., a demodulated or decoded result) at its output port J2. Accordingly, the receiver 2 obtains a value (e.g., a binary value or symbol of 0 or 1) of data modulated on (or encoded on) the PWM signal in the pulse period, such as the pulse period P1 shown in FIG. 6B, based on the sampled or determined result.

After the step B4 is completed, the step B5 is performed. In the step B5, upon detecting a fourth logic-level transition, after and next to the third logic-level transition at the beginning of said one of the second pulse periods, of the PWM signal from a logic level "0" to a logic level "1" (e.g., the rising edge 5e of the PWM signal shown in FIG. 6B at the time point t4), the controller 56 of each of the delay units 42-1 through 42-N of the second demodulation unit 38 controls the first, second and third switches 46, 48 and 50 of said each of the delay units 42-1 through 42-N of the second demodulation unit 38 to be switched on or off based on a signal generated at the output port SO1 of the first switch 46 of said each of the delay units 42-1 through 42-N of the second demodulation unit 38, as mentioned in FIG. 7B, so as to form the second signal path. The logic level "1" from the output port TX2 of the second signal switch 34 continues to propagate along the backward signal path of the second signal path from the first signal path, i.e., the forward signal path of the second signal path, to replace one by one with a delay of the same second period of time the logic level "0" having been reset in the step B1 or in the step B6, introduced in the following paragraphs, in the last loop at the output ports DO2 of the second delay cells 54 of the delay units 42-1 through 42-N of the second demodulation unit 38. During the propagation of the logic level "1" along the backward signal path of the second signal path, each of the second delay cells 54 of the delay units 42-1 through 42-N of the second demodulation unit 38 may delay its input at its input port DI2 for the same second period of time as its output at its output port DO2 to change a logic level at its output port DO2 from a logic level "0", reset in the step B1 or in the step B6 in the last loop, to a logic level "1".

After the step B5 is completed, the step B6 is performed. In the step B6, upon detecting a fifth logic-level transition, after and next to the fourth logic-level transition and at the border of said one of the second pulse periods and one of the first pulse periods after and next to said one of the second pulse periods, of the PWM signal from a logic level "1" to a logic level "0" (e.g., the falling edge 5c of the PWM signal shown in FIG. 6B at the time point t5), the sampling circuit 44 of the second demodulation unit 38 samples or determines a logic level, at its input port J1, transmitted from the output port O2 of the first delay unit 42-1 of the second demodulation unit 38 so as to generate a second sampled or determined result (i.e., a second demodulated or decoded result), at its output port J2, which is or represents a value (e.g., a binary value or symbol of 0 or 1) of data modulated on (or encoded on) the PWM signal in said one of the second pulse periods, such as the PWM signal in the pulse period P2 as shown in FIG. 6B.

In addition, in the step B6, upon detecting the fifth logic-level transition of the PWM signal, having the same logic-level transition as the first and third logic-level transitions, the divide-by-two circuit 32 performs a third change of a logic level at its output port E2 (e.g., a logic-level transition of the signal Dp shown in FIG. 6B from a logic level "0" to a logic level "1" at the time point t5). A logic-level transition at the output port E2 of the divide-by-two circuit 32 means that the PWM signal in the next pulse period is received by the divide-by-two circuit 32. Accordingly, upon the first and second signal switches 30 and 34 of the receiver 2 detecting the third change of a logic level, after and next to the second change of a logic level, at the output port E2 of the divide-by-two circuit 32, the PWM signal in a subsequent one of the first pulse periods is passed from the input port RE of the first signal switch 30 to the first output port TS1 of the first signal switch 30, and the signal of a logic level "1" is passed from the power source at the input port H of the second signal switch 34 to the first output port TX1 of the second signal switch 34. The PWM signal in said subsequent one of the first pulse periods from the first output port TS1 of the first signal switch 30 is transmitted to the sampling circuit 44 of the first demodulation unit 36 and each controller 56 of the first demodulation unit 36. The logic level "1" output from the first output port TX1 of the second signal switch 34 is transmitted to the input port X1 of the first demodulation unit 36 and propagates along the first signal path formed in the first demodulation unit 36 to replace one by one with a delay of the same first period of time the logic level "0", having been reset in the step B4, at the output ports DO1 of the first delay cells 52 of the delay units 42-1 through 42-N of the first demodulation unit 36. During the propagation of the logic level "1" along the first signal path, each of the first delay cells 52 of the delay units 42-1 through 42-N of the first demodulation unit 36 may delay its input at its input port DI1 for the same first period of time as its output at its output port DO1 to change a logic level at its output port DO1 from a logic level "0", reset in the step B4, to a logic level "1".

Furthermore, when the first signal switch 30 has the PWM signal in said subsequent one of the first pulse periods to be passed from its input port RE to its output port TS1 coupled to the sampling circuit 44 of the first demodulation unit 36 and the input port SC of each controller 56 of the delay units 42-1 through 42-N of the first demodulation unit 36 and after the sampling circuit 44 of the second demodulation unit 38 completes the sampling process, each of the first delay cells 52 of the second demodulation unit 38 has its output port DO1 to be reset to a logic level "0" by, e.g., coupling its output port DO1 to the output port of the inverter 40 that perform negation of its input, i.e., a logic level "1", at its input port coupled to the output port E2 of the divide-by-two circuit 32 as its output, i.e., a logic level "0", at its output port, and each of the second delay cells 54 of the second demodulation unit 38 has its output port DO2 to be reset to a logic level "0" by, e.g., coupling its output port DO2 to the output port of the inverter 40. In an example, the output ports DO1 and DO2 of the first and second delay cells 52 and 54 of the second demodulation unit 38 may be reset to a logic level "0" before the step B3 or B4 in a next loop is performed.

Thereby, when the first signal switch 30 has the PWM signal in said subsequent one of the first pulse periods to be passed from its input port RE to its output port TS1 coupled to the sampling circuit 44 of the first demodulation unit 36 and the input port SC of each controller 56 of the delay units 42-1 through 42-N of the first demodulation unit 36 and after the sampling circuit 44 of the second demodulation unit 38 completes the sampling process, the divide-by-two circuit 32 has the output port E2 at a logic level "1" (e.g., the signal Dp at a logic level "1" in a time interval just after the time point t5) that may be switched to couple to the input port of the inverter 40 that performs negation of its input, i.e., a logic level "1", at its input port as its output, i.e., a logic level "0", at its output port switched to couple to, e.g., each of the output ports DO1 and DO2 of the first and second delay cells 52 and 54 of the delay units 42-1 through 42-N of the second demodulation unit 38 to be reset to a logic level "0".

Alternatively, when the first signal switch 30 has the PWM signal in said subsequent one of the first pulse periods to be passed from its input port RE to its output port TS1 coupled to the sampling circuit 44 of the first demodulation unit 36 and the input port SC of each controller 56 of the delay units 42-1 through 42-N of the first demodulation unit 36 and after the sampling circuit 44 of the second demodulation unit 38 completes the sampling process, the divide-by-two circuit 32 has its output port E2 at a logic level "0". In this case, the inverter 40 is omitted and the divide-by-two circuit 32 has its output at its output port E2 switched to couple to each of the output ports DO1 and DO2 of the first and second delay cells 52 and 54 of the delay units 42-1 through 42-N of the second demodulation unit 38 to be reset to the logic level "0".

Furthermore, when the first signal switch 30 has the PWM signal in said subsequent one of the first pulse periods to be passed from its input port RE to its output port TS1 coupled to the sampling circuit 44 of the first demodulation unit 36 and the input port SC of each controller 56 of the delay units 42-1 through 42-N of the first demodulation unit 36 and after the sampling circuit 44 of the second demodulation unit 38 completes the sampling process, each of the first switches 46 of the second demodulation unit 38 are controlled to be switched on (i.e., each first switch 46 of the second demodulation unit 38 is reset to have a connection between its input port SI1 and its output port SO1), and each of the second and third switches 48 and 50 of the second demodulation unit 38 are controlled to be switched off (i.e., each second switch 48 of the second demodulation unit 38 is reset to have no connection between its input port SI2 and its output port SO2, and each third switch 50 of the second demodulation unit 38 is reset to have no connection between its input port SI3 and its output port SO3). In an example, the above operation of switching on or off the first, second and third switches 46, 48 and 50 of the second demodulation unit 38 may be completed before the step B3 or B4 in the next loop is performed. Accordingly, the second demodulation unit 38 is reset to form the first signal path, along which the signal of a logic level "1" may propagate from the output port TX2 of the second signal switch 34 when the first signal switch 30 has the PWM signal in one of the second pulse periods just after said subsequent one of the first pulse periods to be passed from its input port RE to its output port TS2 coupled to the sampling circuit 44 of the second demodulation unit 38 and the input port SC of each controller 56 of the delay units 42-1 through 42-N of the second demodulation unit 38.

After the step B6 is completed, a next loop of the steps B3-B6 are repeated sequentially. By repeating the steps B3-B6 many times, each value (e.g., each binary value or symbol) of data modulated on (or encoded on) the PWM signal in each pulse period is obtained. Accordingly, the second signal path may be formed alternately in the first and second demodulation units 36 and 38 to lead the logic level "1" to alternately propagate from the output port TX1 of the second signal switch 34 along the second signal path in the first demodulation unit 36 and from the output port TX2 of the second signal switch 34 along the second signal path in the second demodulation unit 38.

Figure 9A:
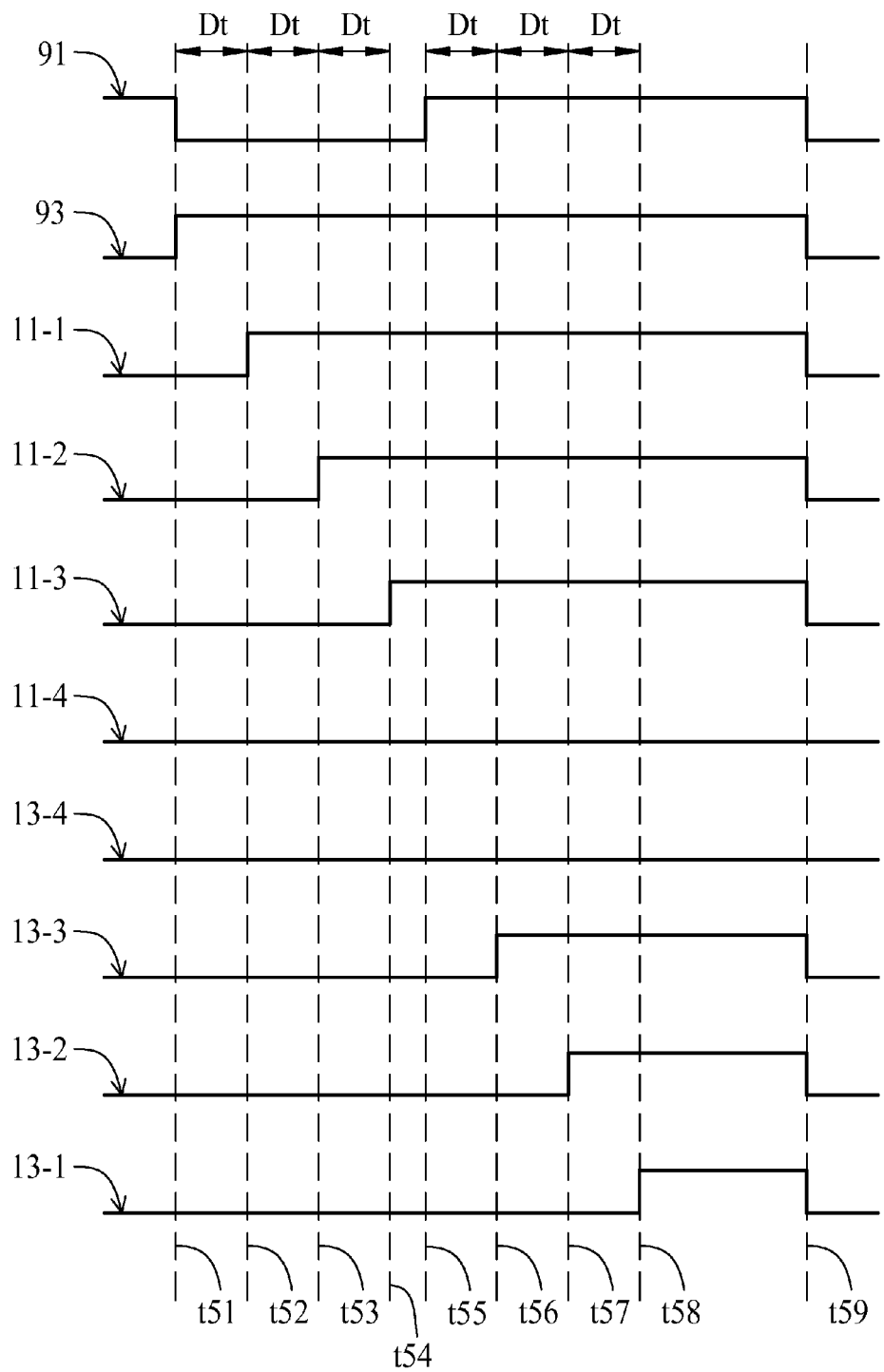
FIG. 9A depicts ten timing diagrams (or waveform graphs) of a PWM signal, a signal output from a divide-by-two circuit, four signals output from four first delay circuits, and four signals output from four second delay signals, arranged from top to bottom, the timing diagrams showing logic levels of the ten signals with respect to a timing.
Figure 9B:
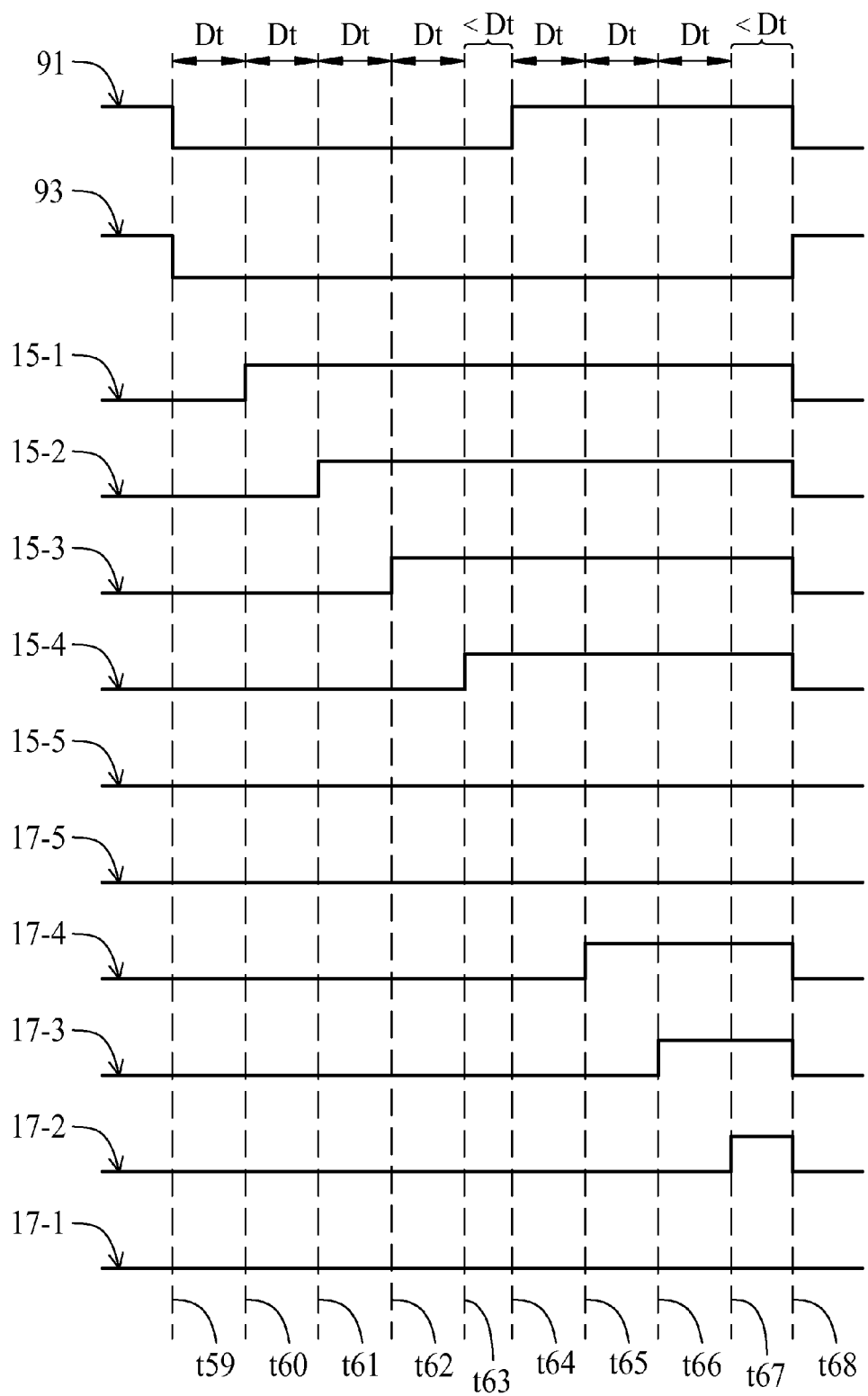
FIG. 9B depicts twelve timing diagrams (or waveform graphs) of a PWM signal, a signal output from a divide-by-two circuit, five signals output from five first delay circuits, and five signals output from five second delay signals, arranged from top to bottom, the timing diagrams showing logic levels of the twelve signals with respect to a timing.

The following paragraphs illustrate a method of obtaining two binary values or symbols of data modulated on (or encoded on) the neighboring two pulse periods of a PWM signal in accordance with two timing diagrams shown in FIGS. 9A and 9B. A PWM signal 91, an output signal 93, four output signals 11-1 through 11-4, four output signals 13-1 through 13-4, five output signals 15-1 through 15-5, and five output signals 17-1 through 17-5 are illustrated in FIGS. 9A and 9B. In this example, the divide-by-two circuit 32 receives the PWM signal 91 at its input port E1 and generates the output signal 93 at its output port E2. The output signal 93 has a frequency substantially half of that of the PWM signal 91. The PWM signal 91 is transmitted from the transmitter 3 via the transmission path 4. The PWM signal 91 in one of the first pulse periods spans from a time point t51 to a time point t59; the PWM signal 91 in one of the second pulse periods spans from the time point t59 to a time point t68. The PWM signal 91 includes three falling edges (i.e., three logic-level transitions from a logic level "1" to a logic level "0") at the three respective time points t51, t59 and t68 and two rising edges (i.e., two logic-level transitions from a logic level "0" to a logic level "1") at two respective time points t55 and t64.

Referring to FIGS. 9A and 9B, the output signals 11-1 through 11-4 are generated at the respective output ports DO1 of the first delay cells 52 of the delay units 42-1 through 42-4 of the first demodulation unit 36. The output signals 13-1 through 13-4 are generated at the respective output ports DO2 of the second delay cells 54 of the delay units 42-1 through 42-4 of the first demodulation unit 36. The output signals 15-1 through 15-5 are generated at the respective output ports DO1 of the first delay cells 52 of the delay units 42-1 through 42-5 of the second demodulation unit 38. The output signals 17-1 through 17-5 are generated at the respective output ports DO2 of the second delay cells 54 of the delay units 42-1 through 42-5 of the second demodulation unit 38.

Upon the period of time Dt (i.e., a fixed delay time) after receiving a signal at its input port DI1, each first delay cell 52 of the delay units 42-1 through 42-4 of the first demodulation unit 36 outputs the signal from its output port DO1 to the input port DI1 of one at the next stage of said each of the first delay cells 52 of the delay units 42-1 through 42-4 of the first demodulation unit 36. Upon the period of time Dt after receiving a signal at its input port DI2, each second delay cell 54 of the delay units 42-1 through 42-4 of the first demodulation unit 36 outputs the signal from its output port DO2 to the input port DI2 of one at the next stage of said each of the second delay cells 54 of the delay units 42-1 through 42-4 of the first demodulation unit 36. Upon the period of time Dt after receiving a signal at its input port DI1, each first delay cell 52 of the delay units 42-1 through 42-5 of the second demodulation unit 38 outputs the signal from its output port DO1 to the input port DI1 of one at the next stage of said each of the first delay cells 52 of the delay units 42-1 through 42-5 of the second demodulation unit 38. Upon the period of time Dt after receiving a signal at its input port DI2, each second delay cell 54 of the delay units 42-1 through 42-5 of the second demodulation unit 38 outputs the signal from its output port DO2 to the input port DI2 of one at the next stage of said each of the second delay cells 54 of the delay units 42-1 through 42-5 of the second demodulation unit 38.

Referring to FIGS. 9A and 9B, as illustrated in the step B1, before the receiver 2 receives the PWM signal 91, i.e., before the time point t51, each of the output signals 11-1 through 11-4, 13-1 through 13-4, 15-1 through 15-5, and 17-1 through 17-5 has a logic level reset to a logic level "0", and each of the first and second demodulation units 36 and 38 has the first delay cells 52 in its delay units 42-1 through 42-N coupled in series to one another to form the first signal path. As illustrated in the step B2, upon detecting a first logic-level transition of the PWM signal 91 from a logic level "1" to a logic level "0" at the time point t51, the divide-by-two circuit 32 generates the output signal 93 with a first change of a logic level at its output port E2. Upon the first and second signal switches 30 and 34 detecting the output signal 93 with the first change of a logic level from a logic level "0" to a logic level "1" at the time point t51, the PWM signal 91 in one of the first pulse periods between the time points t51 and t59 is passed from the input port RE of the first signal switch 30 to the output port TS1 of the first signal switch 30 coupled to the input port SC of each controller 56 of the first demodulation unit 36 and the sampling circuit 44 of the first demodulation unit 36, and the signal of a logic level "1" is passed from the input port H of the second signal switch 34 to the output port TX1 of the second signal switch 34 coupled to the input port I1 of the first delay unit 42-1 of the first demodulation unit 36. The logic level "1" propagates from the output port TX1 of the second signal switch 34 along the first signal path formed in the first demodulation unit 36 to replace one by one with a delay for the same period of time Dt the logic level "0" at the output ports DO1 of the first delay cells 52 of the delay units 42-1 through 42-N of the first demodulation unit 36.

For the first demodulation unit 36, during a time interval between the two time points t51 and t55, each of the first switches 46 of the delay units 42-1 through 42-N is controlled to be switched on (i.e., each first switch 46 has a connection between its input port SI1 and its output port SO1), and each of the second and third switches 48 and 50 of the delay units 42-1 through 42-N is controlled to be switched off (i.e., each second switch 48 has no connection between its input port SI2 and its output port SO2, and each third switch 50 has no connection between its input port SI3 and its output port SO3). Accordingly, a sequential coupling of all the first delay cells 52 of the delay units 42-1 through 42-N of the first demodulation unit 36 forms or composes the first signal path in the first demodulation unit 36 during the time interval between the two time points t51 and t55.

At the time point t51, the logic level "1" propagates to the input port of DI1 of the first delay cell 52 of the first delay unit 42-1 of the first demodulation unit 36. At and immediately after a time point t52 after the period of time Dt from the time point t51, the first delay cell 52 of the first delay unit 42-1 of the first demodulation unit 36 generates its input, i.e., the logic level "1", as its output at its output port DO1 coupled to the input port SI1 of the first switch 46 of the second delay unit 42-2 of the first demodulation unit 36. At the time point t52, with regards to the first demodulation unit 36, the first switch 46 of its second delay unit 42-2 is controlled to be switched on to lead the output port DO1 of the first delay cell 52 of its first delay unit 42-1 couple to the input port DI1 of the first delay cell 52 of its second delay unit 42-2. As a result, the output signal 11-1 is changed from a logic level "0" to a logic level "1" at and immediately after the time point t52. Similarly, the output signal 11-2 is changed from a logic level "0" to a logic level "1" at and immediately after a time point t53 after the period of time Dt from the time point t52; the output signal 11-3 is changed from a logic level "0" to a logic level "1" at and immediately after a time point t54 after the period of time Dt from the time point t53. At the time point t55, since the logic level "1" has not propagated to the input port DI1 of the first delay cell 52 of the fourth delay unit 42-4 of the first demodulation unit 36 yet, the output signal 11-4 remains at a logic level "0" at the time point t55.

Next, as illustrated in the step B3, when and immediately after each controller 56 of the first demodulation unit 36 detects a second logic-level transition of the PWM signal 91 from a logic level "0" to a logic level "1" at the time point t55 (i.e., a rising edge of the PWM signal 91 at the time point t55), the logic level "1" is switched to propagate along the backward signal path of the second signal path formed in the first demodulation unit 36. The logic level "1" propagating along the backward signal path of the second signal path in the first demodulation unit 36 replaces one by one with a delay for the same period of time Dt the logic level "0" at the output ports DO2 of the second delay cells 54 of the three delay units 42-3 through 42-1 of the first demodulation unit 36 at respective time points t56, t57 and t58.

At the time point t55 when each of the delay units 42-1 through 42-3 of the first demodulation unit 36 has its controller 56 detecting or determining that the output port SO1 of its first switch 46 is at a logic level "1", said each of the delay units 42-1 through 42-3 of the first demodulation unit 36 has its first and second switches 46 and 48 controlled to be switched on (i.e., its first switch 46 has a connection between its input port SI1 and its output port SO1, and its second switch 48 has a connection between its input port SI2 and its output port SO2), and its third switch 50 controlled to be switched off (i.e., its third switch 50 has no connection between its input port SI3 and its output port SO3). In addition, at the time point t55 when the delay unit 42-4 of the first demodulation unit 36 has its controller 56 detecting or determining that the output port SO1 of its first switch 46 is at a logic level "0", the delay unit 42-4 of the first demodulation unit 36 has its first and second switches 46 and 48 controlled to be switched off (i.e., its first switch 46 has no connection between its input port SI1 and its output port SO1, and its second switch 48 has no connection between its input port SI2 and its output port SO2), and its third switch 50 controlled to be switched on (i.e., its third switch 50 has a connection between its input port SI3 and its output port SO3). At the time point t55 when each of the other delay units 42-5 through 42-N of the first demodulation unit 36 has its controller 56 detecting or determining that the output port SO1 of its first switch 46 is at a logic level "0", said each of the other delay units 42-5 through 42-N of the first demodulation unit 36 has its first and second switches 46 and 48 controlled to be switched off, and its third switch 50 controlled to be switched on.

Accordingly, for the first demodulation unit 36, a sequential coupling of the first switches 46 of the delay units 42-1 through 42-3, the first delay cells 52 of the delay units 42-1 through 42-3, the third switch 50 of the delay unit 42-4, the second delay cells 54 of the delay units 42-1 through 42-3, and the second switches 48 of the delay units 42-1 through 42-3 forms or composes the second signal path during a time interval between the two time points t55 and t59. For the first demodulation unit 36, a sequential coupling of the second delay cells 54 of the delay units 42-1 through 42-3 and the second switches 48 of the delay units 42-1 through 42-3 forms the backward signal path of the second signal path in the first demodulation unit 36 during the time interval between the two time points t55 and t59.

At the time point t55, the logic level "1" propagates from the first signal path to the input port DI2 of the second delay cell 54 of the third delay unit 42-3 of the first demodulation unit 36. At and immediately after the time point t56 after the period of time Dt from the time point t55, the second delay cell 54 of the third delay unit 42-3 of the first demodulation unit 36 generates its input, i.e., the logic level "1", as its output at its output port DO2 coupled to the input port SI2 of the second switch 48 of the third delay unit 42-3 of the first demodulation unit 36. At the time point t56, with regards to the first demodulation unit 36, the second switch 48 of its third delay unit 42-3 is controlled to be switched on to lead the output port DO2 of the second delay cell 54 of its third delay unit 42-3 couple to the input port DI2 of the second delay cell 54 of its second delay unit 42-2. As a result, the output signal 13-3 is changed from a logic level "0" to a logic level "1" at and immediately after the time point t56. Similarly, the output signal 13-2 is changed from a logic level "0" to a logic level "1" at and immediately after the time point t57 after the period of time Dt from the time point t56; the output signal 13-1 is changed from a logic level "0" to a logic level "1" at and immediately after the time point t58 after the period of time Dt from the time point t57.

At the time point 58, with regards to the first demodulation unit 36, the second switch 48 of its first delay unit 42-1 is controlled to be switched on to lead the output port DO2 of the second delay cell 54 of its first delay unit 42-1 couple to the input port J1 of its sampling circuit 44. Thereby, the logic level "1" propagates from the output port DO2 of the second delay cell 54 of its first delay unit 42-1 to the input port J1 of its sampling circuit 44.

At and immediately after the time point t55, since the fourth delay unit 42-4 of the first demodulation unit 36 has its first and second switches 46 and 48 controlled to be switched off, the logic level "1" does not propagate to its first and second delay cells 52 and 54. Accordingly, the output signals 11-4 and 13-4 remain at a logic level "0" at and immediately after the time point t55.

Subsequently, as illustrated in the step B4, upon detecting a third logic-level transition of the PWM signal 91 from a logic level "1" to a logic level "0" at the time point t59 (i.e., a falling edge of the PWM signal 91 at the time point t59), the sampling circuit 44 of the first demodulation unit 36 samples or determines the output signal 13-1, having a logic level "1" at the time point t59, at the output port O2 of the first delay unit 42-1 of the first demodulation unit 36 so as to generate a binary value or symbol "1" of data modulated on (or encoded on) the PWM signal 91 in said one of the first pulse periods between the time points t51 and t59 at its output port J2.

Upon detecting the third logic-level transition of the PWM signal 91 at the time point t59, the divide-by-two circuit 32 generates the output signal 93 with a second change of a logic level from a logic level "1" to a logic level "0" at the time point t59 at its output port E2. Referring to FIG. 9B, upon the first and second signal switches 30 and 34 detecting the output signal 93 with the second change of a logic level at the time point t59, the PWM signal 91 in one of the second pulse periods between the time points t59 and t68 is passed from the input port RE of the first signal switch 30 to the output port TS2 of the first signal switch 30 coupled to the input port SC of each controller 56 of the second demodulation unit 38 and the sampling circuit 44 of the second demodulation unit 38, and the signal of a logic level "1" is passed from the input port H of the second signal switch 34 to the output port TX2 of the second signal switch 34 coupled to the input port I1 of the first delay unit 42-1 of the second demodulation unit 38. The logic level "1" propagates from the output port TX2 of the second signal switch 34 along the first signal path formed in the second demodulation unit 38 to replace one by one with a delay for the same period of time Dt the logic level "0" at the output ports DO1 of the first delay cells 52 of the delay units 42-1 through 42-N of the second demodulation unit 38.

For the second demodulation unit 38, during a time interval between the two time points t59 and t64, each of the first switches 46 of the delay units 42-1 through 42-N is controlled to be switched on, and each of the second and third switches 48 and 50 of the delay units 42-1 through 42-N is controlled to be switched off. Accordingly, a sequential coupling of all the first delay cells 52 of the delay units 42-1 through 42-N forms or composes the first signal path in the second demodulation unit 38 during the time interval between the two time points t59 and t64.

At the time 59, the logic level "1" propagates to the input port of DI1 of the first delay cell 52 of the first delay unit 42-1 of the second demodulation unit 38. At and immediately after a time point t60 after the period of time Dt from the time point t59, the first delay cell 52 of the first delay unit 42-1 of the second demodulation unit 38 generates its input, i.e., the logic level "1", as its output at its output port DO1 coupled to the input port SI1 of the first switch 46 of the second delay unit 42-2 of the second demodulation unit 38. At the time point t60, with regards to the second demodulation unit 38, the first switch 46 of its second delay unit 42-2 is controlled to be switched on to lead the output port DO1 of the first delay cell 52 of its first delay unit 42-1 couple to the input port DI1 of the first delay cell 52 of its second delay unit 42-2. As a result, the output signal 15-1 is changed from a logic level "0" to a logic level "1" at and immediately after the time point t60. Similarly, the output signal 15-2 is changed from a logic level "0" to a logic level "1" at and immediately after a time point t61 after the period of time Dt from the time point t60; the output signal 15-3 is changed from a logic level "0" to a logic level "1" at and immediately after a time point t62 after the period of time Dt from the time point t61; the output signal 15-4 is changed from a logic level "0" to a logic level "1" at and immediately after a time point t63 after the period of time Dt from the time point t62. At the time point t64, since the logic level "1" has not propagated to the input port DI1 of the first delay cell 52 of the fifth delay unit 42-5 of the second demodulation unit 38 yet, the output signal 15-5 remains at a logic level "0" at the time point t64.

When the first signal switch 30 has the PWM signal 91 in said one of the second pulse periods between the time points t59 and t68 to be passed from its input port RE to its output port TS2 coupled to the input port SC of each controller 56 of the delay units 42-1 through 42-N of the second demodulation unit 38 and the sampling circuit 44 of the second demodulation unit 38 and after the sampling circuit 44 of the first demodulation unit 36 completes the sampling process, four steps are performed as below: (1) each of the first delay cells 52 of the first demodulation unit 36 has its output port DO1 to be reset to a logic level "0" by, e.g., coupling its output port DO1 to the output signal 93 at a logic level "0"; (2) each of the second delay cells 54 of the first demodulation unit 36 has its output ports DO2 to be reset to a logic level "0" by, e.g., coupling its output port DO2 to the output signal 93 at a logic level "0"; (3) each of the first switches 46 of the first demodulation unit 36 is reset to be switched on (i.e., each first switch 46 of the first demodulation unit 36 is reset to have a connection between its input port SI1 and its output port SO1); and (4) each of the second and third switches 48 and 50 of the first demodulation unit 36 is reset to be switched off (i.e., each second switch 48 of the first demodulation unit 36 is reset to have no connection between its input port SI2 and its output port SO2, and each third switch 50 of the first demodulation unit 36 is reset to have no connection between its input port SI3 and its output port SO3). As a result, the first demodulation unit 36 is reset to have the first signal path, along which the logic level "1" will propagate from the output port TX1 of the second signal switch 34 when each of its delay units 42-1 through 42-N has the controller 56 receiving the PWM signal 91 in another one of the first pulse periods after and next to said one of the second pulse periods at its input port SC.

Next, as illustrated in the step B5, when and immediately after each controller 56 of the second demodulation unit 38 detects a fourth logic-level transition of the PWM signal 91 from a logic level "0" to a logic level "1" at the time point t64 (i.e., a rising edge of the PWM signal 91 at the time point t64), the logic level "1" is switched to propagate along the backward signal path of the second signal path formed in the second demodulation unit 38. The logic level "1" propagating along the second signal path in the second demodulation unit 38 replaces one by one with a delay for the same period of time Dt the logic level "0" at the output ports DO2 of the second delay cells 54 of the delay units 42-4 through 42-1 of the second demodulation unit 38 at respective time points t65, t66, and t67.

At the time point t64 when each of the delay units 42-1 through 42-4 of the second demodulation unit 38 has its controller 56 detecting or determining that the output port SO1 of its first switch 46 is at a logic level "1", said each of the delay units 42-1 through 42-4 of the second demodulation unit 36 has its first and second switches 46 and 48 controlled to be switched on, and its third switch 50 controlled to be switched off. In addition, at the time point t64 when the delay unit 42-5 of the second demodulation unit 38 has its controller 56 detecting or determining that the output port SO1 of its first switch 46 is at a logic level "0", the delay unit 42-5 of the second demodulation unit 36 has its first and second switches 46 and 48 controlled to be switched off, and its third switch 50 controlled to be switched on. At the time point t64 when each of the other delay units 42-6 through 42-N of the second demodulation unit 38 has its controller 56 detecting or determining that the output port SO1 of its first switch 46 is at a logic level "0", said each of the other delay units 42-6 through 42-N of the second demodulation unit 38 has its first and second switches 46 and 48 controlled to be switched off, and its third switch 50 controlled to be switched on.

Accordingly, for the second demodulation unit 38, a sequential coupling of the first switches 46 of the delay units 42-1 through 42-4, the first delay cells 52 of the delay units 42-1 through 42-4, the third switch 50 of the delay unit 42-5, the second delay cells 54 of the delay units 42-1 through 42-4, and the second switches 48 of the delay units 42-1 through 42-4 forms or composes the second signal path during a time interval between the two time points t64 and t68. For the second demodulation unit 38, a sequential coupling of the second delay cells 54 of the delay units 42-1 through 42-4 and the second switches 48 of the delay units 42-1 through 42-4 forms the backward signal path of the second signal path in the second demodulation unit 38 during the time interval between the two time points t64 and t68.

At the time point t64, the logic level "1" propagates from the first signal path to the input port DI2 of the second delay cell 54 of the fourth delay unit 42-4 of the second demodulation unit 38. At and immediately after the time point t65 after the period of time Dt from the time point t64, the second delay cell 54 of the fourth delay unit 42-4 of the second demodulation unit 38 generates its input, i.e., the logic level "1", as its output at its output port DO1 coupled to the input port SI2 of the second switch 48 of the fourth delay unit 42-4 of the second demodulation unit 38. At the time point t65, with regards to the second demodulation unit 38, the second switch 48 of its fourth delay unit 42-4 is controlled to be switched on to lead the output port DO2 of the second delay cell 54 of its fourth delay unit 42-4 couple to the input port DI2 of the second delay cell 54 of its third delay unit 42-3. As a result, the output signal 17-4 is changed from a logic level "0" to a logic level "1" at and immediately after the time point t65. Similarly, the output signal 17-3 is changed from a logic level "0" to a logic level "1" at and immediately after the time point t66 after the period of time Dt from the time point t65; the output signal 17-2 is changed from a logic level "0" to a logic level "1" at and immediately after the time point t67 after the period of time Dt from the time point t66.

At the time point t68, since the logic level "1" has not propagated to the output port DO2 of the second delay cell 54 of the first delay unit 42-1 of the second demodulation unit 38 yet, the output signal 17-1 at the output port DO2 of the second delay cell 54 of the delay unit 42-1 of the second demodulation unit 38 remains at a logic level "0" reset before the receiver 2 receives the PWM signal 91. As the second switch 48 of the first delay unit 42-1 of the second demodulation unit 38 is controlled to be switched on in the time interval between the two time points t64 and t68, the output signal 17-1 at the output port DO2 of the second delay cell 54 of the delay unit 42-1 of the second demodulation unit 38 is transmitted to the input port J1 of the sampling circuit 44 of the second demodulation unit 38.

At and immediately after the time point t64, since the fifth delay unit 42-5 of the second demodulation unit 38 has its first and second switches 46 and 48 controlled to be switched off, the logic level "1" does not propagate to its first and second delay cells 52 and 54. Accordingly, the output signals 15-5 and 17-5 remain at a logic level "0" at and immediately after the time point t64.

Subsequently, as illustrated in the step B6, upon detecting a fifth logic-level transition of the PWM signal 91 from a logic level "1" to a logic level "0" at the time point t68 (i.e., a falling edge of the PWM signal 91 at the time point t68), the sampling circuit 44 of the second demodulation unit 38 samples or determines the output signal 17-1, having a logic level "0" at the time point t68, at the output port O2 of the first delay unit 42-1 of the second demodulation unit 38 so as to generate a binary value or symbol "0" of data modulated on (or encoded on) the PWM signal 91 in said one of the second pulse periods between the time points t59 and t68 at its output port J2.

In another embodiment, the second signal switch 34 may have its input port H coupled to or connected to a ground reference so as to receive a signal of a fixed logic level, i.e., a signal of a logic level "0" (or a signal of a low logic level), at its input port H. In this case, with regards to the first demodulation unit 36, in the steps B1 and B4, each of its first delay cells 52 has the output port DO1 to be reset to the logic level "1", each of its second delay cells 54 has the output port DO2 to be reset to a logic level "1", and the first signal path is formed in the first demodulation unit 36. In the steps B2 and B6, upon the first and second signal switches 30 and 34 detecting the first and third changes of a logic level respectively at the output port E2 of the divide-by-two circuit 32, the PWM signal in one of the first pulse periods is passed from the input port RE of the first signal switch 30 to the first output port TS1 of the first signal switch 30, and a logic level "0" is passed from the ground reference at the input port H of the second signal switch 34 to the first output port TX1 of the second signal switch 34 to propagate along the first signal path in the first demodulation unit 36. In the step B3, upon detecting the second logic-level transition of the PWM signal from a logic level "0" to a logic level "1" at its input port SC, the controller 56 of each of the delay units 42-1 through 42-N of the first demodulation unit 36 controls the first, second and third switches 46, 48 and 50 of said each of the delay units 42-1 through 42-N of the first demodulation unit 36 to be switched on or off based on a signal generated at the output port SO1 of the first switch 46 of said each of the delay units 42-1 through 42-N of the first demodulation unit 36 so as to form the backward signal path of the second signal path in the first demodulation unit 36, along which the logic level "0" continue to propagate from the first signal path. In a first condition of detecting that the output port SO1 of the first switch 46 has a logic level "0" (which is the same as the logic level of the signal received at the input port H of the second signal switch 34), the controller 56 sets the first switch 46 to be switched on to pass its input at its input port SI1 to its output at its output port SO1 through the channel of the first switch 46, the second switch 48 to be switched on to pass its input at its input port SI2 to its output at its output port SO2 through the channel of the second switch 48, and the third switch 50 to be switched off not to pass its input at its input port SI3 to its output at its output port SO3 through the channel of the third switch 50. In a second condition of detecting that the output port SO1 of the first switch 46 has a logic level "1" (which is different from the logic level of the signal received at the input port H of the second signal switch 34), the controller 56 sets the first switch 46 to be switched off not to pass its input at its input port SI1 to its output at its output port SO1 through the channel of the first switch 46, the second switch 48 to be switched off not to pass its input at its input port SI2 to its output at its output port SO2 through the channel of the second switch 48, and the third switch 50 to be switched on to pass its input at its input port SI3 to its output at its output port SO3 through the channel of the third switch 50.

With regards to the second demodulation unit 38, in the steps B1 and B6, each of its first delay cells 52 has the output port DO1 to be reset to the logic level "1", each of its second delay cells 54 has the output port DO2 to be reset to a logic level "1", and the first signal path is formed in the second demodulation unit 38. In the step B4, upon the first and second signal switches 30 and 34 detecting the second change of a logic level at the output port E2 of the divide-by-two circuit 32, the PWM signal in one of the second pulse periods is passed from the input port RE of the first signal switch 30 to the second output port TS2 of the first signal switch 30, and a logic level "0" is passed from the ground reference at the input port H of the second signal switch 34 to the second output port TX2 of the second signal switch 34 to propagate along the first signal path in the second demodulation unit 38. In the step B5, upon detecting the fourth logic-level transition of the PWM signal from a logic level "0" to a logic level "1" at its input port SC, the controller 56 of each of the delay units 42-1 through 42-N of the second demodulation unit 38 controls the first, second and third switches 46, 48 and 50 of said each of the delay units 42-1 through 42-N of the second demodulation unit 38 to be switched on or off for operating in the first and second conditions as mentioned above based on a signal generated at the output port SO1 of the first switch 46 of said each of the delay units 42-1 through 42-N of the second demodulation unit 38 so as to form the backward signal path of the second signal path in the second demodulation unit 38, along which the logic level "0" continue to propagate from the first signal path.

Accordingly, in this another embodiment, the first signal path may be formed alternately in the first and second demodulation units 36 and 38 to lead the signal of a logic level "0" to alternately propagate from the output port TX1 of the second signal switch 34 having the input port H coupled or connected to the ground reference, rather than the power source, along the first signal path in the first demodulation unit 36 and from the output port TX2 of the second signal switch 34 along the first signal path in the second demodulation unit 38. When propagating along the first signal path in each of the first and second demodulation units 36 and 38, the logic level "0" may replace one by one with a delay for the same period of time (e.g., the period of time Dt) the logic level "1" at the output ports DO1 of the first delay cells 52. During the propagation of the logic level "0" along the first signal path in each of the first and second demodulation units 36 and 38, each of the first delay cells 52 in the first signal path may delay its input, i.e., the logic level "0", at its input port DI1 for the same period of time, such as the period of time Dt, as its output at its output port DO1. The first delay cells 52 generates a signal, i.e., logic level "0" at its output port DO1, having the same logic level as that of the signal, i.e., logic level "0", transmitted to the input port H of the second signal switch 34. In addition, the second signal path may be formed alternately in the first and second demodulation units 36 and 38 to lead the logic level "0" to alternately propagate from the output port TX1 of the second signal switch 34 along the second signal path in the first demodulation unit 36 and from the output port TX2 of the second signal switch 34 along the second signal path in the second demodulation unit 38. When propagating along the second signal path in each of the first and second demodulation units 36 and 38, the logic level "0" may replace one by one with a delay for the same period of time (e.g., the period of time Dt) the logic level "1" at the output ports DO2 of the second delay cells 54. During the propagation of the logic level "0" along the backward signal path of the second signal path in each of the first and second demodulation units 36 and 38, each of the second delay cells 54 in said each of the first and second demodulation units 36 and 38 delays its input, i.e., the logic level "0", at its input port DI2 for the same period of time, such as the period of time Dt, as its output at its output port DO2. The second delay cells 54 generates a signal, i.e., logic level "0" at its output port DO1, having the same logic level as that of the signal, i.e., logic level "0", transmitted to the input port H of the second signal switch 34.

In the case that the second signal switch 34 has the input port H receiving the signal of a logic level "0", upon alternately detecting falling edges of the PWM signal transmitted from the transmitter 3, the sampling circuits 44 of the first and second demodulation units 36 and 38 alternatively samples or determines signals (e.g., signals of a logic level "0" or "1"), at their input ports J1 switched to couple to the respective output ports O2 of the first delay unit 42-1 of the first and second demodulation units 36 and 38 so as to generate logic signals (e.g., signals of a logic level "0" and/or "1") at their output ports J2. Accordingly, the receiver 2 alternately obtains values (e.g., binary values or symbols of 0 and/or 1) of data modulated on (or encoded on) pulse periods of the PWM signal alternately based on the logic signals at the output ports J2 of the sampling circuits 44 of the first and second demodulation units 36 and 38. In this case, upon detecting a falling edge of the PWM signal, at an end of a specific pulse period, if the sampling circuit 44 generates the logic level "1" (which has the same logic level as that of the signal at the output port O2 of the first delay unit 42-1), the value of data modulated on (or encoded on) the PWM signal in the specific pulse period may be a binary value or symbol of 0; if the sampling circuit 44 generates the logic level "0" (which has the same logic level as that of the signal at the output port O2 of the first delay unit 42-1), the value of data modulated on (or encoded on) the PWM signal in the specific pulse period may be a binary value or symbol of 1.

In this another embodiment, the inverter 40 may be instead arranged between the first demodulation unit 36 and the output port E2 of the divide-by-two circuit 32 to perform negation of its input at its input port coupled to the output port E2 of the divide-by-two circuit 32 as an output at its output port coupled to, e.g., each output port DO1 of the first delay cells 52 of the delay units 42-1 through 42-N of the first demodulation unit 36 and each output port DO2 of the second delay cells 54 of the delay units 42-1 through 42-N of the first demodulation unit 36. Thereby, when the second demodulation unit 38 demodulates or decodes the PWM signal in the second pulse periods, the divide-by-two circuit 32 generates a signal of a logic level "0" as an input of the inverter 40 and the inverter 40 performs negation of its input, i.e., logic level "0", at its input port as its output, i.e., logic level "1", at its output port to be passed to, e.g., each of the output ports DO1 and DO2 of the first and second delay cells 52 and 54 of the first demodulation unit 36 to be reset to a logic level "1".

In summary, the digital receiver 2 is configured to demodulate or decode a PWM signal transmitted from the transmitter 3 in accordance with the aforementioned embodiments of the present invention. The digital receiver 2 may include a delay cell and a sampling circuit coupled to the delay cell. The delay cell may receive a first signal and generate a second signal as an output. The second signal may include or may be the delayed first signal. When detecting a third signal (e.g., the PWM signal) having a logic-level transition, the sampling circuit may sample or determine the second signal as its output, i.e., a sampled or determined result.

For example, for the above first embodiment as illustrated in FIGS. 2A, 2B and 3, the delay cell may be alleged as the delay cell 16a of the counting cell 10-1, and the sampling circuit may be alleged as the sampling circuit 18 of the counting cell 10-1. The first signal may be alleged as the signal S1 transmitted to the input port R1 of the delay cell 16a of the counting cell 10-1. The second signal may be alleged as an output signal having information associated with the delayed signal S1 generated at the output port T1 of the delay cell 16a of the counting cell 10-1.

Alternatively, for the above second embodiment as illustrated in FIGS. 5, 7A, 7B and 8, the delay cell may be alleged as the delay cell 54 of the delay unit 42-1 of the demodulation unit 36, and the sampling circuit may be alleged as the sampling circuit 44 of the demodulation unit 36. The first signal may be alleged as an input signal (e.g., a signal of a logic level "1") received at the input port DI2 of the delay cell 54 of the delay unit 42-1 of the demodulation unit 36. The second signal may be alleged as an output signal having information associated with the delayed input signal generated at the output port DO2 of the delay cell 54 of the delay unit 42-1 of the demodulation unit 36.

The present invention provides a method of demodulating (or decoding) a PWM signal from the transmitter 3, including the following steps: (1) propagating a first signal in a first signal path for duration of a first interval, wherein the first interval is a time interval between a first logic-level transition (e.g., the falling edge 5a shown in FIG. 1B) of the PWM signal and a second logic-level transition (e.g., the rising edge 5d shown in FIG. 1B) of the PWM signal; and (2) after the step (1), propagating the first signal in a second signal path for duration of a second interval, wherein the second interval is a time interval between the second logic-level transition of the PWM signal and a third logic-level transition (e.g., the falling edge 5b shown in FIG. 1B) of the PWM signal. A time interval between the first and third logic-level transitions represents a pulse period of the PWM signal (e.g., the pulse period P1 of the PWM signal as shown in FIG. 1B). The step (1) of propagating the first signal in the first signal path for duration of the first interval includes delaying the first signal for the same period of time (e.g., the period of time Td or Dt) by multiple times and changing logic levels in the first signal path by multiple times; the step (2) of propagating the first signal in the second signal path for duration of the second interval includes delaying the first signal for the same period of time (e.g., the period of time Td or Dt) by multiple times and changing logic levels in the second signal path by multiple times. For the first embodiment as illustrated in FIGS. 2A, 2B and 3, the first signal may be alleged as the PWM signal switched by the signal switch 6 to propagate along the first and second signal path, and the first and second signal paths may be alleged as the first and second signal paths illustrated in FIGS. 2A, 2B and 3, respectively. Alternatively, for the second embodiment as illustrated in FIGS. 5, 7A, 7B and 8, the first signal may be alleged as the signal of a logic level "1" passed by the second signal switch 34, i.e., a signal of a fixed logic level, to one of the first and second demodulation units 36 and 38 for duration of the first and second intervals, the first signal path may be alleged as the first signal path or the forward signal path of the second signal path illustrated in the second embodiment, and the second signal path may be alleged as the backward signal path of the second signal path illustrated in the second embodiment.

In an example, the method may further include, after performing the step (2), determining a logic level in the second signal path (e.g., sampling the signal at the output port O2 of the delay unit 42-1 of the demodulation unit 36 or 38) so as to obtain a (binary) value of data modulated on (or encoded on) the pulse period of the PWM signal. In another example, the method may further include the following steps: (a) determining a logic level in the first signal path so as to obtain a first result (e.g., the sampled or determined result generated at the output port T3 of the sampling circuit 18 of either of the counting units 10-1 through 10-N); (b) determining a logic level in the second path so as to obtain a second result (e.g., the sampled or determined result generated at the output port T4 of the sampling circuit 20 of said either of the counting units 10-1 through 10-N); (c) performing a first logical operation based on information including the first and second results so as to generate a second signal (e.g., the operation result generated at the output port T5 of the logical operation unit 22 of said either of the counting units 10-1 through 10-N); (d) determining a logic level of the second signal so as to obtain a third result (e.g., the sampled or determined result generated at the output port T6 of the sampling circuit 24 of said either of the counting units 10-1 through 10-N); (e) performing a second logical operation based on information including the third result so as to generate a third signal (e.g., the operation result generated at the output port OUTX of the logical operation unit 12); and (f) determining a logic level of the third signal so as to obtain a (binary) value of data modulated on (or encoded on) the pulse period of the PWM signal. The first logical operation may be or may include an AND logical operation, and the second logical operation may be or may include an OR logical operation. Alternatively, the first logical operation may be or may include an OR logical operation, and the second logical operation may be or may include an AND logical operation.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A receiver configured to demodulate a pulse-width modulated (PWM) signal, comprising:
    multiple first delay cells coupled to one another in series in a first signal path, wherein said multiple first delay cells are operable to propagate a first signal along said first signal path for duration of a first interval between a first logic-level transition of said PWM signal and a second logic-level transition of said PWM signal;
    multiple second delay cells coupled to one another in series in a second signal path, wherein said multiple second delay cells are operable to propagate said first signal along said second signal path for duration of a second interval between said second logic-level transition of said PWM signal and a third logic-level transition of said PWM signal, wherein said second logic-level transition is between said first and third logic-level transitions and is followed by said third logic-level transition, wherein an interval between said first and third logic-level transitions represents a pulse period of said PWM signal, wherein each of said multiple first and second delay cells is operable to delay said first signal input to said each of said multiple first and second delay cells for a period of time as its output, wherein said first signal propagating along said second signal path is configured to change a logic level at said output of one of said multiple second delay cells; and
    a signal switch having an output port coupled to an input port of one of said multiple first delay cells, wherein said signal switch is configured to pass said first signal from an input port of said signal switch to said output port of said signal switch for duration of said first and second intervals.

2. The receiver of claim 1, wherein said first signal comprises said PWM signal.

3. The receiver of claim 1, wherein said first signal comprises a signal of a fixed logic level for duration of said first and second intervals.

4. The receiver of claim 1 further comprising a circuit configured to output a second signal to said signal switch, wherein said second signal has a frequency substantially half of a frequency of said PWM signal.

5. The receiver of claim 1 further comprising:
    a third delay cell having a first input port;
    a fourth delay cell having a first output port;
    a first switch configured to break a connection between said first input port of said third delay cell and a second output port of one of said multiple first delay cells for duration of said second interval;
    a second switch configured to break a connection between said first output port of said fourth delay cell and a second input port of one of said multiple second delay cells for duration of said second interval; and
    a third switch configured to couple said second output port to said second input port so as to pass said first signal from said second output port to said second input port for duration of said second interval.

6. The receiver of claim 1 further comprising a sampling circuit configured to sample said output of one of said multiple second delay cells upon detecting said third logic-level transition so as to generate a result, wherein a value of data modulated on said pulse period of said PWM signal is obtained based on said result.

7. The receiver of claim 1 further comprising a first sampling circuit configured to sample said output of one of said multiple first delay cells so as to generate a first result, a second sampling circuit configured to sample said output of one of said multiple second delay cells so as to generate a second result, and a first logical operation unit configured to generate a third result based on information associated with said first and second results.

8. A receiver configured to demodulate a pulse-width modulated (PWM) signal, comprising:
    multiple first delay cells coupled to one another in series in a first signal path, wherein said multiple first delay cells are operable to propagate a first signal along said first signal path for duration of a first interval between a first logic-level transition of said PWM signal and a second logic-level transition of said PWM signal;
    multiple second delay cells coupled to one another in series in a second signal path, wherein said multiple second delay cells are operable to propagate said first signal along said second signal path for duration of a second interval between said second logic-level transition of said PWM signal and a third logic-level transition of said PWM signal, wherein said second logic-level transition is between said first and third logic-level transitions and is followed by said third logic-level transition, wherein an interval between said first and third logic-level transitions represents a pulse period of said PWM signal, wherein each of said multiple first and second delay cells is operable to delay said first signal input to said each of said multiple first and second delay cells for a period of time as its output, wherein said first signal propagating along said second signal path is configured to change a logic level at said output of one of said multiple second delay cells; and a signal switch having a first output port coupled to an input port of one of said multiple first delay cells and a second output port coupled to an input port of one of said multiple second delay cells, wherein said signal switch is configured to pass said first signal from an input port of said signal switch to said first output port of said signal switch for duration of said first interval and to said second output port of said signal switch for duration of said second interval.

9. The receiver of claim 8 further comprising a sampling circuit configured to sample said output of one of said multiple second delay cells upon detecting said third logic-level transition so as to generate a result, wherein a value of data modulated on said pulse period of said PWM signal is obtained based on said result.

10. The receiver of claim 8 further comprising a first sampling circuit configured to sample said output of one of said multiple first delay cells so as to generate a first result, a second sampling circuit configured to sample said output of one of said multiple second delay cells so as to generate a second result, and a first logical operation unit configured to generate a third result based on information associated with said first and second results.

11. A receiver configured to demodulate a pulse-width modulated (PWM) signal, comprising:
    multiple first delay cells coupled to one another in series in a first signal path, wherein said multiple first delay cells are operable to propagate a first signal along said first signal path for duration of a first interval between a first logic-level transition of said PWM signal and a second logic-level transition of said PWM signal;
    multiple second delay cells coupled to one another in series in a second signal path, wherein said multiple second delay cells are operable to propagate said first signal along said second signal path for duration of a second interval between said second logic-level transition of said PWM signal and a third logic-level transition of said PWM signal, wherein said second logic-level transition is between said first and third logic-level transitions and is followed by said third logic-level transition, wherein an interval between said first and third logic-level transitions represents a pulse period of said PWM signal, wherein each of said multiple first and second delay cells is operable to delay said first signal input to said each of said multiple first and second delay cells for a period of time as its output, wherein said first signal propagating along said second signal path is configured to change a logic level at said output of one of said multiple second delay cells;
    a first sampling circuit configured to sample said output of one of said multiple first delay cells so as to generate a first result;
    a second sampling circuit configured to sample said output of one of said multiple second delay cells so as to generate a second result;
    a first logical operation unit configured to generate a third result based on information associated with said first and second results;
    a third sampling circuit configured to sample said third result so as to generate a fourth result; and
    a second logical operation unit configured to generate a fifth result based on information associated with said fourth result, wherein a value of data modulated on said pulse period of said PWM signal is obtained based on said fifth result.

12. The receiver of claim 11, wherein said first logical operation unit is configured to perform an AND logical operation on information associated with said first and second results into said third result, and said second logical operation unit is configured to perform an OR logical operation on information associated with said fourth result into said fifth result.

13. The receiver of claim 11, wherein said first logical operation unit is configured to perform an OR logical operation on information associated with said first and second results into said third result, and said second logical operation unit is configured to perform an AND logical operation on information associated with said fourth result into said fifth result.

14. A method of demodulating a pulse-width modulated (PWM) signal, comprising:
    propagating a first signal in a first signal path for duration of a first interval between a first logic-level transition of said PWM signal and a second logic-level transition of said PWM signal;
    after said propagating said first signal in said first signal path for duration of said first interval, propagating said first signal in a second signal path for duration of a second interval between said second logic-level transition of said PWM signal and a third logic-level transition of said PWM signal, wherein an interval between said first and third logic-level transitions represents a pulse period of said PWM signal, wherein said second logic-level transition is between said first and third logic-level transitions, wherein said propagating said first signal in said second signal path comprises changing a logic level in said second signal path;
    determining a logic level in said first path so as to obtain a first result;
    determining a logic level in said second path so as to obtain a second result;
    performing a first logical operation on information associated with said first and second results into a second signal;
    determining a logic level of said second signal so as to obtain a third result;
    performing a second logical operation on information associated with said third result into a third signal; and
    determining a logic level of said third signal so as to obtain a value of data modulated on said pulse period of said PWM signal.

15. The method of claim 14, wherein said first signal comprises said PWM signal.

16. The method of claim 14, wherein said propagating said first signal in said first signal path comprises delaying said first signal for a period of time by multiple times, and wherein said propagating said first signal in said second signal path comprises delaying said first signal for said period of time by multiple times.

17. The method of claim 14, wherein said first logical operation comprises an AND logical operation, and said second logical operation comprises an OR logical operation.

18. The method of claim 14, wherein said first logical operation comprises an OR logical operation, and said second logical operation comprises an AND logical operation.

* * * * *